US009330381B2

(12) United States Patent
Anzures et al.

(10) Patent No.: US 9,330,381 B2
(45) Date of Patent: May 3, 2016

(54) PORTABLE MULTIFUNCTION DEVICE, METHOD, AND GRAPHICAL USER INTERFACE FOR VIEWING AND MANAGING ELECTRONIC CALENDARS

(71) Applicant: Apple Inc., Cupertino, CA (US)

(72) Inventors: Freddy Allen Anzures, San Francisco, CA (US); Marcel van Os, San Francisco, CA (US); Stephen O. Lemay, San Francisco, CA (US); Michael Matas, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 13/666,944

(22) Filed: Nov. 1, 2012

(65) Prior Publication Data

US 2013/0080923 A1 Mar. 28, 2013

Related U.S. Application Data

(62) Division of application No. 12/242,856, filed on Sep. 30, 2008, now Pat. No. 8,327,272.

(60) Provisional application No. 61/033,780, filed on Mar. 4, 2008, provisional application No. 61/019,295, filed on Jan. 6, 2008.

(51) Int. Cl.
*G06F 15/00* (2006.01)
*G06F 13/00* (2006.01)
(Continued)

(52) U.S. Cl.
CPC ............ *G06Q 10/109* (2013.01); *G06F 1/1626* (2013.01); *G06F 1/1684* (2013.01);
(Continued)

(58) Field of Classification Search
CPC ............................. G06Q 10/109; G06F 1/1626
USPC ......... 715/751–753, 780, 772, 738, 823, 764, 715/743, 731, 809, 702, 720, 822, 810, 715/775–776
See application file for complete search history.

(56) References Cited

U.S. PATENT DOCUMENTS 4,107,784 A 8/1978 Bemmelen
4,313,108 A 1/1982 Yoshida
(Continued)

FOREIGN PATENT DOCUMENTS

CN 1683905 A 10/2005
CN 101270998 A 9/2008
(Continued)

OTHER PUBLICATIONS

Adium, "AboutAdium—Adium X-Trac," Aug. 19, 2007, 2 pages, http://web.archive.org/web/20070819113247/http://trac.adiumx.com/wiki/AboutAdium.
Apple.com, "Google Calendar Mobile," downloaded Feb. 2008, http://www.apple.com/webapps/productivity/googlecalendarmobile.html.
Apple, "Welcome to Tiger," copyright © 2005 Apple Computer, Inc., 32 pages, http://manuals.info.apple.com/en/Welcome_to_Mac_OS_X_v10.4_Tiger.pdf.
(Continued)

*Primary Examiner* — Kevin Nguyen
(74) *Attorney, Agent, or Firm* — Morrison & Foerster LLP

(57) ABSTRACT

In accordance with some embodiments, a computer-implemented method is performed at a portable multifunction device with a touch screen display. The touch screen display includes a long axis, a short axis, a portrait view and a landscape view. The computer-implemented method includes executing a calendar application. In response to detecting the portable multifunction device in a first orientation that comprises a substantially vertical orientation of the long axis, a calendar is displayed for a first time period in the portrait view. In response to detecting the portable multifunction device in a second orientation that comprises the substantially vertical orientation of the short axis, a calendar is displayed for a second time period in the landscape view. The second time period is longer than and includes the first time period.

18 Claims, 47 Drawing Sheets

(51) Int. Cl.
*G06Q 10/10* (2012.01)
*G06F 1/16* (2006.01)
*G06F 3/0488* (2013.01)

(52) U.S. Cl.
CPC .......... *G06F1/1694* (2013.01); *G06F 3/04883* (2013.01); *G06F 2200/1614* (2013.01); *G06F 2200/1637* (2013.01)

(56) References Cited

U.S. PATENT DOCUMENTS

| | | |
|---|---|---|
| 4,433,377 A | 2/1984 | Eustis et al. |
| 4,485,439 A | 11/1984 | Rothstein |
| 4,513,379 A | 4/1985 | Wilson et al. |
| 4,555,775 A | 11/1985 | Pike |
| 4,586,158 A | 4/1986 | Brandle |
| 4,642,790 A | 2/1987 | Minshull et al. |
| 4,899,138 A | 2/1990 | Araki et al. |
| 4,935,728 A | 6/1990 | Kley |
| 4,974,191 A | 11/1990 | Amirghodsi et al. |
| 5,128,672 A | 7/1992 | Kaehler |
| 5,276,794 A | 1/1994 | Lamb, Jr. |
| 5,282,265 A | 1/1994 | Rohra Suda et al. |
| 5,287,448 A | 2/1994 | Nicol et al. |
| 5,303,388 A | 4/1994 | Kreitman et al. |
| 5,345,543 A | 9/1994 | Capps et al. |
| 5,386,556 A | 1/1995 | Hedin et al. |
| 5,396,590 A | 3/1995 | Kreegar |
| 5,416,890 A | 5/1995 | Beretta |
| 5,428,731 A | 6/1995 | Powers, III |
| 5,434,777 A | 7/1995 | Luciw |
| 5,446,882 A | 8/1995 | Capps et al. |
| 5,452,414 A | 9/1995 | Rosendahl et al. |
| 5,463,725 A | 10/1995 | Henckel et al. |
| 5,479,488 A | 12/1995 | Lennig et al. |
| 5,541,697 A | 7/1996 | McIntyre |
| 5,570,109 A | 10/1996 | Jenson |
| 5,577,241 A | 11/1996 | Spencer |
| 5,594,469 A | 1/1997 | Freeman et al. |
| 5,594,810 A | 1/1997 | Gourdol |
| 5,608,624 A | 3/1997 | Luciw |
| 5,608,635 A | 3/1997 | Tamai |
| 5,617,539 A | 4/1997 | Ludwig et al. |
| 5,659,805 A | 8/1997 | Furlani et al. |
| 5,682,539 A | 10/1997 | Conrad et al. |
| 5,714,698 A | 2/1998 | Tokioka et al. |
| 5,724,985 A | 3/1998 | Snell et al. |
| 5,727,950 A | 3/1998 | Cook et al. |
| 5,748,974 A | 5/1998 | Johnson |
| 5,758,079 A | 5/1998 | Ludwig et al. |
| 5,760,767 A | 6/1998 | Shore et al. |
| 5,760,773 A | 6/1998 | Berman et al. |
| 5,794,050 A | 8/1998 | Dahlgren et al. |
| 5,815,142 A | 9/1998 | Allard et al. |
| 5,825,352 A | 10/1998 | Bisset et al. |
| 5,825,357 A | 10/1998 | Malamud et al. |
| 5,826,261 A | 10/1998 | Spencer |
| 5,838,326 A | 11/1998 | Card et al. |
| 5,854,893 A | 12/1998 | Ludwig et al. |
| 5,864,635 A | 1/1999 | Zetts et al. |
| 5,864,868 A | 1/1999 | Contois |
| 5,867,150 A | 2/1999 | Bricklin et al. |
| 5,873,108 A | 2/1999 | Goyal et al. |
| 5,877,751 A | 3/1999 | Kanemitsu et al. |
| 5,880,731 A | 3/1999 | Liles et al. |
| 5,880,733 A | 3/1999 | Horvitz et al. |
| 5,884,039 A | 3/1999 | Ludwig et al. |
| 5,895,466 A | 4/1999 | Goldberg et al. |
| 5,896,133 A | 4/1999 | Lynch et al. |
| 5,896,500 A | 4/1999 | Ludwig et al. |
| 5,899,972 A | 5/1999 | Miyazawa et al. |
| 5,900,909 A | 5/1999 | Parulski et al. |
| 5,915,249 A | 6/1999 | Spencer |
| 5,917,487 A | 6/1999 | Ulrich |
| 5,943,049 A | 8/1999 | Matsubara et al. |
| 5,987,404 A | 11/1999 | Della Pietra et al. |
| 5,990,887 A | 11/1999 | Redpath et al. |
| 6,002,808 A | 12/1999 | Freeman |
| 6,006,227 A | 12/1999 | Freeman et al. |
| 6,009,462 A | 12/1999 | Birrell et al. |
| 6,011,585 A | 1/2000 | Anderson |
| 6,018,711 A | 1/2000 | French-St. George et al. |
| 6,023,275 A | 2/2000 | Horvitz et al. |
| 6,028,271 A | 2/2000 | Gillespie et al. |
| 6,040,824 A | 3/2000 | Maekawa et al. |
| 6,052,656 A | 4/2000 | Suda et al. |
| 6,072,494 A | 6/2000 | Nguyen |
| 6,081,750 A | 6/2000 | Hoffberg et al. |
| 6,088,731 A | 7/2000 | Kiraly et al. |
| 6,115,025 A | 9/2000 | Buxton et al. |
| 6,115,053 A | 9/2000 | Perlin |
| 6,144,938 A | 11/2000 | Surace et al. |
| 6,177,931 B1 | 1/2001 | Alexander et al. |
| 6,188,999 B1 | 2/2001 | Moody |
| 6,229,525 B1 | 5/2001 | Alexander |
| 6,232,966 B1 | 5/2001 | Kurlander |
| 6,233,559 B1 | 5/2001 | Balakrishnan |
| 6,237,025 B1 | 5/2001 | Ludwig et al. |
| 6,246,981 B1 | 6/2001 | Papineni et al. |
| 6,256,663 B1 | 7/2001 | Davis |
| 6,268,859 B1 | 7/2001 | Andresen et al. |
| 6,310,613 B1 | 10/2001 | Tanaka et al. |
| 6,317,594 B1 | 11/2001 | Gossman et al. |
| 6,317,831 B1 | 11/2001 | King |
| 6,321,092 B1 | 11/2001 | Fitch et al. |
| 6,323,883 B1 | 11/2001 | Minoura et al. |
| 6,334,103 B1 | 12/2001 | Surace et al. |
| 6,336,072 B1 | 1/2002 | Takayama et al. |
| 6,346,951 B1 | 2/2002 | Mastronardi |
| 6,351,762 B1 | 2/2002 | Ludwig et al. |
| 6,380,931 B1 | 4/2002 | Gillespie et al. |
| 6,388,877 B1 | 5/2002 | Canova, Jr. et al. |
| 6,421,672 B1 | 7/2002 | McAllister et al. |
| 6,434,524 B1 | 8/2002 | Weber |
| 6,434,604 B1 | 8/2002 | Harada et al. |
| 6,437,818 B1 | 8/2002 | Ludwig et al. |
| 6,446,076 B1 | 9/2002 | Burkey et al. |
| 6,453,292 B2 | 9/2002 | Ramaswamy et al. |
| 6,466,237 B1 | 10/2002 | Miyao et al. |
| 6,466,654 B1 | 10/2002 | Cooper et al. |
| 6,486,895 B1 | 11/2002 | Robertson et al. |
| 6,489,951 B1 | 12/2002 | Wong et al. |
| 6,499,013 B1 | 12/2002 | Weber |
| 6,501,937 B1 | 12/2002 | Ho et al. |
| 6,512,529 B1 | 1/2003 | Janssen et al. |
| 6,513,063 B1 | 1/2003 | Julia et al. |
| 6,523,061 B1 | 2/2003 | Halverson et al. |
| 6,526,395 B1 | 2/2003 | Morris |
| 6,532,444 B1 | 3/2003 | Weber |
| 6,532,446 B1 | 3/2003 | King |
| 6,577,330 B1 | 6/2003 | Tsuda et al. |
| 6,583,806 B2 | 6/2003 | Ludwig et al. |
| 6,594,673 B1 | 7/2003 | Smith et al. |
| 6,594,688 B2 | 7/2003 | Ludwig et al. |
| 6,598,039 B1 | 7/2003 | Livowsky |
| 6,600,502 B1 | 7/2003 | Brewster, Jr. |
| 6,601,026 B2 | 7/2003 | Appelt et al. |
| 6,615,172 B1 | 9/2003 | Bennett et al. |
| 6,630,944 B1 | 10/2003 | Kakuta et al. |
| 6,631,186 B1 | 10/2003 | Adams et al. |
| 6,633,846 B1 | 10/2003 | Bennett et al. |
| 6,638,313 B1 | 10/2003 | Freeman et al. |
| 6,647,260 B2 | 11/2003 | Dusse et al. |
| 6,650,735 B2 | 11/2003 | Burton et al. |
| 6,662,023 B1 | 12/2003 | Helle |
| 6,665,639 B2 | 12/2003 | Mozer et al. |
| 6,665,640 B1 | 12/2003 | Bennett et al. |
| 6,667,751 B1 | 12/2003 | Wynn et al. |
| 6,687,613 B2 | 2/2004 | Yokota |
| 6,690,365 B2 | 2/2004 | Hinckley et al. |
| 6,691,111 B2 | 2/2004 | Lazaridis et al. |
| 6,691,151 B1 | 2/2004 | Cheyer et al. |
| 6,704,015 B1 | 3/2004 | Bovarnick et al. |
| 6,724,370 B2 | 4/2004 | Dutta et al. |

(56) References Cited

U.S. PATENT DOCUMENTS

| | | |
|---|---|---|
| 6,725,427 B2 | 4/2004 | Freeman et al. |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,768,999 B2 | 7/2004 | Prager et al. |
| 6,772,195 B1 | 8/2004 | Hatlelid et al. |
| 6,775,776 B1 | 8/2004 | Vogt et al. |
| 6,778,951 B1 | 8/2004 | Contractor |
| 6,784,901 B1 | 8/2004 | Harvey et al. |
| 6,791,536 B2 | 9/2004 | Keely et al. |
| 6,792,082 B1 | 9/2004 | Levine |
| 6,795,017 B1 | 9/2004 | Puranik et al. |
| 6,807,574 B1 | 10/2004 | Partovi et al. |
| 6,810,379 B1 | 10/2004 | Vermeulen et al. |
| 6,813,491 B1 | 11/2004 | McKinney |
| 6,832,194 B1 | 12/2004 | Mozer et al. |
| 6,842,767 B1 | 1/2005 | Partovi et al. |
| 6,851,115 B1 | 2/2005 | Cheyer et al. |
| 6,859,931 B1 | 2/2005 | Cheyer et al. |
| 6,894,678 B2 | 5/2005 | Rosenberg et al. |
| 6,895,380 B2 | 5/2005 | Sepe, Jr. |
| 6,895,558 B1 | 5/2005 | Loveland |
| 6,910,186 B2 | 6/2005 | Kim |
| 6,915,138 B2 | 7/2005 | Kraft |
| 6,919,879 B2 | 7/2005 | Griffin et al. |
| 6,928,614 B1 | 8/2005 | Everhart |
| 6,932,708 B2 | 8/2005 | Yamashita et al. |
| 6,937,975 B1 | 8/2005 | Elworthy |
| 6,954,902 B2 | 10/2005 | Noma et al. |
| 6,956,564 B1 | 10/2005 | Williams |
| 6,964,023 B2 | 11/2005 | Maes et al. |
| 6,975,306 B2 | 12/2005 | Hinckley et al. |
| 6,980,949 B2 | 12/2005 | Ford |
| 6,983,203 B1 | 1/2006 | Wako |
| 6,996,531 B2 | 2/2006 | Korall et al. |
| 6,999,927 B2 | 2/2006 | Mozer et al. |
| 7,013,429 B2 | 3/2006 | Fujimoto et al. |
| 7,020,685 B1 | 3/2006 | Chen et al. |
| 7,027,974 B1 | 4/2006 | Busch et al. |
| 7,030,861 B1 | 4/2006 | Westerman et al. |
| 7,032,187 B2 | 4/2006 | Keely, Jr. et al. |
| 7,036,128 B1 | 4/2006 | Julia et al. |
| 7,046,230 B2 | 5/2006 | Zadesky et al. |
| 7,047,113 B1 | 5/2006 | Burch et al. |
| 7,047,133 B1 | 5/2006 | Dyer et al. |
| 7,050,977 B1 | 5/2006 | Bennett |
| 7,062,428 B2 | 6/2006 | Hogenhout et al. |
| 7,069,560 B1 | 6/2006 | Cheyer et al. |
| 7,072,941 B2 | 7/2006 | Griffin et al. |
| 7,085,590 B2 | 8/2006 | Kennedy et al. |
| 7,092,887 B2 | 8/2006 | Mozer et al. |
| 7,092,928 B1 | 8/2006 | Elad et al. |
| 7,115,035 B2 | 10/2006 | Tanaka |
| 7,124,164 B1 | 10/2006 | Chemtob |
| 7,127,046 B1 | 10/2006 | Smith et al. |
| 7,133,900 B1 | 11/2006 | Szeto |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,152,093 B2 | 12/2006 | Ludwig et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,206,809 B2 | 4/2007 | Ludwig et al. |
| 7,216,073 B2 | 5/2007 | Lavi et al. |
| 7,216,080 B2 | 5/2007 | Tsiao et al. |
| 7,218,943 B2 | 5/2007 | Klassen et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,239,301 B2 | 7/2007 | Liberty et al. |
| 7,256,770 B2 | 8/2007 | Hinckley et al. |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,366,609 B2 | 4/2008 | Lee |
| 7,376,556 B2 | 5/2008 | Bennett |
| 7,376,605 B2 | 5/2008 | Weisberg |
| 7,376,640 B1 | 5/2008 | Anderson et al. |
| 7,376,645 B2 | 5/2008 | Bernard |
| 7,379,811 B2 | 5/2008 | Rasmussen et al. |
| 7,379,874 B2 | 5/2008 | Schmid et al. |
| 7,386,449 B2 | 6/2008 | Sun et al. |
| 7,386,799 B1 | 6/2008 | Clanton et al. |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,412,470 B2 | 8/2008 | Masuno et al. |
| 7,415,100 B2 | 8/2008 | Cooper et al. |
| 7,418,392 B1 | 8/2008 | Mozer et al. |
| 7,423,661 B2 | 9/2008 | Abe et al. |
| 7,426,467 B2 | 9/2008 | Nashida et al. |
| 7,433,921 B2 | 10/2008 | Ludwig et al. |
| 7,439,969 B2 | 10/2008 | Chithambaram et al. |
| 7,447,635 B1 | 11/2008 | Konopka et al. |
| 7,454,351 B2 | 11/2008 | Jeschke et al. |
| 7,457,704 B2 | 11/2008 | Yasuda et al. |
| 7,467,087 B1 | 12/2008 | Gillick et al. |
| 7,475,010 B2 | 1/2009 | Chao |
| 7,478,129 B1 | 1/2009 | Chemtob |
| 7,479,949 B2 | 1/2009 | Jobs et al. |
| 7,483,894 B2 | 1/2009 | Cao |
| 7,484,180 B2 | 1/2009 | McCormack et al. |
| 7,487,089 B2 | 2/2009 | Mozer |
| 7,487,114 B2 | 2/2009 | Florance et al. |
| 7,492,350 B2 | 2/2009 | Fabre et al. |
| 7,495,659 B2 | 2/2009 | Marriott et al. |
| 7,499,040 B2 | 3/2009 | Zadesky et al. |
| 7,502,738 B2 | 3/2009 | Kennewick et al. |
| 7,522,927 B2 | 4/2009 | Fitch et al. |
| 7,523,108 B2 | 4/2009 | Cao |
| 7,526,466 B2 | 4/2009 | Au |
| 7,539,656 B2 | 5/2009 | Fratkina et al. |
| 7,546,382 B2 | 6/2009 | Healey et al. |
| 7,548,895 B2 | 6/2009 | Pulsipher |
| 7,555,431 B2 | 6/2009 | Bennett |
| 7,571,106 B2 | 8/2009 | Cao et al. |
| 7,581,186 B2 | 8/2009 | Dowdy et al. |
| 7,599,918 B2 | 10/2009 | Shen et al. |
| 7,603,230 B2 | 10/2009 | Suzuki et al. |
| 7,620,407 B1 | 11/2009 | Donald et al. |
| 7,620,496 B2 | 11/2009 | Rasmussen |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,578 B1 | 12/2009 | Cope et al. |
| 7,640,100 B2 | 12/2009 | Spinelli |
| 7,640,160 B2 | 12/2009 | Di Cristo et al. |
| 7,647,225 B2 | 1/2010 | Bennett et al. |
| 7,656,393 B2 | 2/2010 | King et al. |
| 7,657,424 B2 | 2/2010 | Bennett |
| 7,663,607 B2 | 2/2010 | Hotelling et al. |
| 7,669,134 B1 | 2/2010 | Christie et al. |
| 7,672,841 B2 | 3/2010 | Bennett |
| 7,676,026 B1 | 3/2010 | Baxter, Jr. |
| 7,676,767 B2 | 3/2010 | Hofmeister et al. |
| 7,679,604 B2 | 3/2010 | Uhlik et al. |
| 7,684,985 B2 | 3/2010 | Dominach et al. |
| 7,685,530 B2 | 3/2010 | Sherrard et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,710,262 B2 | 5/2010 | Ruha |

(56) References Cited

U.S. PATENT DOCUMENTS

| | | | |
|---|---|---|---|
| 7,710,393 B2 | 5/2010 | Tsuk et al. |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,728,821 B2 | 6/2010 | Hillis et al. |
| 7,729,904 B2 | 6/2010 | Bennett |
| 7,729,916 B2 | 6/2010 | Coffman et al. |
| 7,734,461 B2 | 6/2010 | Kwak et al. |
| 7,743,188 B2 | 6/2010 | Haitani et al. |
| 7,752,152 B2 | 7/2010 | Paek et al. |
| 7,768,395 B2 | 8/2010 | Gold |
| 7,774,204 B2 | 8/2010 | Mozer et al. |
| 7,777,648 B2 | 8/2010 | Smith et al. |
| 7,783,486 B2 | 8/2010 | Rosser et al. |
| 7,786,975 B2 | 8/2010 | Ording et al. |
| 7,797,642 B1 | 9/2010 | Karam et al. |
| 7,800,592 B2 | 9/2010 | Kerr et al. |
| 7,801,729 B2 | 9/2010 | Mozer |
| 7,808,479 B1 | 10/2010 | Hotelling et al. |
| 7,809,570 B2 | 10/2010 | Kennewick et al. |
| 7,809,610 B2 | 10/2010 | Cao |
| 7,812,826 B2 | 10/2010 | Ording et al. |
| 7,812,860 B2 | 10/2010 | King et al. |
| 7,818,176 B2 | 10/2010 | Freeman et al. |
| 7,822,608 B2 | 10/2010 | Cross et al. |
| 7,831,426 B2 | 11/2010 | Bennett |
| 7,831,917 B1 | 11/2010 | Karam |
| 7,840,350 B2 | 11/2010 | Spinelli |
| 7,840,400 B2 | 11/2010 | Lavi et al. |
| 7,840,447 B2 | 11/2010 | Kleinrock et al. |
| 7,873,519 B2 | 1/2011 | Bennett |
| 7,873,654 B2 | 1/2011 | Bernard |
| 7,877,705 B2 | 1/2011 | Chambers et al. |
| 7,881,936 B2 | 2/2011 | Longe et al. |
| 7,890,886 B2 | 2/2011 | Matthews et al. |
| 7,891,103 B2 | 2/2011 | Mayor et al. |
| 7,907,124 B2 | 3/2011 | Hillis et al. |
| 7,912,634 B2 | 3/2011 | Reed et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,930,168 B2 | 4/2011 | Weng et al. |
| 7,933,895 B2 | 4/2011 | Amjadi |
| 7,945,546 B2 | 5/2011 | Bliss et al. |
| 7,949,529 B2 | 5/2011 | Weider et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,987,151 B2 | 7/2011 | Schott et al. |
| 7,996,792 B2 | 8/2011 | Anzures et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,019,531 B2 | 9/2011 | Pinkus et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,060,389 B2 | 11/2011 | Johnson et al. |
| 8,069,046 B2 | 11/2011 | Kennewick et al. |
| 8,069,417 B2 * | 11/2011 | Brush et al. ............ 715/764 |
| 8,073,681 B2 | 12/2011 | Baldwin et al. |
| 8,082,153 B2 | 12/2011 | Coffman et al. |
| 8,090,533 B2 | 1/2012 | Koike et al. |
| 8,095,303 B1 | 1/2012 | Nesbitt et al. |
| 8,095,364 B2 | 1/2012 | Longe et al. |
| 8,099,289 B2 | 1/2012 | Mozer et al. |
| 8,107,401 B2 | 1/2012 | John et al. |
| 8,108,137 B2 | 1/2012 | Kim |
| 8,112,275 B2 | 2/2012 | Kennewick et al. |
| 8,112,280 B2 | 2/2012 | Lu |
| 8,122,384 B2 | 2/2012 | Partridge et al. |
| 8,140,335 B2 | 3/2012 | Kennewick et al. |
| 8,150,922 B2 | 4/2012 | Griffin et al. |
| 8,165,886 B1 | 4/2012 | Gagnon et al. |
| 8,171,432 B2 | 5/2012 | Matas et al. |
| 8,184,102 B2 | 5/2012 | Park et al. |
| 8,195,467 B2 | 6/2012 | Mozer et al. |
| 8,204,238 B2 | 6/2012 | Mozer |
| 8,205,157 B2 | 6/2012 | Van Os et al. |
| 8,217,906 B2 | 7/2012 | Sinclair |
| 8,219,407 B1 | 7/2012 | Roy et al. |
| 8,250,493 B2 | 8/2012 | Yang et al. |
| 8,264,465 B2 | 9/2012 | Grant et al. |
| 8,285,481 B2 | 10/2012 | De Silva et al. |
| 8,302,033 B2 | 10/2012 | Matas et al. |
| 8,332,144 B2 | 12/2012 | Diaz et al. |
| 8,429,292 B2 * | 4/2013 | Adams et al. ............ 709/238 |
| 8,456,297 B2 | 6/2013 | Van Os et al. |
| 8,458,278 B2 | 6/2013 | Christie et al. |
| 8,468,469 B1 | 6/2013 | Mendis et al. |
| 8,473,193 B2 | 6/2013 | Neef et al. |
| 8,489,641 B1 | 7/2013 | Seefeld et al. |
| 8,532,678 B2 | 9/2013 | Geelen |
| 8,537,119 B1 | 9/2013 | Grivna et al. |
| 8,554,861 B2 | 10/2013 | Christie et al. |
| 8,573,479 B1 | 11/2013 | Jenkins et al. |
| 8,607,167 B2 | 12/2013 | Matas et al. |
| 2001/0005859 A1 | 6/2001 | Okuyama et al. |
| 2001/0015719 A1 | 8/2001 | Van Ee et al. |
| 2001/0020211 A1 | 9/2001 | Takayama et al. |
| 2001/0045949 A1 | 11/2001 | Chithambaram et al. |
| 2001/0050687 A1 | 12/2001 | Iida et al. |
| 2002/0007395 A1 | 1/2002 | Matsuda |
| 2002/0015064 A1 | 2/2002 | Robotham et al. |
| 2002/0021278 A1 | 2/2002 | Hinckley et al. |
| 2002/0030699 A1 | 3/2002 | Van Ee |
| 2002/0035467 A1 | 3/2002 | Morimoto et al. |
| 2002/0054094 A1 | 5/2002 | Matsuda |
| 2002/0057263 A1 | 5/2002 | Keely et al. |
| 2002/0087262 A1 | 7/2002 | Bullock et al. |
| 2002/0113824 A1 | 8/2002 | Myers, Jr. |
| 2002/0183924 A1 | 12/2002 | Yokota |
| 2002/0198909 A1 | 12/2002 | Huynh et al. |
| 2003/0030673 A1 | 2/2003 | Ho |
| 2003/0054830 A1 | 3/2003 | Williams et al. |
| 2003/0078969 A1 | 4/2003 | Sprague et al. |
| 2003/0079024 A1 | 4/2003 | Hough et al. |
| 2003/0095112 A1 | 5/2003 | Kawano et al. |
| 2003/0097408 A1 | 5/2003 | Kageyama et al. |
| 2003/0101450 A1 | 5/2003 | Davidsson et al. |
| 2003/0122787 A1 | 7/2003 | Zimmerman et al. |
| 2003/0130014 A1 | 7/2003 | Rucinski |
| 2003/0134678 A1 | 7/2003 | Tanaka |
| 2003/0152203 A1 | 8/2003 | Berger et al. |
| 2003/0177265 A1 | 9/2003 | Page et al. |
| 2003/0187925 A1 | 10/2003 | Inala et al. |
| 2003/0208756 A1 | 11/2003 | Macrae et al. |
| 2003/0228909 A1 | 12/2003 | Tanaka et al. |
| 2003/0231190 A1 | 12/2003 | Jawerth et al. |
| 2004/0013416 A1 | 1/2004 | Mok |
| 2004/0015548 A1 | 1/2004 | Lee et al. |
| 2004/0021676 A1 | 2/2004 | Chen et al. |
| 2004/0027396 A1 | 2/2004 | Lection |
| 2004/0039779 A1 | 2/2004 | Amstrong et al. |
| 2004/0055446 A1 | 3/2004 | Robbin et al. |
| 2004/0100479 A1 | 5/2004 | Nakano et al. |
| 2004/0104896 A1 | 6/2004 | Suraqui |
| 2004/0122683 A1 | 6/2004 | Grossman et al. |
| 2004/0125088 A1 | 7/2004 | Zimmerman et al. |
| 2004/0139398 A1 | 7/2004 | Testa et al. |
| 2004/0140956 A1 | 7/2004 | Kushler et al. |
| 2004/0168118 A1 | 8/2004 | Wong et al. |
| 2004/0199582 A1 | 10/2004 | Kucharewski et al. |
| 2004/0199663 A1 | 10/2004 | Horvitz et al. |

(56) References Cited

U.S. PATENT DOCUMENTS

| | | |
|---|---|---|
| 2004/0210634 A1 | 10/2004 | Ferrer et al. |
| 2004/0215534 A1 | 10/2004 | Gautier et al. |
| 2004/0215731 A1 | 10/2004 | Tzann-en Szeto |
| 2004/0223485 A1 | 11/2004 | Arellano et al. |
| 2004/0235520 A1 | 11/2004 | Cadiz et al. |
| 2004/0243307 A1 | 12/2004 | Geelen |
| 2004/0250217 A1 | 12/2004 | Tojo et al. |
| 2005/0012723 A1 | 1/2005 | Pallakoff |
| 2005/0021418 A1 | 1/2005 | Marcus et al. |
| 2005/0024341 A1 | 2/2005 | Gillespie et al. |
| 2005/0032527 A1 | 2/2005 | Sheha et al. |
| 2005/0055662 A1 | 3/2005 | Strausbaugh et al. |
| 2005/0071332 A1 | 3/2005 | Ortega et al. |
| 2005/0071761 A1 | 3/2005 | Kontio |
| 2005/0080625 A1 | 4/2005 | Bennett et al. |
| 2005/0086605 A1 | 4/2005 | Ferrer et al. |
| 2005/0091596 A1 | 4/2005 | Anthony et al. |
| 2005/0108235 A1 | 5/2005 | Sato et al. |
| 2005/0108253 A1 | 5/2005 | Metsatahti et al. |
| 2005/0110768 A1 | 5/2005 | Marriott |
| 2005/0114021 A1 | 5/2005 | Krull et al. |
| 2005/0119897 A1 | 6/2005 | Bennett et al. |
| 2005/0125144 A1 | 6/2005 | Nakagawa |
| 2005/0144568 A1 | 6/2005 | Gruen et al. |
| 2005/0162402 A1 | 7/2005 | Watanachote |
| 2005/0169213 A1 | 8/2005 | Scian et al. |
| 2005/0181821 A1 | 8/2005 | Elomaa |
| 2005/0203768 A1 | 9/2005 | Florance et al. |
| 2005/0210394 A1 | 9/2005 | Crandall et al. |
| 2005/0239478 A1 | 10/2005 | Spirito |
| 2005/0240494 A1 | 10/2005 | Cue et al. |
| 2005/0240756 A1 | 10/2005 | Mayer |
| 2005/0243069 A1 | 11/2005 | Yorio et al. |
| 2005/0251331 A1 | 11/2005 | Kreft |
| 2005/0253806 A1 | 11/2005 | Liberty et al. |
| 2005/0270276 A1 | 12/2005 | Sugimoto et al. |
| 2005/0278643 A1 | 12/2005 | Ukai et al. |
| 2005/0283729 A1 | 12/2005 | Morris et al. |
| 2006/0001645 A1 | 1/2006 | Druker et al. |
| 2006/0001652 A1 | 1/2006 | Chiu et al. |
| 2006/0017692 A1 | 1/2006 | Wehrenberg et al. |
| 2006/0022048 A1 | 2/2006 | Johnson |
| 2006/0026233 A1 | 2/2006 | Tenembaum et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0047416 A1 | 3/2006 | Goldberg et al. |
| 2006/0050054 A1 | 3/2006 | Liang et al. |
| 2006/0085767 A1 | 4/2006 | Hinckley et al. |
| 2006/0122834 A1 | 6/2006 | Bennett |
| 2006/0125799 A1 | 6/2006 | Hillis et al. |
| 2006/0132455 A1 | 6/2006 | Rimas-Ribikauskas et al. |
| 2006/0132460 A1 | 6/2006 | Kolmykov-Zotov et al. |
| 2006/0143007 A1 | 6/2006 | Koh et al. |
| 2006/0143574 A1 | 6/2006 | Ito et al. |
| 2006/0148455 A1 | 7/2006 | Kim |
| 2006/0152496 A1 | 7/2006 | Knaven |
| 2006/0168539 A1 | 7/2006 | Hawkins et al. |
| 2006/0174207 A1 | 8/2006 | Deshpande |
| 2006/0178110 A1 | 8/2006 | Nurminen et al. |
| 2006/0181517 A1 | 8/2006 | Zadesky et al. |
| 2006/0184886 A1 | 8/2006 | Chung et al. |
| 2006/0192078 A1 | 8/2006 | Yang et al. |
| 2006/0195789 A1 | 8/2006 | Rogers et al. |
| 2006/0195790 A1 | 8/2006 | Beaupre et al. |
| 2006/0197753 A1 | 9/2006 | Hotelling |
| 2006/0205432 A1 | 9/2006 | Hawkins et al. |
| 2006/0224311 A1 | 10/2006 | Watanabe et al. |
| 2006/0227106 A1 | 10/2006 | Hashimoto et al. |
| 2006/0229802 A1 | 10/2006 | Vertelney et al. |
| 2006/0239248 A1 | 10/2006 | Hawk et al. |
| 2006/0242607 A1 | 10/2006 | Hudson |
| 2006/0246874 A1 | 11/2006 | Sullivan |
| 2006/0246955 A1 | 11/2006 | Nirhamo et al. |
| 2006/0253787 A1 | 11/2006 | Fogg |
| 2006/0265263 A1 | 11/2006 | Burns |
| 2006/0281449 A1 | 12/2006 | Kun et al. |
| 2006/0284852 A1 | 12/2006 | Hofmeister et al. |
| 2006/0286971 A1 | 12/2006 | Maly et al. |
| 2007/0004451 A1 | 1/2007 | Anderson |
| 2007/0013671 A1 | 1/2007 | Zadesky et al. |
| 2007/0033295 A1 | 2/2007 | Marriott |
| 2007/0044036 A1 | 2/2007 | Ishimura et al. |
| 2007/0046643 A1 | 3/2007 | Hillis et al. |
| 2007/0053268 A1 | 3/2007 | Crandall et al. |
| 2007/0055529 A1 | 3/2007 | Kanevsky et al. |
| 2007/0070066 A1 | 3/2007 | Bakhash |
| 2007/0080958 A1 | 4/2007 | Chithambaram et al. |
| 2007/0083324 A1 | 4/2007 | Suzuki et al. |
| 2007/0083623 A1 | 4/2007 | Nishimura et al. |
| 2007/0085841 A1 | 4/2007 | Tsuk et al. |
| 2007/0088556 A1 | 4/2007 | Andrew |
| 2007/0097093 A1 | 5/2007 | Ohshita et al. |
| 2007/0100790 A1 | 5/2007 | Cheyer et al. |
| 2007/0124062 A1 | 5/2007 | Janky et al. |
| 2007/0124680 A1 | 5/2007 | Robbin et al. |
| 2007/0132738 A1 | 6/2007 | Lowles et al. |
| 2007/0168413 A1 | 7/2007 | Barletta et al. |
| 2007/0168888 A1 | 7/2007 | Jawerth |
| 2007/0173267 A1 | 7/2007 | Klassen et al. |
| 2007/0174188 A1 | 7/2007 | Fish |
| 2007/0176796 A1 | 8/2007 | Bliss et al. |
| 2007/0182595 A1 | 8/2007 | Ghasabian |
| 2007/0185917 A1 | 8/2007 | Prahlad et al. |
| 2007/0189737 A1 | 8/2007 | Chaudhri et al. |
| 2007/0213099 A1 | 9/2007 | Bast |
| 2007/0225904 A1 | 9/2007 | Pantalone et al. |
| 2007/0226652 A1 | 9/2007 | Kikuchi et al. |
| 2007/0236477 A1 | 10/2007 | Ryu et al. |
| 2007/0260994 A1 | 11/2007 | Sciammarella et al. |
| 2007/0271527 A1 | 11/2007 | Paas et al. |
| 2007/0273664 A1 | 11/2007 | Kim et al. |
| 2007/0282595 A1 | 12/2007 | Tunning et al. |
| 2007/0282957 A1 | 12/2007 | Van Belle et al. |
| 2007/0300140 A1 | 12/2007 | Makela et al. |
| 2008/0015864 A1 | 1/2008 | Ross et al. |
| 2008/0021708 A1 | 1/2008 | Bennett et al. |
| 2008/0030460 A1 | 2/2008 | Hildreth et al. |
| 2008/0033779 A1 | 2/2008 | Coffman et al. |
| 2008/0034032 A1 | 2/2008 | Healey et al. |
| 2008/0036743 A1 | 2/2008 | Westerman et al. |
| 2008/0040315 A1 | 2/2008 | Auerbach et al. |
| 2008/0052063 A1 | 2/2008 | Bennett et al. |
| 2008/0055263 A1 | 3/2008 | Lemay et al. |
| 2008/0055269 A1 | 3/2008 | Lemay et al. |
| 2008/0059888 A1 | 3/2008 | Dunko |
| 2008/0062137 A1 | 3/2008 | Brodersen et al. |
| 2008/0062141 A1 | 3/2008 | Chaudhri |
| 2008/0066016 A1 | 3/2008 | Dowdy et al. |
| 2008/0066135 A1 | 3/2008 | Brodersen et al. |
| 2008/0086356 A1 | 4/2008 | Glassman et al. |
| 2008/0088602 A1 | 4/2008 | Hotelling |
| 2008/0094367 A1 | 4/2008 | Vam De Ven et al. |
| 2008/0114841 A1 | 5/2008 | Lambert |
| 2008/0120112 A1 | 5/2008 | Jordan et al. |
| 2008/0122796 A1 | 5/2008 | Jobs et al. |
| 2008/0140657 A1 | 6/2008 | Azvine et al. |
| 2008/0147730 A1 | 6/2008 | Lee et al. |
| 2008/0165144 A1 | 7/2008 | Forstall et al. |
| 2008/0165153 A1 | 7/2008 | Platzer et al. |
| 2008/0167809 A1 | 7/2008 | Geelen |
| 2008/0168396 A1 | 7/2008 | Matas et al. |
| 2008/0168403 A1 | 7/2008 | Westerman et al. |
| 2008/0172357 A1 | 7/2008 | Rechis et al. |
| 2008/0208456 A1 | 8/2008 | Jouline et al. |
| 2008/0209332 A1 | 8/2008 | Chevsky et al. |
| 2008/0221903 A1 | 9/2008 | Kanevsky et al. |
| 2008/0222118 A1 | 9/2008 | Scian et al. |
| 2008/0225013 A1 | 9/2008 | Muylkens et al. |
| 2008/0228386 A1 | 9/2008 | Geelen et al. |
| 2008/0228496 A1 | 9/2008 | Yu et al. |
| 2008/0247519 A1 | 10/2008 | Abella et al. |
| 2008/0300878 A1 | 12/2008 | Bennett |
| 2008/0320391 A1 | 12/2008 | Lemay et al. |

(56) References Cited

U.S. PATENT DOCUMENTS

| | | |
|---|---|---|
| 2008/0320419 A1 | 12/2008 | Matas et al. |
| 2009/0002335 A1 | 1/2009 | Chaudhri |
| 2009/0002396 A1 | 1/2009 | Andrews et al. |
| 2009/0006343 A1 | 1/2009 | Platt et al. |
| 2009/0007001 A1 | 1/2009 | Morin et al. |
| 2009/0024590 A1 | 1/2009 | Sturge et al. |
| 2009/0024890 A1 | 1/2009 | Cutrignelli et al. |
| 2009/0030800 A1 | 1/2009 | Grois |
| 2009/0058820 A1 | 3/2009 | Hinckley |
| 2009/0058823 A1 | 3/2009 | Kocienda |
| 2009/0064055 A1 | 3/2009 | Chaudhri et al. |
| 2009/0076796 A1 | 3/2009 | Daraselia |
| 2009/0090567 A1 | 4/2009 | Tonouchi |
| 2009/0100049 A1 | 4/2009 | Cao |
| 2009/0106376 A1 | 4/2009 | Tom et al. |
| 2009/0128500 A1 | 5/2009 | Sinclair |
| 2009/0138828 A1 | 5/2009 | Schultz et al. |
| 2009/0140991 A1 | 6/2009 | Takasaki et al. |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0172532 A1 | 7/2009 | Chaudhri |
| 2009/0172599 A1 | 7/2009 | Nezu |
| 2009/0177385 A1 | 7/2009 | Matas et al. |
| 2009/0178007 A1 | 7/2009 | Matas et al. |
| 2009/0198359 A1 | 8/2009 | Chaudhri |
| 2009/0244023 A1 | 10/2009 | Kim et al. |
| 2009/0271745 A1 | 10/2009 | Sakamoto et al. |
| 2009/0281724 A1 | 11/2009 | Blumenberg et al. |
| 2009/0295753 A1 | 12/2009 | King et al. |
| 2009/0299745 A1 | 12/2009 | Kennewick et al. |
| 2009/0299849 A1 | 12/2009 | Cao et al. |
| 2010/0005061 A1 | 1/2010 | Basco et al. |
| 2010/0005081 A1 | 1/2010 | Bennett |
| 2010/0023320 A1 | 1/2010 | Di Cristo et al. |
| 2010/0031186 A1 | 2/2010 | Tseng et al. |
| 2010/0036660 A1 | 2/2010 | Bennett |
| 2010/0042400 A1 | 2/2010 | Block et al. |
| 2010/0107099 A1 | 4/2010 | Frazier et al. |
| 2010/0145700 A1 | 6/2010 | Kennewick et al. |
| 2010/0164897 A1 | 7/2010 | Morin et al. |
| 2010/0204986 A1 | 8/2010 | Kennewick et al. |
| 2010/0217604 A1 | 8/2010 | Baldwin et al. |
| 2010/0225607 A1 | 9/2010 | Kim |
| 2010/0228540 A1 | 9/2010 | Bennett |
| 2010/0235341 A1 | 9/2010 | Bennett |
| 2010/0257160 A1 | 10/2010 | Cao |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0293186 A1 | 11/2010 | Nambata et al. |
| 2010/0299142 A1 | 11/2010 | Freeman et al. |
| 2010/0309149 A1 | 12/2010 | Blumenberg et al. |
| 2010/0312462 A1 | 12/2010 | Guéziec et al. |
| 2010/0312547 A1 | 12/2010 | Van Os et al. |
| 2010/0318576 A1 | 12/2010 | Kim |
| 2010/0332235 A1 | 12/2010 | David |
| 2010/0332348 A1 | 12/2010 | Cao |
| 2011/0041084 A1 | 2/2011 | Karam |
| 2011/0045868 A1 | 2/2011 | Sheha et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0131036 A1 | 6/2011 | Dicristo et al. |
| 2011/0131045 A1 | 6/2011 | Cristo et al. |
| 2011/0144999 A1 | 6/2011 | Jang et al. |
| 2011/0161076 A1 | 6/2011 | Davis et al. |
| 2011/0164058 A1 | 7/2011 | Lemay |
| 2011/0175810 A1 | 7/2011 | Markovic et al. |
| 2011/0184730 A1 | 7/2011 | Lebeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0289104 A1 | 11/2011 | Watt |
| 2011/0306426 A1 | 12/2011 | Novak et al. |
| 2012/0002820 A1 | 1/2012 | Leichter |
| 2012/0011137 A1 | 1/2012 | Sheha et al. |
| 2012/0016678 A1 | 1/2012 | Gruber et al. |
| 2012/0020490 A1 | 1/2012 | Leichter |
| 2012/0022787 A1 | 1/2012 | Lebeau et al. |
| 2012/0022857 A1 | 1/2012 | Baldwin et al. |
| 2012/0022860 A1 | 1/2012 | Lloyd et al. |
| 2012/0022868 A1 | 1/2012 | Lebeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | Lebeau et al. |
| 2012/0023088 A1 | 1/2012 | Cheng et al. |
| 2012/0035908 A1 | 2/2012 | Lebeau et al. |
| 2012/0035924 A1 | 2/2012 | Jitkoff et al. |
| 2012/0035931 A1 | 2/2012 | Lebeau et al. |
| 2012/0035932 A1 | 2/2012 | Jitkoff et al. |
| 2012/0042343 A1 | 2/2012 | Laligand et al. |
| 2012/0109509 A1 | 5/2012 | Nesbitt et al. |
| 2012/0221978 A1 | 8/2012 | Matas et al. |
| 2012/0287218 A1 | 11/2012 | Ok |
| 2012/0311478 A1 | 12/2012 | Van Os et al. |
| 2013/0055163 A1 | 2/2013 | Matas et al. |
| 2013/0097173 A1 | 4/2013 | Stovicek et al. |

FOREIGN PATENT DOCUMENTS

| | | |
|---|---|---|
| CN | 101430697 A | 5/2009 |
| DE | 10 2005 047 648 | 4/2007 |
| DE | 10 2008 008 948 | 8/2009 |
| EP | 464712 A2 | 1/1992 |
| EP | 0 713 187 A2 | 5/1996 |
| EP | 0 908 835 A2 | 4/1999 |
| EP | 1245023 A1 | 10/2002 |
| EP | 1347361 A1 | 9/2003 |
| EP | 1517228 A2 | 3/2005 |
| EP | 1 653 376 A2 | 5/2006 |
| EP | 1 677 497 A1 | 7/2006 |
| EP | 1 840 511 A1 | 10/2007 |
| EP | 2077436 A1 | 7/2009 |
| GB | 2 347 593 A | 9/2000 |
| JP | 6-19965 A | 1/1994 |
| JP | 09 259063 | 10/1997 |
| JP | 9-265457 A | 10/1997 |
| JP | 2000-59422 A | 2/2000 |
| JP | 2000-99225 A | 4/2000 |
| JP | 2000 105772 | 4/2000 |
| JP | 2001-125896 A | 5/2001 |
| JP | 2002-24212 A | 1/2002 |
| JP | 2002-82893 A | 3/2002 |
| JP | 2002-351789 A | 12/2002 |
| JP | 2003-517158 A | 5/2003 |
| JP | 2003 233568 | 8/2003 |
| JP | 2005-86624 A | 3/2005 |
| JP | 2005-92441 A | 4/2005 |
| JP | 2009-36999 A | 2/2009 |
| KR | 10-0776800 B1 | 11/2007 |
| KR | 10-0810500 B1 | 3/2008 |
| KR | 10-2008-0109322 A | 12/2008 |
| KR | 10-2009-0086805 A | 8/2009 |
| KR | 10-0920267 B1 | 10/2009 |
| KR | 10-2011-0113414 A | 10/2011 |
| TW | 200942784 A | 10/2009 |
| WO | WO 97/07467 A1 | 2/1997 |
| WO | WO 98/07112 A2 | 2/1998 |
| WO | WO 98/33111 A1 | 7/1998 |
| WO | WO 01/23985 A1 | 4/2001 |
| WO | WO 01/79980 A1 | 10/2001 |
| WO | WO 03/017120 A1 | 2/2003 |
| WO | WO 03/056789 A1 | 7/2003 |
| WO | WO 2004/076977 A1 | 9/2004 |
| WO | WO 2005/104039 A2 | 11/2005 |
| WO | WO 2006/013485 A2 | 2/2006 |
| WO | WO 2006/020305 A2 | 2/2006 |

(56) References Cited

FOREIGN PATENT DOCUMENTS

| | | |
|---|---|---|
| WO | 2006/129967 A1 | 12/2006 |
| WO | 2007/131225 A2 | 11/2007 |
| WO | 2008/081521 A1 | 7/2008 |
| WO | WO 2009/002942 A2 | 12/2008 |
| WO | 2011/088053 A2 | 7/2011 |

OTHER PUBLICATIONS

Arar, Y., "Microsoft Reveals Office 2003 Prices, Release," PC World, Aug. 19, 2003, http://www.pcworld.com/article/112077/microsoft_reveals_office_2003_prices_release.html, 3 pages.

Ars Technica, "CoverFlow : my visual album browser needs your help" posted on Ars Technica forum Jun. 27, 2005, 37 pages, http://arstechnica.com/civis/viewtopic.php?f=19&t=313706>.

AV Bros., "AV Bros. Page Curl 2.0 for Windows and Mac OS X," AV Bros. Curl 2.0 User Guide, 2004, 26 pages, http://c0002649.cdn2.cloudfiles.rackspacecloud.com/avpagecurl20.pdf.

Carew, S., "Phones that tell you where to Drive, Meet, Eat," 2 pages, May 25, 2007.

Chartier, D., "Using Multi-Network Meebo Chat Service on Your iPhone," tuaw.com, posted Jul. 4, 2007, http://www.tuaw.com/2007/07/04/using-multi-network-meebo-chat-service-on-your-iphone/.

Dalrymple, J., "Google Maps Adds Locator, but not for iPhone," 2007, 1 page, http://news.yahoo.com/s/macworld/20071130/tc_macworld/googlemaps20071130_0&printer=1;_ylt+Auvf3s6LQK_p)ajtb954T_DQni6gB.

"Dearman et al., ""Rendezvousing with Location-Aware Devices: Enhancing Social Coordination,""Interacting with Computers, vol. 17, Issue 5, Sep. 2005, pp. 542-566, http://www.dgp.toronto.edu/~dearman/publications/dearman_IWC05.pdf".

del Strother, Jonathan, "CoverFlow," http://www.steelskies.com/coverflow, printed Jun. 15, 2006, 14 pages.

Dilger, D., "Using iPhone: iCal, CalDAV Calendar Servers, and Mac OS X Leopard," Jul. 21, 2007, 10 pages, http://www.roughlydrafted.com/2007/07/21/using-iphone-ical-caldav-calendar-servers-and-mac-os-x-lopard-2/.

Dornfest. "Google Hacks." Third Edition, Aug. 3, 2006, O'Reilly Media, Inc., 5 pages.

Enright, A., "Dissatisfaction Sows Innovation," The Treehouse + The Cave, , http://web.archive.org/web/20050331055401/http://thetreehouseand . . . , Figures A & B, http://web.archive.org/web/20061221232052/photos3.flickr.com, Dec. 29, 2004, 6 pages.

Enright, A., "Meet CoverFlow," The Treehouse + The Cave, Aug. 13, 2005, 2 pages.

Enright, A., "Visual Browsing on an iBook DS," The Treehouse + The Cave, Dec. 29. 2004, 1 page.

Flipping Book, "Premium Page Flipping," Flipping Book.com, downloaded Nov. 12, 2009, 1 page, http://web.archive.org/web/20041207072330/http://www.page-flip.com/.

Gears, "Orange SPV C600 Review," coolsmartphone.com, Apr. 14, 2006, 58 pages, http://www.coolsmartphone.com/article569.html.

Gmail, "About Group Chat," Nov. 26, 2007, 2 pages, http://mail.googles.com/support/bin/answer.py?answer=81090.

Goehl, D., et al., "Motion Sensors Gaining Inertia with Popular Consumer Electronics," White Paper, InvensSense, Inc., (2007), 5 pages.

Google, "Google Calendar," http://en.wikipedia.org/w/index.php?title=Google_Calendar&printable=yes, 4 pages, Feb. 4, 2008.

Google, "Google Calendar Tour," http://www.google.com/intl/en/googlecalendar/tour.html, 10 pages, printed Jun. 3, 2008.

Google, "Google Maps Shows Real-Time Traffic Data," Google Operating System, Feb. 28, 2007, 1 pg., http://googlesystem.blogspot.com/2007/02/google-maps-shows-real-time-traffic.html.

Google, "Review Guide—Google Maps for Mobile (Beta)," 7 pages, 2006.

Gralla, "Google™ Search and Tools in a Snap," Sams, Apr. 4 2006, 15 pages.

GSMArena Team, "Sony Ericsson P990 review: A coveted smartphone," [Online] Dec. 27, 2006 http://web.archive.org/web/20061227185520/http://www.gsmarena.com/sony_ericsson_p990-review-101p8.php.

Hinckley et al., "Sensing Techniques for Mobile Interaction," UIST 2000 Symposium on User Interface Software and Technology, CHI Letters 2 (2), Nov. 2000, San Diego, CA, 10 pages.

Hinze, C. "Cover Flow—A Beautiful Way to Browse your MP3s," NOISE Blog, Feb. 5, 2006, http://noise.typepad.com/noise_blog/2006/02/cover_flow_the_.html, 2 pages.

Holthe et al., "Video Browsing Techniques for Web Interfaces," 2005, 5 pages, http://ieeexplore.ieee.org/Xplore/login.jsp?url=http%3A%2F%2Fieeexplore.ieee.org%2Fstamp.jsp%3Farnumber%3D01593233&authDecision=-203.

IBM, "Mechanism for Visual Lists and Selections," IBM Technical Disclosure Bulletin, IBM, vol. 40, No. 5, May 1, 1997, 2 page.

iChat AV, "Videoconferencing for the Rest of Us," Apr. 13, 2006 3 pages, http://www.apple.com/macosx/features/ichat.html.

iPhone Hacks, "iPhone Software/Hardware Hack: LocoGPS—Add-on for the iPhone," 41 pages, Dec. 25, 2007, http://www.iphonehacks.com/iphone_applications/index.html.

iPhone Hacks, "Native iPhone MMS Application Released," downloaded Dec. 25, 2007, http://www.iphonehacks.com/2007/12/iphone-mms-app.html.

Kazez, B., "Ical Events," downloaded Mar. 17, 2008, http://www.benkazez.com/icalevents.php, 2 pages.

Kim, "Video-in and Magnetometers Could Introduce interesting iPhone App Possibilities," Mac Rumors, Apr. 8, 2009, http://www.macrumors.com/2009/04/08/video-in-and-magnetometers-could-introduce-interesting-iphone-app-possibilities, 5 pages.

McLean, P., "Road to Mac OS X Leopard: iCal 3.0" AppleInsider, Oct. 17, 2007, 6 pages, http://www.appleinsider.com/articles/07/10/17/road_to_mac_os_x_leopard_ical_3_0.html.

McLean, P., "Road to Mac OS X Leopard: iCal 3.0 [p. 2]," AppleInsider, Oct. 17, 2007, 7 pages, http://www.appleinsider.com/articles/07/10/17/road_to_mac_os_x_leopard_ical_3_0.html&page=3.

McLean, P., "Road to Mac OS X Leopard:iCal3.0 [p. 3]," AppleInsider, Oct. 17, 2007, 5 pages, http://www.appleinsider.com/articles.07/10/17/road_to_mac_os_x_leopard_ical_3_0.html&page=3.

Microsoft, "Outlook 2003 Basic Guide," modified Aug. 15, 2005, 32 pages, http://it.med.miami.edu/documents/outlook_2003_guide.pdf.

Microsoft, "Microsoft Outlook Calendar," tutorial, downloaded May 3, 2012, http://emedia.leeward.hawaii.edu/teachtech/documents/Personal_Manage/MSOutlook_Cal.pdf, 9 pages.

Microwaves RF, "MS Motion Sensors Boost Handset Reliability," http://www.mwrf.com/Articies/Print.cfm?ArticieID=12740, Copyright © 2004, Penton Media, Inc., 4 pages.

Milner, N., "A Review of Human Performance and Preferences with Different Input Devices to Computer Systems," Proceedings of the 4th Conference of the British Computer Society on People and Computers, Cambridge University Press. 1988, 22 pages.

Mine, M., "Virtual Environment Interaction Techniques," University of North Carolina, Chapel Hill, May 5, 1995, 18 pages.

Miniman, "ApplianSoftware's Replay Radio and Player v1.02," product review, pocketnow.com, http://www.pocketnow.com/reviews/replay/replay.htm, Jul. 31, 2001, 16 pages.

Mio "User's Manual MioMap 2.0," Mio Technology, Aug. 2005, http://web.archive.org/web/200612140000736/http://www.mio-tech.be/Manuals/269+/MioMapV2-Manual/268+_269+_miomap_Manual_EN.pdf, 60 pages.

Mio, Mio 269+ User's Manual, Mio Technology, Aug. 2005, http://www.mio-tech.be/Manuals/269+/Device-Manual/268-plus-269-plus-Device-Manual-EN.pdf, 44 pages.

Mio, "27 Countries in Your Pocket," Mio Technology, Sep. 2005, http://www.mio-tech.be/en/printview/press-releases-2005-09-29.htm, 1 page.

Mio, "MioMap v 3.2 User Manual—Navigation software for Mio DigiWalker C310," Aug. 2006 (v1.00), US English version, http://www.gpspassion.com/upload/MioMap_englishUS.pdf, 84 pages.

Mol, H., "Plan Your Trip With Google Maps," Visual Steps, Dec. 2009, 36 pages, http://www.visualsteps.com/downloads/Free_guide_google_maps.pdf.

(56) References Cited

OTHER PUBLICATIONS

Moren, D., "Review: Google Calendar," Macworld, 3 pages, Jun. 4, 2008, http://news.yahoo.com/s/macworld/20080604/tc_macworld/reviewgooglecalendar_0.
Navizon, "FAQ, Peer-to-Peer Wireless Positioning," 8 pages, Nov. 30, 2007, http://www.navizon.com/FAQ.htm.
Navizon, "How it Works," 7 pages, Nov. 30, 2007, http://www.navizon.com/FullFeatures.htm.
Navizon, "The First Positioning System that Combines GPS, WiFi and Phone Positioning," 2 pages, Nov. 30, 2007, http://www.navizon.com.
Padilla, A., Palm Treo 750 Cell Phone Review-Messaging, published Mar. 17, 2007, 6 pages, http://www.wirelessinfo.com/content/palm-Treo-750-Cell-Phone-Review/Messaging.html.
Palm User Guide 755 pages, ® 2005-2007, 280 pages.
Pixlewit, "PageFlip," Apr. 11, 2007, 1 page, http://web.archive.org/web/20070419035158/http://pixelwit.com/blog/page-flip/.
Potala Software, "My Time!" Jun. 6, 2006, 3 pages, http://web.archive.org/web/20060615204517/potalasoftware.com/Products/MyTime/Default.aspx.
Publictivity, "iPhoneChat-iChat for iPhone in Javascript," Dec. 25, 2007, 2 pages, http://www.publictivity.com/iPhoneChat/.
Rose, M., "Music in the Home: Interfaces for Music Appliances," Personal Technologies (2000), 4:45-53, 8 pages.
Sawyer, B., "Get with the CoverFlow," The Olive Press, Dec. 8, 2005, 2 pages.
The Boy Genius, "Magnetometer in next iPhone confirmed?" The Boy Genius Report, May 7, 2009, http://www.boygeniusreport.com/2009/05/07/magnetometer-in-next-iphone-confirmed/, 15 pages.
Tidwell, J., "Designing Interfaces," Copyright ® 2006 O'Reilly Media, Inc., 348 pages.
Tidwell, J., "Animated Transition," from Designing Interfaces, O'Reilly Media Inc., Nov. 2005, pp. 84-85.
Waypoints Maplist View, "Featured Projects," Jun. 14, 2007, 3 pages, http://eric.wahlforss.com/folio.
Westerman, W., "Hand Tracking Finger Identification and Chordic Manipulation on a Multi-touch Surface," Doctoral Dissertation, submitted Spring 1999, 363 pages.
Wikipedia, "iCal," Wikipedia, the Free Encyclopedia, updated Dec. 28, 2007, http://en.wikipedia.org/wiki/iCal, 3 pages.
Wikipedia, "iCalendar," Wikipedia the Free Encyclopedia, Jan. 16, 2008, http://en.wikipedia.org/wiki/Icalendar, 79 pages.
Windows Mobile 6, "Fact Sheet," 2 pages, 2007, www.WindowsMobile.com.
Windows Mobile 6 Professionai Video Tour, Mar. 11, 2007, 4 pages, http://gizmodo.com/gadges/cellphones/windows-mobile-6-professional-video-tour-237039.php.
Windows Mobile Map Contact List, "Windows Live Search for Mobile Goes Final, Still Great," Mar. 11, 2007, 3 pages, http://gizmodo.com/gadgets/software/windows-live-search-for-mobile-goes-final-still-great-23600.php.
Wirelessinfo, "SMS/MMS Ease of Use (8.0)," Mar. 2007, 3 pages, http://www.wirelessinfo.com/content/palm-Treo-750-Cell-Phone-Review/Messaging.htm.
Zelig, "A Review of the Palm Treo 750v," Feb. 5, 2007, 3 pages, http://www.mtekk.com.au/Articles/tabid/54/articleType/ArticleView/articleid/769/A-Review-of-the-Palm-Treo-750v.aspx.
Invitation to Pay Additional Fees dated Apr. 29, 2008, received in International Application PCT/US2007/077424, which corresponds to U.S. Appl. No. 11/848,208, 6 pages (Lemay).
International Search Report dated Jun. 19, 2008, received in International Application No. PCT/US2007/077424, which corresponds to U.S. Appl. No. 11/848,208, 17 pages (Lemay).
Invitation to Pay Additional Fees dated Jun. 23, 2008, received in International Application No. PCT/US2008/050423, which corresponds to U.S. Appl. No. 11/969,786, 11 pages (Lemay).
International Search Report and Written Opinion dated Sep. 1, 2008, received in International Application No. PCT/US2008/050423, which corresponds to U.S. Appl. No. 11/969,786, 19 pages (Lemay).
International Search Report and Written Opinion dated Jun. 5, 2008, received in International Application No. PCT/US2008/050428, which corresponds to U.S. Appl. No. 11/969,800, 17 pages (Forstall).
Invitation to Pay Additional Fees dated Jul. 29, 2008, received in International Application No. PCT/US2008/050295, which corresponds to U.S. Appl. No. 11/969,211, 10 pages (Matas).
International Search Report and Written Opinion dated Jan. 14, 2009, received in International Application No. PCT/US2008/050295, which corresponds to U.S. Appl. No. 11/969,211, 25 pages (Matas).
Invitation to Pay Additional Fees dated Oct. 13, 2008, received in International Application No. PCT/US2008/067925, which corresponds to U.S. Appl. No. 12/143,752, 7 pages (Matas).
International Search Report and Written Opinion dated Dec. 17, 2008, received in International Application No. PCT/US2008/067925, which corresponds to U.S. Appl. No. 12/143,752, 22 pages (Matas).
International Preliminary Report on Patentability dated Jan. 7, 2010, received in International Application No. PCT/US2008/067925, which corresponds to U.S. Appl. No. 12/143,752, 14 pages (Matas).
Invitation to Pay Additional Fees dated Dec. 1, 2011, received in International Patent Application No. PCT/US2010/020229, which corresponds to U.S. Appl. No. 12/788,281, 4 pages (van Os).
International Search Report and Written Opinion dated Apr. 12, 2012, received in International Application No. PCT/US2010/020229, which corresponds to U.S. Appl. No. 12/788,281, 18 pages (van Os).
Office Action dated Apr. 20, 2011, received in U.S. Appl. No. 11/848,208, 19 pages (Lemay).
Final Office Action dated Nov. 4, 2011, received in U.S. Appl. No. 11/848,208, 7 pages (Lemay).
Office Action dated Nov. 7, 2011, received in Canadian Patent Application No. 2,661,886, which corresponds to U.S. Appl. No. 11/848,208, 3 pages (Lemay).
Office Action dated Dec. 6, 2010, received in Chinese Application No. 200780041351.5, which corresponds to U.S. Appl. No. 11/848,208, 5 pages (Lemay).
Office Action dated Nov. 3, 2011, received in Chinese Patent Application No. 200780041351.5, which corresponds to U.S. Appl. No. 11/848,208, 14 pages (Lemay).
Office Action dated Aug. 3, 2012, received in Chinese Patent Application No. 200780041351.5, which corresponds to U.S. Appl. No. 11/848,208. 6 pages (Lemay).
Decision to Grant dated Jun. 12, 2013, received in Chinese Patent Application No. 200780041351.5, which corresponds to U.S. Appl. No. 11/848,208, 3 pages (Lemay).
Office Action dated Feb. 18, 2011, received in European Patent Application No. 07 841 749.0, which corresponds to U.S. Appl. No. 11/848,208, 4 pages (Lemay).
Examination Report dated Nov. 14, 2012, received in European Patent Application No. 07841749.0, which corresponds to U.S. Appl. No. 11/848,208, 5 pages (Lemay).
Office Action dated Sep. 14, 2011, received in Japanese Patent Application No. 2009-527503, which corresponds to U.S. Appl. No. 11/848,208, 7 pages (Lemay).
Decision to Grant dated Oct. 12, 2012, received in Japanese Patent Application No. 2009527503, which corresponds to U.S. Appl. No. 11/848,208, 4 pages (Lemay).
Office Action dated Feb. 11, 2011, received in U.S. Appl. No. 11/969,786, 29 pages (Lemay).
Final Office Action dated Jun. 15, 2011, received in U.S. Appl. No. 11/969,786, 22 pages (Lemay).
Office Action dated Dec. 8, 2011, received in U.S. Appl. No. 11/969,786, 21 pages (Lemay).
Final Office Action dated May 9, 2012, received in U.S. Appl. No. 11/969,786, 39 pages (Lemay).
Office Action dated Feb. 16, 2011, received in U.S. Appl. No. 11/969,800, 31 pages (Forstall).
Final Office Action dated Jun. 15, 2011, received in U.S. Appl. No. 11/969,800, 25 pages (Forstall).
Office Action dated Jan. 20, 2012, received in U.S. Appl. No. 11/969,800, 26 pages (Forstall).
Office Action dated May 22, 2012, received in U.S. Appl. No. 11/969,800, 53 pages (Forstall).

(56) References Cited

OTHER PUBLICATIONS

Final Office Action dated Nov. 5, 2012, received in U.S. Appl. No. 11/969,800, 61 pages (Forstall).
Office Action dated Feb. 25, 2011, received in U.S. Appl. No. 11/969,211, 27 pages (Matas).
Final Office Action dated Aug. 17, 2011, received in U.S. Appl. No. 11/969,211, 26 pages (Matas).
Office Action dated Oct. 19, 2011, received in U.S. Appl. No. 12/242,846, 19 pages (Christie).
Final Office Action dated Jun. 5, 2012, received in U.S. Appl. No. 12/242,846, 16 pages (Christie).
Office Action dated Jun. 13, 2012, received in U.S. Appl. No. 12/163,908, 21 pages (Christie).
Final Office Action dated Nov. 7, 2012, received in U.S. Appl. No. 12/163,908, 15 pages (Christie).
Office Action dated Jan. 25, 2011, received in U.S. Appl. No. 12/143,741, 24 pages (Mates).
Notice Of Allowance dated Jul. 12, 2011, received in U.S. Appl. No. 12/143,741, 5 pages (Matas).
Notice of Allowance dated Dec. 30, 2011, received in U.S. Appl. No. 12/143,741, 7 pages (Matas).
Office Action dated May 17, 2011, received in U.S. Appl. No. 12/143,752, 44 pages (Matas).
Final Office Action dated Dec. 23, 2011, received in U.S. Appl. No. 12/143,752, 20 pages (Matas).
Notice of Allowance dated Sep. 17, 2012, received in U.S. Appl. No. 12/143,752, 13 pages (Matas).
Office Action dated May 21, 2012, received in U.S. Appl. No. 12/242,856, 17 pages (Anzures).
Notice of Allowance dated Oct. 18, 2012, received in U.S. Appl. No. 12/242,856, 8 pages (Anzures).
Office Action dated Jun. 18, 2012. received in U.S. Appl. No. 12/566,668, 40 pages (Blumenberg).
Notice of Allowance dated Oct. 23, 2012, in U.S. Appl. No. 12/566,668, 12 pages (Blumenberg).
Notice of Allowance dated Feb. 7, 2013, received in U.S. Appl. No. 12/566,668, 12 pages (Blumenberg).
Office Action dated Feb. 17, 2012, received in U.S. Appl. No. 12/785,281, 14 pages (van Os).
Office Acton dated Sep. 26, 2012, received in U.S. Appl. No. 12/788,281, 14 pages (Van Os).
Final Office Action dated May 10, 2013, received in U.S. Appl. No. 12/788,281, 14 pages (van Os).
Office Action dated Apr. 15, 2013, received in Australian Patent Application No. 2010340369, which corresponds to U.S. Appl. No. 12/788,281, 5 pages (van Os).
Notice of Allowance dated Feb. 8, 2013, received in U.S. Appl. No. 12/726,247, 20 pages (Christie).
Notice of Allowance dated Jun. 12, 2013, received in U.S. Appl. No. 11/767,409, 26 pages (Chaudhri).
Office Action dated Dec. 6, 2012, received in Australian Patent Application No. 2011250783, which corresponds to U.S. Appl. No. 11/767,409, 3 pages (Chaudhri).
Notice of Acceptance dated May 16, 2013, received in Australian Patent Application No. 2011250783, which corresponds to U.S. Appl. No. 11/767,409, 2 pages (Chaudhri).
Office Action dated Jan. 3, 2013, received in Canadian Patent Application No. 2,661,200, which corresponds to U.S. Appl. No. 11/767,409, 5 pages (Chaudhri).
Grant Certificate dated Jan. 18, 2013, issued in Hong Kong Patent Application No, 12104856.1, which corresponds to U.S. Appl. No. 11/767,409, 3 pages (Chaudhri).
Grant Certificate dated Jan. 18, 2013, issued in Hong Kong Patent Application No. 12105182.3, which corresponds to U.S. Appl. No. 11/767,409, 3 pages (Chaudhri).
Notice of Allowance dated Jun. 26, 2013, received in Korean Patent Application No. 10 2012 7019029, which corresponds to U.S. Appl. No. 11/767,409, 2 pages (Chaudhri).
Office Action dated Aug. 15, 2013, received in U.S. Appl. No. 12/215,651, 30 pages (Chaudhri).
Office Action dated Jul. 8, 2013, received in U.S. Appl. No. 12/395,537, 23 pages (Chaudhri).
Office Action received for Canadian Patent Application No. 2,661,886, mailed on Jul. 14, 2010, 3 pages.
Al-Baker, Asri, "AquaCalendar, a Review by i-Symbian.Com", available at <http://www.i-symbian.com/forum/images/articles/40/AquaCalendar_Review.pdf>, 2005, 11 pages.
Daimlerchrysler, "Usecases Overview Map", 1 page. (Publication date not available).
Palmone, "Your Mobile Manager", Chapter 2, LifeDrive™ User's Guide, available at <http://www.palm.com/us/support/handbooks/lifedrive/en/lifedrive_handbook.pdf>, 2005, 23 pages.
Intention to Grant received for European Patent Application No. 12187505.8, mailed on Aug. 19, 2013, 7 pages.
Office Action received for Korean Patent Application No. 10-2012-7020652, mailed on Sep. 24, 2013, 7 pages (3 pages of English Translation and 4 pages of Official copy).
Notice of Allowance received for U.S. Appl. No. 12/789,440, mailed on Jan. 14, 2013, 7 pages.
Notice of Allowance received for U.S. Appl. No. 12/789,440, mailed on Jun. 26, 2012, 9 pages.
Non-Final Office Action received for U.S. Appl. No. 12/788,281, mailed on Oct. 15, 2013, 13 pages.
Office Action received for Australian Patent Application No. 2014202094, issued on Apr. 21, 2015, 3 pages.
Notice of Allowance received for Korean Patent Application No. 10-2012-7022248, mailed on Apr. 29, 2015, 2 pages.
Office Action received for Korean Patent Application No. 10-2012-7022253, mailed on Apr. 29, 2015, 4 pages.
International Preliminary Report on Patentability received for PCT Patent Application No. PCT/US2007/077424, issued on Mar. 10, 2009, 9 pages.
International Preliminary Report on Patentability received for PCT Patent Application No. PCT/US2008/050295, mailed on Jul. 7, 2009, 12 pages.
International Preliminary Report on Patentability received for PCT Patent Application No. PCT/US2010/020229, mailed on Jul. 19, 2012, 13 pages.
International Search Report and Written Opinion received for PCT Patent Application No. PCT/US2011/020861, mailed on Nov. 29, 2011, 15 pages.
Extended European Search Report (includes Partial European Search Report and European Search Opinion) received for European Patent Application No. 13155688.8, mailed on Aug. 22, 2013, 11 pages.
Decision to Grant Received for European Patent Application No. 12187505.8, mailed on Feb. 13, 2014,, 2 pages.
European Search Report received for European Patent Application No. 12187505.8, mailed on Jan. 14, 2013, 3 pages.
Office Action received for European Patent Application No. 12187505.8, mailed on Feb. 12, 2013, 5 pages.
Office Action received for Korean Patent Application No. 10-2012-7020652, mailed on Aug. 4, 2014, 5 pages. (2 pages of English Translation and 3 pages of Official copy).
Office Action received for Korean Patent Application No. 10-2012-7022248, mailed on Jun. 12, 2014, 7 pages(3 pages of English Translation & 4 copy of Official Copy).
Office Action received for Korean Patent Application No. 10-2012-7022253, mailed on Jun. 12, 2014, 8 pages (4 pages of English Translation & 4 pages of Official copy).
Notice of Intent to Issue a Reexam Certificate received for U.S. Appl. No. 90/013,163, mailed on Jan. 29, 2015, 22 pages.
Reexam Non-Final Office Action received for U.S. Appl. No. 90/013,163, mailed on Aug. 1, 2014, 45 pages.
Request for Ex Parte Reexamination and Exhibit 9, parts A to L, mailed on Feb. 25, 2014, for U.S. Appl.No. 90/013,163, filed Feb. 25, 2014.
Final Office Action received for U.S. Appl. No. 10/428,523, mailed on Apr. 22, 2009, 22 pages.
Final Office Action received for U.S. Appl. No. 10/428,523, mailed on Nov. 29, 2007, 19 pages.
Non-Final Office Action received for U.S. Appl. No. 10/428,523, mailed on Apr. 12, 2007, 11 pages.

(56) References Cited

OTHER PUBLICATIONS

Non-Final Office Action received for U.S. Appl. No. 10/428,523, mailed on Jul. 9, 2008, 19 pages.
Notice of Allowance received for U.S. Appl. No. 10/428,523, mailed on Oct. 5, 2009, 10 pages.
Notice of Restriction Requirement received for U.S. Appl. No. 10/428,523, mailed on Dec. 29, 2006, 4 pages.
Final Office Action received for U.S. Appl. No. 11/688,664, mailed on Feb. 22, 2010, 18 pages.
Final Office Action received for U.S. Appl. No. 11/688,664, mailed on Mar. 15, 2011, 19 pages.
Non-Final Office Action received for U.S. Appl. No. 11/688,664, mailed on Jul. 19, 2012, 16 pages.
Non-Final Office Action received for U.S. Appl. No. 11/688,664, mailed on Jul. 22, 2009, 16 pages.
Non-Final Office Action received for U.S. Appl. No. 11/688,664, mailed on Sep. 29, 2010, 23 pages.
Notice of Allowance received for U.S. Appl. No, 11/688,664, mailed on Feb. 8, 2013, 12 pages.
Final Office Action received for U.S. Appl. No. 11/848,208, mailed on Oct. 9, 2014, 15 pages.
Non-Final Office Action received for U.S. Appl. No. 11/848,208, Dec. 23, 2013, 13 pages.
Non-Final Office Action received for U.S. Appl. No. 11/848,208, mailed on Apr. 1, 2011, 8 pages.
Supplemental Non-Final Office Action received for U.S. Appl. No. 11/848,208, mailed on Apr. 20, 2011, 17 pages.
Non-Final Office Action received for U.S. Appl. No. 11/969,211, mailed on Sep. 20, 2012, 27 pages.
Notice of Allowance received for U.S. Appl. No. 11/969,211, mailed on May 15, 2013, 25 pages.
Notice of Allowance received for U.S. Appl. No. 12/242,846, mailed on Dec. 7, 2012, 9 pages.
Notice of Allowance received for U.S. Appl. No. 12/242,846, mailed on Feb. 5, 2013, 9 pages.
Final Office Action received for U.S. Appl. No. 12/726,247, mailed on Mar. 18, 2011, 28 pages.
Non-Final Office Action received for U.S. Appl. No. 12/726,247, mailed on Jul. 18, 2012, 23 pages.
Non-Final Office Action received for U.S. Appl. No. 12/726,247, mailed on Sep. 28, 2010, 27 pages.
Notice of Allowance received for U.S. Appl. No. 12/726,247, mailed on May 30, 2013, 10 pages.
Notice of Allowance received for U.S. Appl. No. 12/788,281, mailed on Jun. 4, 2014, 9 pages.
Notice of Allowance received for U.S. Appl. No. 12/789,440, mailed on Apr. 23, 2013, 2 pages.
Non-Final Office Action received for U.S. Appl. No. 13/662,370, mailed on Dec. 10, 2014, 32 pages.
Non-Final Office Action received for U.S. Appl. No. 13/662,370, mailed on Mar. 25, 2014, 35 pages.
Non Final Office Action received for U.S. Appl. No. 13/908,998, mailed on Mar. 3, 2015, 26 pages.
Notice of Allowance received for Canadian Patent Application No. 2,661,886, mailed on Jan. 7, 2014, 1 page.
Office Action received for Chinese Patent Application No. 201080001767.6, mailed on Sep. 16, 2014, 11 pages.
Decision to Grant received for Japanese Patent Application No. 2012-246631, mailed on May 11, 2015, 6 pages (3 pages of English Translation and 3 pages of Official copy).
Office Action received for Japanese Patent Application No. 2012-246631, mailed on Nov. 18, 2013, 4 pages (2 pages of English Translation and 2 pages of Official Copy).
Office Action received for Japanese Patent Application No. 2012-246631, mailed on Oct. 17, 2014, 5 pages.
Ahuja et a., "A Comparison of Application Sharing Mechanisms in Real-Time Desktop Conferencing Systems", At&T Bell Laboratories,, 1990, pp. 238-248.
Alfred App, "Alfred", available at <http://www.alfredapp.com/>, retrieved on Feb. 8, 2012, 5 pages.
Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, DataBases, and Applications of Semantics (ODBASE), 2005, 18 pages.
Apple.com, "Maps with GPS", available at <http://www.apple.com/iphone/features/maps.html>, May 2009, 2 pages.
Arango et al., "Touring Machine: A Software Platform for Distributed Multimedia Applications", 1992 IFIP International Conference on Upper Layer Protocols, Architectures, and Applications. May 1992, pp. 1-11.
Belvin et al., "Development of the HRL Route Navigation Dialogue System", Proceedings of the First International Conference on Human Language Technology Research, Paper, 2001, 5 pages.
Berry et al., "PTIME: Personalized Assistance for Calendaring", ACM Transactions on Intelligent Systems and Technology, vol. 2, No. 4, Article 40, Jul. 2011, pp. 1-22.
Betts et al., "Goals and Objectives for User Interface Software", Computer Graphics, vol. 21, No. 2, Apr. 1987, pp, 73-78.
Bleher et al., "A Graphic Interactive Application Monitor", IBM Systems Journal, vol. 19, No. 3, Sep. 1980, pp. 382-402.
Borenstein, Nathaniel S., "Cooperative Work in the Andrew Message System", Information Technology Center and Computer Science Department, Carnegie Mellon University; Thyberg, Chris A. Academic Computing, Carnegie Mellon University, 1988, pp. 306-323.
Bussler et al., "Web Service Execution Environment (WSMX)", retrieved from Internet on Sep. 17, 2012, available at <http://www.w3.org/Submission/WSMX>, Jun. 3, 2005, 29 pages.
Butcher, Mike, "EVI Arrives in Town to go Toe-to-Toe with Siri", TechCrunch, Jan. 23, 2012, pp. 1-2.
Buxton et al., "EuroPARC's Integrated Interactive Intermedia Facility (IIIF): Early Experiences", Proceedings of the IFIP WG 8.4 Conference on Multi-User Interfaces and Applications, 1990, pp. 11-34.
Casner et al., "N-Way Conferencing with Packet Video", The Third International Workshop on Packet Video, Mar. 22-23, 1990, pp. 1-6.
Chen, Yi, "Multimedia Siri Finds and Plays Whatever you Ask For", PSFK Report, Feb. 9, 2012, pp. 1-9.
Cheyer, Adam, "A Perspective on AI & Agent Technologies for SCM", VerticalNet presentation, 2001, 22 pages.
Cheyer, Adam, "About Adam Cheyer", available at <http://www.adam.cheyer.com/about.html>, retrieved on Sep. 17, 2012, pp. 1-2.
Cheyer et al., "Spoken Language and Multimodal Applications for Electronic Realties", Virtual Reality, vol. 3, 1999. pp. 1-15.
Conklin, Jeffrey, "A Survey of Hypertext", MCC Software Technology Program, Dec. 1987, 40 pages.
Croft et al., "Task Support in an Office System", Proceedings of the Second ACM-SIGOA Conference on Office Information Systems, 1984, pp. 22-24.
Crowley et al., "MMConf: An Infrastructure for Building Shared Multimedia Applications", CSCW 90 Proceedings, Oct. 1990, pp. 329-342.
Cutkosky et al., "PACT: An Experiment in Integrating Concurrent Engineering Systems", Journal, Computer, vol. 26, No. 1, Jan. 1993, pp. 0-13.
Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.
Donahue et al., "Whiteboards: A Graphical Database Tool", ACM Transactions on Office Information Systems, vol. 4, No. 1, Jan. 1986, pp. 24-41.
Dourish et al., "Portholes: Supporting Awareness in a Distributed Work Group", Proceedings of the SIGCHI conference on Human factors in Computing Systems, May 1992, pp. 541-547.
Egido, Carmen, "Video Conferencing as a Technology to Support Group Work: A Review of its Failures", Bell Communications Research, 1988, pp. 13-24.
Elio et al., "On Abstract Task Models and Conversation Policies", Proc. Workshop on Specifying and Implementing Conversation Policies, Autonomous Agents'99 Conference, 1999, pp, 1-10.

(56) References Cited

OTHER PUBLICATIONS

Elliot, Chip, "High-Quality Multimedia Conferencing Through a Long-Haul Packet Network", BBN Systems and Technologies,, 1993, pp. 91-98.
Ericsson et al, "Software Illustrating a Unified Approach to Multimodality and Multilinguality in the in-home Doman". Talk and Look: Tools for Ambient Linguistic Knowledge, Dec. 2006, 127 pages.
Evi, "Meet Evi: The One Mobile Application that Provides Solutions for your Everyday Problems", Feb. 2012, 3 pages.
Feigenbaum et al., "Computer-Assisted Semantic Annotation of Scientific Life Works", Oct. 15, 2007, 22 pages.
Fisher et al, "Virtual Environment Display System", Interactive 3D Graphics, Oct. 23-24, 1986, pp. 77-87.
Forsdick, Harry, "Explorations into Real-Time Multimedia Conferencing", Proceedings of the Ifip Tc 6 International Symposium on Computer Message Systems, 1986, pp. 331-347.
Gannes, Liz, "Alfred App Gives Personalized Restaurant Recommendations", AllThingsD, Jul. 18, 2011, pp. 1-3.
Gardner, Jr., P. C., "A System for the Automated Office Environment", IBM Systems Journal, vol. 20, No. 3, 1981, pp. 321-345.
Gautier et al., "Generating Explanations of Device Behavior Using Compositional Modeling and Causal Ordering", CiteSeerx, 1993, pp. 89-97.
Gaver et al., "One is Not Enough: Multiple Views in a Media Space", INTERCHI, Apr. 24-29, 1993, pp. 335-341.
Gaver et al., "Realizing a Video Environment EuroPARC's RAVE System", Rank Xerox Cambridge EuroPARC, 1992, pp. 27-35.
Gervasio et al., "Active Preference Learning for Personalized Calendar Scheduling Assistancae", CiteSeerx, Proceedings of IUI'05,, Jan. 9-12, 2005, pp. 90-97.
Glass, Alyssa, "Explaining Preference Learning", CiteSeerx, 2006, pp. 1-5.
Glass et al., "Multilingual Spoken-Language Understanding in the Mit Voyager System", Available online at <http://groups.csail.mit.edu/sls/publications/1995/speechcomm95-voyager.pdf>, Aug. 1995, pp. 1-29.
Goddeau et al., "A Form-Based Dialogue Manager for Spoken Language Applications", http://phasedance.com/pdflicslp96.pdf, Oct. 1996, 4 pages.
Goddeau et al., "Galaxy: A Human-Language Interface to On-Line Travel Information", International Conference on Spoken Language Processing, Yokohama, 1994, pp. 707-710.
Good et al., "Building a User-Derived Interface", Communications of the ACM: (Oct. 1984) vol. 27, No. 10, Oct. 1984, pp. 1032-1043.
Google Operating System, "Google Maps in Search History", available at <http://googlesystem.blogspot.in/2006/11/google-maps-in-search-history.html>, Apr. 2005, 1 page.
Gruber, Tom, "(Avoiding) the Travesty of the Commons", Presentation at NPUC, New Paradigms for User Computing, IBM Almaden Research Center, Jul. 24, 2006, 52 pages.
Gruber, Tom, "2021: Mass Collaboration and the Really New Economy", TNTY Futures, vol. 1, No. 6. Available at <http://tomgruber.org/writing/tnty2001.htm>, Aug. 2001, 5 pages.
Gruber et al., "A Translation Approach to Portable Ontology Specifications", Knowledge Acquisition, vol. 5, No. 2, Jun. 1993, pp. 199-220.
Gruber et al., "An Ontology for Engineering Mathematics", Fourth International Conference on Principles of Knowledge Representation and Reasoning, Available at <http://www-ksl.stanford.edu/knowledge-sharing/papers/engmath.html>, 1994, pp. 1-22.
Gruber, Thomas R., "Automated Knowledge Acquisition for Strategic Knowledge", Machine Learning, vol. 4, 1989, pp. 293-336.
Gruber, Tom, "Big Think Small Screen: How Semantic Computing in the Cloud will Revolutionize the Consumer Experience on the Phone", Keynote presentation at Web 3.0 conference, Jan. 2010, 41 pages.

Gruber; Tom, "Collaborating Around Shared Content on the WWW, W3C Workshop on WWW and Collaboration", available at <http://www.w3.org/Collaboration/Workshop/Proceedings/P9.html>, Sep. 1995, 1 page.
Gruber, Tom, "Collective Knowledge Systems: Where the Social Web meets the Semantic Web", Web Semantics: Science, Services and Agents on the World Wide Web, 2007, pp. 1-19.
Gruber, Tom, "Despite our Best Efforts, Ontologies are not the Problem", AAAI Spring Symposium, Available at <http://tomgruber.org/writing/aaai-ss08.htm>, Mar. 2008, pp. 1-40.
Gruber, Tom, "Enterprise Collaboration Management with Intraspect", Intraspect Technical White Paper, Jul. 2001, pp. 1-24.
Gruber, Tom, "Every Ontology is a Treaty—A Social Agreement-Among People with Some Common Motive in Sharing", Official Quarterly Bulletin of AIS Special Interest Group on Semantic Web and Information Systems, vol. 1, No. 3, 2004, pp. 1-5.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber, Tom, "Helping Organizations Collaborate, Communicate, and Learn", Presentation to NASA Ames Research, available at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Thomas R., "Interactive Acquisition of Justifications: Learning "Why" by Being Told "What"", Knowledge Systems Laboratory, Technical Report KSL 91-17, Original Oct. 1990, Revised Feb. 1991, 24 pages.
Gruber, Tom, "It Is What It Does: The Pragmatics of Ontology for Knowledge Sharing", Proceedings of the International CIDOC CRM Symposium, Available at <http://tomgruber.org/writing/cidoc-ontology.htm>, Mar. 26, 2003, 21 pages.
Gruber et al., "Machine-generated Explanations of Engineering Models: A Compositional Modeling Approach", Proceedings of International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.
Gruber, Tom, "Ontologies, Web 2.0 and Beyond", Ontology Summit, available at <http://tomgruber.org/writing/ontolog-social-web-keynote.htm>, Apr. 24, 2007, 17 pages.
Gruber, Tom, "Ontology of Folksonomy: A Mash-up of Apples and Oranges", Int'l Journal on Semantic Web & Information Systems, vol. 3, No. 2, 2007, 7 pages.
Gruber, Tom, "Siri, A Virtual Personal Assistant-Bringing Intelligence to the Interface", Semantic Technologies conference, Jun. 16, 2009, 21 pages.
Gruber, Tom: "TagOntology", Presentation to Tag Camp, Oct. 29, 2005, 20 pages.
Gruber et al., "Toward a Knowledge Medium for Collaborative Product Development", Proceedings of the Second International Conference on Artificial Intelligence in Design, Jun. 22-25, 1992, pp. 1-19.
Gruber, Thomas R., "Toward Principles for the Design of Ontologies Used for Knowledge Sharing", International Journal of Human-Computer Studies, vol. 43, No. 5-6, Nov. 1995, pp. 907-928.
Gruber, Tom, "Where the Social Web meets the Semantic Web", Presentation at the 5th International Semantic Web Conference, Nov. 2006, 38 pages.
Gruhn et al., "A Research Perspective on Computer-Assisted Office Work", IBM Systems Journal, vol. 18, No. 3, 1979, pp. 432-456.
Guzzoni et al, "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: tools and Applications,, 2007, pp. 191-198.
Guzzoni et al., "Active, A Tool for Building Intelligent User Interfaces", ASC 2007, Palma de Mallorca, Aug. 2007, 6 pages.

(56) References Cited

OTHER PUBLICATIONS

Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Halbert, D. C., "Programming by Example", Dept. Electrical Engineering and Comp. Sciences, University of California, Berkley, Nov. 1984, 81 pages.
Hardwar, Devemder, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Hill, R. D.., "Some Important Features and Issues in User interface Management System", Dynamic Graphics Project, University of Toronto, CSRI, vol. 21, No. 2, Apr. 1987, pp. 116-120.
Hiroshi, "TeamWork Station: Towards a Seamless Shared Workspace", NTT Human Interface Laboratories, CSCW 90 Proceedings, Oct. 1990, pp. 13-26.
Hopper, Andy, "Pandora—An Experimental System for Multimedia Applications", Olivetti Research Laboratory, Apr. 1990, pp. 19-34.
Howard, John H., "(Abstract) An Overview of the Andrew File System", Information Technology Center, Carnegie Mellon University; (CMU-ITC-88-062) to Appear in a future issue of the ACM Transactions on Computer Systems, 1988, pp. 1-6.
Huang et al., "Real-Time Software-Based Video Coder for Multimedia Communication Systems", Department of Computer Science and Information Engineering, 1993, pp. 1-10.
Intraspect Software, "The Intraspect Knowledge Management Solution: Technical Overview", available at <http://tomgruber.org/writing/intraspect-whitepaper-1998.pdf>, 1998, 18 pages.
Jaybird, "Everything Wrong with AIM: Because We've All Thought About It", available at <http://www.psychonoble.com/archives/articles/82.html>, May 24, 2006, 3 pages.
Jeffay et al., "Kernel Support for Live Digital Audio and Video", In Proc. of the Second Intl. Workshop on Network and Operating System Support for Digital Audio and Video, vol. 614, Nov. 1991, pp. 1-16.
Julia et al., "Un Editeur Interactif De Tableaux Dessines a Main Levee (An Interactive Editor for Hand-Sketched Tables)", Traitement du Signal, vol. 12, No. 6, 1995, pp. 619-626.
Kaeppner et al., "Architecture of HeiPhone: A Testbed for Audio/Video Teleconferencing", IBM European Networking Center, 1993.
Karp, P. D., "A Generic Knowledge-Base Access Protocol", Available online at http://lecture.cs.buu.ac.th/18 f50353/Document/gfp.pdf>, May 12, 1994, 66 pages.
Kirstein et al., "Piloting of Multimedia Integrated Communications for European Researchers", Proc. INET '93, 1993, pp. 1-12.
Kjelldahl et al., "Multimedia—Principles, Systems, and Applications", Proceedings of the 1991 Eurographics Workshop on Multimedia Systems, Applications, and Interaction, Apr. 1991, 14 pages.
Knownav, "Knowledge Navigator", YouTube Video available at <http://www.youtube.com/watch?v=QRH8eimU_20>, Apr. 29, 2008, 1 page.
Kurlander et al., "Comic Chat", [Online], 1996 [Retrieved on: Feb. 4, 2013], SIGGRAPH '96 Proceedings of the 23rd annual conference on Computer graphics and interactive techniques, [Retrieved from: http://delivery.acm.org/1 0.1145/240000/237260/p225-kurlander.pdf], 1996, pp. 225-236.
Lantz, Keith, "An Experiment in Integrated Multimedia Conferencing", Department of Computer Science, Stanford University, 1986, pp. 267-275.
Lantz et al., "Towards a Universal Directory Service", Departments of Computer Science and Electrical Engineering, Stanford University, 1985, pp. 250-260.
Lauwers et al., "Collaboration Awareness in Support of Collaboration Transparency: Requirements for the Next Generation of Shared Window Systems", CHI'90 Proceedings, 1990, pp. 303-311.
Lauwers et al., "Replicated Architectures for Shared Window Systems: A Critique", COCS '90 Proceedings of the ACM SIGOIS and IEEE CS TC-OA conference on Office information systems, ACM SIGOIS Bulletin, 1990, pp. 249-260.
Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.
Leong et Cl., "CASIS: A Context-Aware Speech Interface System", Proceedings of the 10th International Conference on Intelligent user Interfaces,, Jan. 9-12, 2005, pp. 231-238.
Lieberman et al., "Out of Context: Computer Systems that Adapt to, and Learn from, Context", IBM Systems Journal, vol. 39, Nos. 3&4, 2000, pp. 617-632.
Lin et al., "A Distributed Architecture for Cooperative Spoken Dialogue Agents with Coherent Dialogue State and History", Available on line at<http://citeseerx.ist.psu.edu/viewdoc/summary?doi=1 0.1.1.42.272>, 1999, 4 pages.
McGuire et al., "SHADE: Technology for Knowledge-Based Collaborative Engineering", Journal of Concurrent Engineering~r Applications and Research (CERA), 1993, 18 pages.
Meng et al., "Wheels: A Conversational System in the Automobile Classified Domain", Proceedings of Fourth International Conference on Spoken Language, ICSLP 96, vol. 1, Oct. 1996, pp. 1-4.
Meyer, Mike, "A Shell for Modern Personal Computers", University of California, Aug. 1987, pp. 13-19.
Meyrowitz et al., "Bruwin: An Adaptable Design Strategy for Window Manager/Virtual Terminal Systems", Department of Computer Science, Brown University, 1981, pp. 180-189.
Microsoft, "Windows Mobile Fact Sheet", available at <http://www.WindowsMobile.com>, 2007, 2 pages.
Milward et al., "D2.2: Dynamic MultimodalInterface Reconfiguration alk and Look: Tools for Ambient Linguistic Knowledge", available at <http://www.ihmc.us/users/nblaylock!Pubs/Files/talk d2.2.pdf>, Aug. 8, 2008, 69 pages.
Mio, "MioMap 269: 2005, User's Manual".
Mitra et al., "A Graph-Oriented Model for Articulation of Ontology Interdependencies", Advances in Database Technology, Lecture Notes in Computer Science, vol. 1777,, 2000, pp. 1-15.
Moran et al., "Multimodal User Interfaces in the Open Agent Architecture", International Conference on Intelligent User Interfaces (IUI97), 1997, 8 pages.
Morland, D. Verne, "Human Factors Guidelines for Terminal Interface Design", Communications ofthe ACM vol. 26, No. 7, Jul. 1983, pp. 484-494.
Morris et al., "Andrew: A Distributed Personal Computing Environment", Communications of the ACM, (Mar. 1986); vol. 29 No. 3, Mar. 1986, pp. 184-201.
Mozer, Michael C., "An Intelligent Environment Must be Adaptive", IEEE Intelligent Systems, Mar./Apr. 1999, pp. 11-13.
Muller et al., "CSCW'92 Demonstrations", 1992, pp. 11-14.
Naone, Erica, "TR10. Intelligent Software Assistant", Technology Review, Mar.-Apr. 2009, 2 pages.
Neches et al., "Enabling Technology for Knowledge Sharing", Fall, 1991, pp. 37-56.
Notenboom, Leo A,. "Can I Retrieve Old MSN Messenger Conversations?", available at <http://ask-leo.com/can_i_retrieve_old_msn_messenger_conversations.html>, Mar. 11, 2004, 23 pages.
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.
Palay et al., "The Andrew Toolkit: An Overview", Information Technology Center, Carnegie-Mellon University, 1988, pp. 1-15.
Palm, Inc., "User Guide : Your Palm Treo.TM. 755p Smartphone", 2005-2007, 304 pages.
Patterson et al., "Rendezvous: An Architecture for Synchronous Multi-User Applications", CSCW '90 Proceedings, 1990, pp. 317-328.
Pearl, Amy, "System Support for Integrated Desktop Video Conferencing", Sunmicrosystems Laboratories, Dec. 1992, pp. 1-15.
Phillips, Dick, "The Multi-Media Workstation", SIGGRAPH '89 Panel Proceedings, 1989, pp. 93-109.
Phoenix Solutions, Inc., "Declaration of Christopher Schmandt Regarding the MIT Galaxy System", West Interactive Corp., a Delaware Corporation, Document 40, Jul. 2, 2010, 162 pages.

(56) References Cited

OTHER PUBLICATIONS

Raper, Larry K., "The C-MU PC Server Project", (CMU-ITC-86-051), Dec. 1986, pp. 1-30.
Rice et al., "Monthly Program: Nov. 14, 1995", The San Francisco Bay Area Chapter of ACM SIGCHI, Available at <http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.
Rivlin et al., "Maestro: Conductor of Multimedia Analysis Technologies", SRI International, 1999, 7 pages.
Roddy et al., "Communication and Collaboration in a Landscape of B2B eMarketplaces", VerticalNet Solutions, A Business White Paper, Jun. 15, 2000, 23 pages.
Roddy et al., "Interface Issues in Text Based Chat Rooms", SIGCHI Bulletin, vol. 30, No. 2, Apr. 1998, pp. 119-123.
Root, Robert, "Design of a Multi-Media Vehicle for Social Browsing", Bell Communications Research, 1988, pp. 25-38.
Rosenberg et al., "An Overview of the Andrew Message System", Information Technology Center Carnegie-Mellon University, Jul. 1987, pp. 99-108.
Scheifler, R. W., "The X Window System", MIT Laboratory for Computer Science and Gettys, Jim Digital Equipment Corporation and MIT Project Athena; ACM Transactions on Graphics, vol. 5, No. 2, Apr. 1986, pp. 79-109.
Schnelle, Dirk, "Context Aware Voice User Interfaces for Workflow Support", Dissertation paper, Aug. 27, 2007, 254 pages.
Schooler, Eve, "A Distributed Architecture for Multimedia Conference Control", ISI Research Report, Nov. 1991, pp. 1-18.
Schooler et al., "A Packet-switched Multimedia Conferencing System", by Eve Schooler, et al; ACM SIGOIS Bulletin, vol. I, No. 1, Jan. 1989, pp. 12-22.
Schooler et at., "An Architecture for Multimedia Connection Management", Proceedings IEEE 4th Comsoc International Workshop on Multimedia Communications, Apr. 1992, pp, 271-274.
Schooler, Eve M., "Case Study: Multimedia Conference Control in a Packet-Switched Teleconferencing System", Journal of Internetworking: Research and Experience, vol. 4, No. 2, Jun. 1993, pp. 99-120.
Schooler et al., "Multimedia Conferencing: Has it Come of Age?", Proceedings 24th Hawaii International Conference on System Sciences, vol. 3, Jan. 1991, pp. 707-716.
Schooler at al., "The Connection Control Protocol: Architecture Overview", USC/Information Sciences Institute, Jan. 28, 1992, pp. 1-6.
Schooler, Eve M., "The Impact of Scaling on a Multimedia Connection Architecture", Journal of Multimedia Systems, vol. 1, No. 1, Aug. 1993, 11 pages.
Seneff at al., "A New Restaurant Guide Conversational System: Issues in Rapid Prototyping for Specialized Domains", retrived from Internet on Oct. 1996 <citeseerx.ist.psu.edu/viewdoc/download-?doi=10.1.1.16...rep . . . ,>, Oct. 1996, 4 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Simonite, Tom, "One Easy Way to Make Siri Smarter", Technology Review, Oct. 18, 2011, 2 pages.
Smith et al., "Guidelines for Designing User Interface Software", User Lab, Inc., Aug. 1986, pp. 1-384.
Srinivas et al., "Monet: A Multi-Media System for Conferencing and Application Sharing in Distributed Systems", CERC Technical Report Series Research Note, Feb. 1992, 19 pages.
Stent at al., "The CommandTalk Spoken Dialogue System", SRI International, 1999, pp. 183-190.
Tapcritic, "G-Map U.S. iPhone Review", Youtube, available at <https://www.youtube.com/watch?v=xrWUKwXQwlQ>, Mar. 10, 2009, 2 pages.
Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
Tofel et al., "SpeakToit: A Personal Assistant for Older iPhones, iPads", Apple News, Tips and Reviews, Feb. 9, 2012, 7 pages.
Touch, Joseph, "Zoned Analog Personal Teleconferencing", USC / Information Sciences Institute, 1993, pp. 1-19.
Trigg et al., "Hypertext Habitats: Experiences of Writers in NoteCards", Hypertext '87 Papers; Intelligent Systems Laboratory, Xerox Palo Alto Research Center, 1987, pp. 89-108.
Trowbridge, David, "Using Andrew for Development of Educational Applications", Center for Design of Educational Computing, Carnegie-Mellon University (CMU-ITC-85-065), Jun. 2, 1985, pp, 1-6.
Tucker, Joshua, "Too Lazy to Grab Your TV Remote? Use Siri Instead", Engadget, Nov. 30, 2011, pp. 1-8.
Tur et al., "The CALO Meeting Assistant System", IEEE Transactions on Audio, Speech, and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Turletti, Thierry, "The INRIA Videoconferencing System (IVS)", Oct. 1994, pp. 1-7.
Viegas et al., "Chat Circles", SIGCHI Conference on Human Factors in Computing Systems, May 15-20, 1999, pp. 9-16.
Vlingo et al., "Vlingo Launches Voice Enablement Application on Apple App Store", Press Release, Dec. 3, 2008, 2 pages.
Vlingo Lncar, "Distracted Driving Solution with Vlingo InCar", YouTube Video, Available at <http://www.youtube.com/watch?v=Vqs8XfXxgz4>, Oct. 2010,, 2 pages.
Voiceassist, "Send Text, Listen to and Send E-Mail by Voice", YouTube Video available at <http://www.youtube.com/watch?v=0tEU61nHHA4>, Jul. 30, 2009, 1 page.
Voiceonthego, "Voice on the Go (BlackBerry)", YouTube Video, available at <http://www.youtube.com/watch?v=pJqpWgQS98w>, Jul. 27, 2009, 1 page.
Wadlow, M. G.., "The Role of Human Interface Guidelines in the Design of Multimedia Applications", Carnegie Mellon University (To be Published in Current Psychology: Research and Reviews, Summer 1990 (CMU-ITC-91-101), 1990, pp. 1-22.
Walker et al., "The LOCUS Distributed Operating System 1", University of California Los Angeles, 1983, pp. 49-70.
Watabe et al., "Distributed Multiparty Desktop Conferencing System: MERMAID", CSCW 90 Proceedings, Oct. 1990, pp. 27-38.
Youtube: "G-Map for iPhone Demo: 3-Way Map Mode", Heading-up Mode, Uploaded by navi0808, available at <http://youtube.com/watch?v=QQusXdiXarl&feature=related>, Feb. 13, 2009, 2 pages.
Youtube, "G-Map for iPhone: About Menus and Basic Functions", Heading up Map View Mode, Uploaded by navi0808, available at <http://www.youtube.com/watch?v=tN8uW_rM0Q>, Feb. 24, 2009, 1 page.
Youtube, "G-Map for iPhone: About Menus and Basic Functions", North-up Map View Mode, Uploaded by navi0808, available at <http://www.youtube.com/watch?v=tN8uW_rM0Q>, Feb. 24, 2009, 1 page.
Ziegler, K, "A Distributed Information System Study", IBM Systems Journal, vol. 18, No. 3, 1979, pp. 374-401.
Zue, Victor, "Conversational Interfaces: Advances and Challenges", Spoken Language System Group, Sep. 1997, 10 pages.
Zue, Victor W., "Toward Systems that Understand Spoken Language", ARPA Strategic Computing Institute, Feb. 1994, 9 pages.
Notice of Grant received for Chinese Patent Application No. 201080001767.6, mailed on Jul. 20, 2015, 6 pages (2 pages English Translation and 4 pages of Official Copy only).

\* cited by examiner

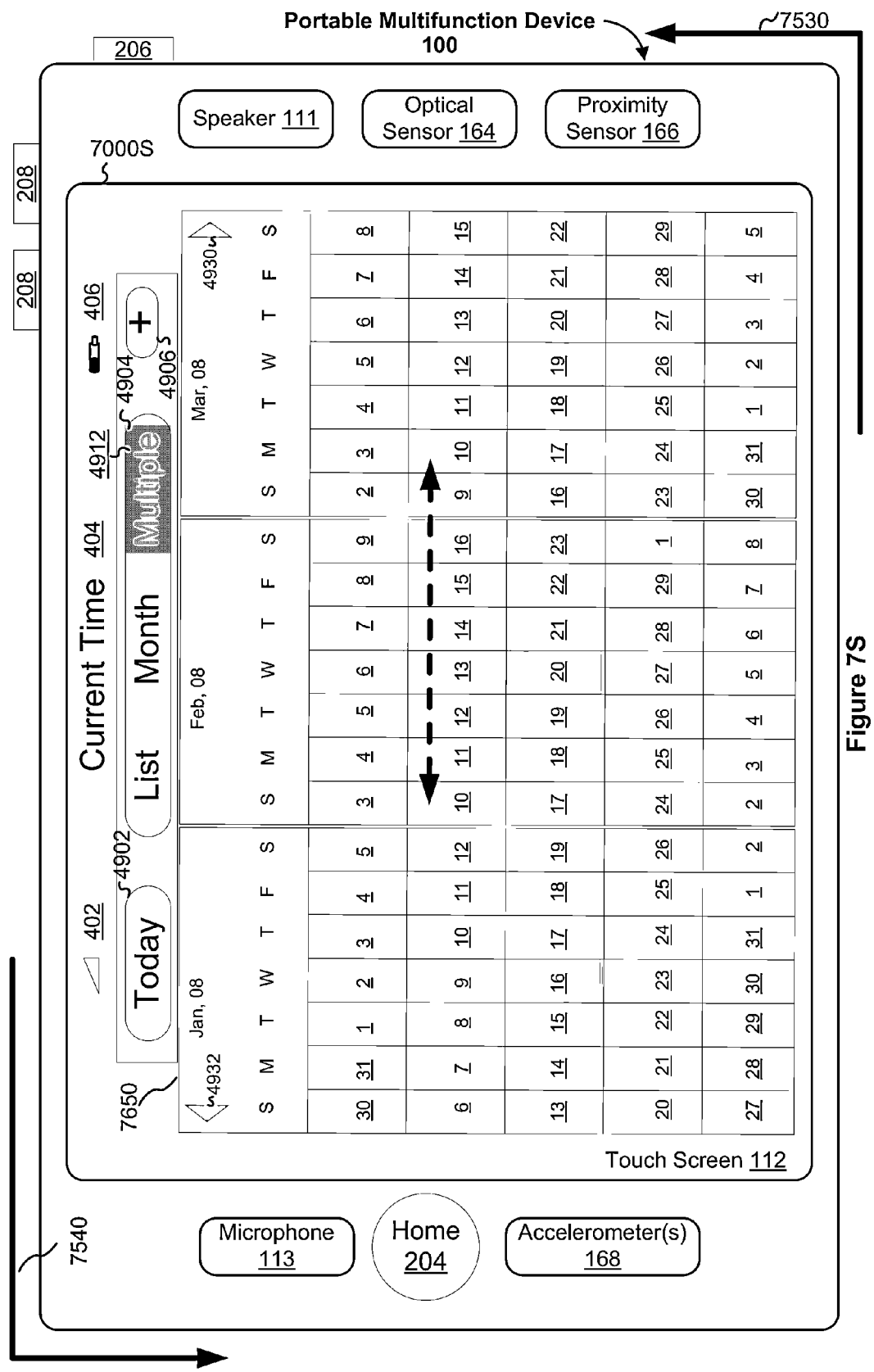

880 ↘

```
┌─────────────────────────────────────────────────────────────┐
│ Display a flat version of a calendar application interface  │─882
│ on a touch screen display.                                  │
└─────────────────────────────────────────────────────────────┘
                              ↓
┌─────────────────────────────────────────────────────────────┐─884
│ In response to detecting a user gesture on a view options   │
│ icon while the flat version of the calendar application     │
│ interface is displayed, display a curled version of the     │
│ calendar application interface on the touch screen display, │
│ wherein the curled version of the calendar application      │
│ interface includes:                                         │
│                                                             │
│ an image of a curled page that obscures a first portion of  │
│ the flat version of the calendar application interface; and │
│                                                             │
│ a roll-up region in a display region formerly occupied by a │
│ second portion of the flat version of the calendar          │──▶(A)
│ application interface, wherein the roll-up region includes  │
│ a plurality of calendar option icons, each respective       │
│ calendar option icon in the plurality of calendar option    │
│ icons responsive to a user selection gesture on the         │
│ respective calendar option icon.                            │
└─────────────────────────────────────────────────────────────┘
```

Detect a user selection gesture on one or more of the plurality of calendar option icons. — 886

Redisplay the flat version of the calendar application interface with information corresponding to the one or more calendar option icons upon which user selection gestures were detected. — 888

Detect user selection gestures on at least two of the plurality of calendar option icons. — 890

Redisplay the flat version of the calendar application interface with information corresponding to the at least two of the plurality of option icons upon which user selection gestures were detected. — 892

The curled version of the calendar application interface includes a third portion of the flat version of the calendar application interface. — 894

The third portion is displayed in the curled version of the calendar application interface in a manner that is visually distinct from display of the third portion in the flat version of the calendar application interface. — 896

Figure 8D

PORTABLE MULTIFUNCTION DEVICE, METHOD, AND GRAPHICAL USER INTERFACE FOR VIEWING AND MANAGING ELECTRONIC CALENDARS

RELATED APPLICATIONS

This application is a divisional of U.S. application Ser. No. 12/242,856, filed Sep. 30, 2008, which claims priority to U.S. Provisional Patent Application Nos. 61/033,780, "Portable Multifunction Device, Method, and Graphical User Interface for Viewing and Managing Electronic Calendars," filed Mar. 4, 2008, and 61/019,295, "Portable Multifunction Device, Method, and Graphical User Interface for Displaying and Selecting Application Options," filed Jan. 6, 2008. All of these applications are incorporated by reference in their entireties.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (10) U.S. patent application Ser. No. 11/367,749, "Multi-Functional Hand-Held Device," filed Mar. 3, 2006; (11) U.S. patent application Ser. No. 11/850,635, "Portable Multifunction Device," filed Sep. 5, 2007; (12) U.S. patent application Ser. No. 11/969,800, "Modal Change Based on Orientation of a Portable Multifunction Device," filed Jan. 4, 2008; (13) U.S. patent application Ser. No. 11/969,786, "System and Method for Viewing and Managing Calendar Entries," filed Jan. 4, 2008; and (14) U.S. Provisional Patent Application No. 61/019,293, "Portable Electronic Device with Conversation Management for Incoming Instant Messages," filed Jan. 6, 2008. All of these applications are incorporated by reference herein in their entirety.

TECHNICAL FIELD

The disclosed embodiments relate generally to portable electronic devices, and more particularly, to portable devices for viewing and managing electronic calendars.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Portable electronic devices often include a calendar application to keep track of meetings or appointments. Generally, the calendars on these devices may be viewed according to a monthly format, which displays a respective month, a daily format, which displays a respective day, or a weekly format, which displays a respective week. In some of these calendars, a listing of agenda, or calendar entry items, may be viewed in list format. These formats are typically viewed separately, and switching between them is often cumbersome and inconvenient.

Some portable devices are also able to receive and respond to calendar invitations and/or display simultaneously entries from multiple calendars (e.g., a work calendar and a personal calendar). But the user interfaces for these functions are cryptic and non-intuitive for many users.

Accordingly, there is a need for portable multifunction devices with more transparent and intuitive user interfaces for displaying and managing calendars and calendar entries on a touch screen display that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a "touch screen" or "touch screen display") with a graphical user interface (GUI), one or more processors, memory and one or more modules, programs or sets of executable instructions stored in the memory for performing multiple functions. In some embodiments, the user interacts with the GUI primarily through finger contacts and gestures on the touch-sensitive display. In some embodiments, in addition to providing a calendar, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

In accordance with some embodiments, a computer-implemented method includes executing a calendar application on a portable electronic device having a touch screen display. The executing includes: when the device is held in a portrait orientation, displaying a calendar in a first view and showing events for a first time period in the first view. The executing also includes: detecting a change in orientation of the device to a landscape orientation, and in response, displaying the calendar in a second view and showing events for a second time period that is longer than and includes the first time period.

In accordance with some embodiments, a portable electronic device includes: a touch screen display; one or more processors; memory; and one or more programs. The one or more programs are stored in the memory and configured to be executed by the one or more processors. The one or more programs include: instructions for, when the device is held in a portrait orientation, displaying a calendar in a first view, showing events for a first time period in the first view; and instructions for detecting a change in orientation of the device to a landscape orientation, and in response, displaying the calendar in a second view, showing events for a second time period that is longer than and includes the first time period.

In accordance with some embodiments, a computer readable storage medium has stored therein instructions, which when executed by a portable electronic device with a touch screen display, cause the device to: when the device is held in a portrait orientation, display a calendar in a first view, showing events for a first time period in the first view; and detect a change in orientation of the device to a landscape orientation, and in response, display the calendar in a second view, showing events for a second time period that is longer than and includes the first time period.

In accordance with some embodiments, a graphical user interface on a portable electronic device with a touch screen display includes: a calendar with a first view that shows events for a first time period and a second view that shows events for a second time period. When the device is held in a portrait orientation, the calendar is displayed in the first view that shows events for the first time period. In response to detecting a change in orientation of the device to a landscape orientation, the calendar is displayed in a second view that shows events for the second time period. The second time period is longer than and includes the first time period.

In accordance with some embodiments, a portable multifunction device with a touch screen display includes: means for, when the device is held in a portrait orientation, displaying a calendar in a week view, showing events for a single week in the week view; and means for detecting a change in orientation of the device to a landscape orientation, and in response, displaying the calendar in a multiweek view, showing events for a multiplicity of weeks, the multiplicity of weeks including the single week.

In accordance with some embodiments, a computer-implemented method is performed at a portable multifunction device with a touch screen display. The touch screen display includes a long axis, a short axis, a portrait view and a landscape view. The computer-implemented method includes executing a calendar application. The portable multifunction device is detected in a first orientation that comprises a substantially vertical orientation of the long axis. In response to detecting the portable multifunction device in the first orientation that comprises the substantially vertical orientation of the long axis, a calendar is displayed for a first time period in the portrait view. The portable multifunction device is detected in a second orientation that comprises a substantially vertical orientation of the short axis. In response to detecting the portable multifunction device in the second orientation that comprises the substantially vertical orientation of the short axis, a calendar is displayed for a second time period in the landscape view. The second time period is longer than and includes the first time period.

In accordance with some embodiments, a portable multifunction device includes a touch screen display, one or more processors, memory, and one or more programs. The touch screen display includes a long axis, a short axis, a portrait view and a landscape view. The one or more programs are stored in the memory and configured to be executed by the one or more processors. The one or more programs include: instructions for executing a calendar application; instructions for detecting the portable multifunction device in a first orientation that comprises a substantially vertical orientation of the long axis; instructions for displaying a calendar for a first time period in the portrait view in response to detecting the portable multifunction device in the first orientation that comprises the substantially vertical orientation of the long axis; instructions for detecting the portable multifunction device in a second orientation that comprises a substantially vertical orientation of the short axis; and instructions for displaying a calendar for a second time period in the landscape view in response to detecting the portable multifunction device in the second orientation that comprises the substantially vertical orientation of the short axis. The second time period is longer than and includes the first time period.

In accordance with some embodiments, a computer readable storage medium has stored therein instructions, which when executed by a portable multifunction device with a touch screen display (wherein the touch screen display includes a long axis, a short axis, a portrait view and a landscape view), cause the device to: execute a calendar application; detect the portable multifunction device in a first orientation that comprises a substantially vertical orientation of the long axis; display a calendar for a first time period in the portrait view in response to detecting the portable multifunction device in the first orientation that comprises the substantially vertical orientation of the long axis; detect the portable multifunction device in a second orientation that comprises a substantially vertical orientation of the short axis; and display a calendar for a second time period in the landscape view in response to detecting the portable multifunction device in the second orientation that comprises the substantially vertical orientation of the short axis. The second time period is longer than and includes the first time period.

In accordance with some embodiments, a graphical user interface on a portable multifunction device with a touch screen display includes: a calendar application; a calendar for a first time period; and a calendar for a second time period. The touch screen display includes a long axis, a short axis, a portrait view and a landscape view. In response to detecting the portable multifunction device in a first orientation that comprises a substantially vertical orientation of the long axis, the calendar for the first time period is displayed in the portrait view. In response to detecting the portable multifunction device in a second orientation that comprises a substantially vertical orientation of the short axis, the calendar for a second time period is displayed in the landscape view. The second time period is longer than and includes the first time period In accordance with some embodiments, a portable multifunction device with a touch screen display (wherein the touch screen display includes a long axis, a short axis, a portrait view and a landscape view) includes: means for executing a calendar application; means for detecting the portable multifunction device in a first orientation that comprises a substantially vertical orientation of the long axis; means for displaying a calendar for a first time period in the portrait view in response to detecting the portable multifunction device in the first orientation that comprises the substantially vertical orientation of the long axis; means for detecting the portable multifunction device in a second orientation that comprises a substantially vertical orientation of the short axis; and means for displaying a calendar for a second time period in the landscape view in response to detecting the portable multifunction device in the second orientation that comprises the substantially vertical orientation of the short axis. The second time period is longer than and includes the first time period.

In accordance with some embodiments, a computer-implemented method is performed at a portable multifunction device with a touch screen display. The computer-implemented method includes: displaying a multiweek calendar on the touch screen display; detecting a contact on an individual day in the multiweek calendar; and, in response to detecting the contact on the individual day, displaying at least a portion of a list of events on the contacted individual day while continuing to display the multiweek calendar. The list of events on the contacted individual day includes an invitation to an event.

In accordance with some embodiments, a portable multifunction device includes: a touch screen display; one or more processors; memory; and one or more programs. The one or more programs are stored in the memory and configured to be executed by the one or more processors. The one or more programs include: instructions for displaying a multiweek calendar on the touch screen display; instructions for detecting a contact on an individual day in the multiweek calendar; and instructions for displaying at least a portion of a list of events on the contacted individual day while continuing to display the multiweek calendar in response to detecting the contact on the individual day. The list of events on the contacted individual day includes an invitation to an event.

In accordance with some embodiments, a computer readable storage medium has stored therein instructions, which when executed by a portable multifunction device with a touch screen display, cause the portable multifunction device to: display a multiweek calendar on the touch screen display; detect a contact on an individual day in the multiweek calendar; and, in response to detecting the contact on the individual day, display at least a portion of a list of events on the contacted individual day while continuing to display the multiweek calendar. The list of events on the contacted individual day includes an invitation to an event.

In accordance with some embodiments, a graphical user interface on a portable multifunction device with a touch screen display includes: a calendar application; a multiweek calendar including a plurality of days; and a list of events associated with at least one of the plurality of days, the list of events including at least one invitation to an event. In response to detecting a contact on an individual day in the multiweek calendar, at least a portion of the list of events on the contacted individual day are displayed while continuing to display the multiweek calendar.

In accordance with some embodiments, a portable multifunction device with a touch screen display includes: means for displaying a multiweek calendar on the touch screen display; means for detecting a contact on an individual day of the multiweek calendar; and means for displaying at least a portion of a list of events on the contacted individual day while continuing to display the multiweek calendar in response to detecting the contact on the individual day. The list of events on the contacted individual day includes an invitation to an event.

In accordance with some embodiments, a computer-implemented method is performed at a portable multifunction device with a touch screen display. The computer-implemented method includes: displaying a flat version of a calendar application interface, and, in response to detecting a user gesture on a view options icon while the flat version of the calendar application interface is displayed, displaying a curled version of the calendar application interface. The curled version of the calendar application interface includes an image of a curled page that obscures a first portion of the flat version of the calendar application interface, and a roll-up region in a display region formerly occupied by a second portion of the flat version of the calendar application interface. The roll-up region includes a plurality of calendar option icons, each respective calendar option icon in the plurality of calendar option icons responsive to a user selection gesture on the respective calendar option icon. The computer-implemented method also includes: detecting a user selection gesture on one or more of the plurality of calendar option icons, and redisplaying the flat version of the calendar application interface with information corresponding to the one or more calendar option icons upon which user selection gestures were detected.

In accordance with some embodiments, a portable computing device includes: a touch screen display; one or more processors; memory; and one or more programs. The one or more programs are stored in the memory and configured to be executed by the one or more processors. The one or more programs include: instructions for displaying a flat version of a calendar application interface; instructions for displaying a curled version of the calendar application interface in response to detecting a user gesture on a view options icon while the flat version of the calendar application interface is displayed. The curled version of the calendar application interface includes: an image of a curled page that obscures a first portion of the flat version of the calendar application interface, and a roll-up region in a display region formerly occupied by a second portion of the flat version of the calendar application interface. The roll-up region includes a plurality of calendar option icons, each respective calendar option icon in the plurality of calendar option icons responsive to a user selection gesture on the respective calendar option icon. The one or more programs also include: instructions for detecting a user selection gesture on one or more of the plurality of calendar option icons; and instructions for redisplaying the flat version of the calendar application interface with information corresponding to the one or more calendar option icons upon which user selection gestures were detected.

In accordance with some embodiments, a computer readable storage medium has stored therein instructions, which when executed by a portable multifunction device with a touch screen display, cause the portable multifunction device to: display a flat version of a calendar application interface; and display a curled version of the calendar application interface in response to detecting a user gesture on a view options icon while the flat version of the calendar application interface is displayed. The curled version of the calendar application interface includes: an image of a curled page that obscures a first portion of the flat version of the calendar application interface, and a roll-up region in a display region formerly occupied by a second portion of the flat version of the calendar application interface. The roll-up region includes a plurality of calendar option icons, each respective calendar option icon in the plurality of calendar option icons responsive to a user selection gesture on the respective calendar option icon. The instructions also cause the portable multifunction device to: detect a user selection gesture on one or more of the plurality of calendar option icons; and redisplay the flat version of the calendar application interface with information corresponding to the one or more calendar option icons upon which user selection gestures were detected.

In accordance with some embodiments, a graphical user interface on a portable multifunction device with a touch screen display includes a flat version of a calendar application interface; a calendar options icon; and a curled version of the calendar application interface. The curled version of the calendar application interface includes an image of a curled page that obscures a first portion of the flat version of the calendar application interface, and a roll-up region in a display region formerly occupied by a second portion of the flat version of the calendar application interface. The roll-up region includes a plurality of calendar option icons, each respective calendar option icon in the plurality of calendar option icons responsive to a user selection gesture on the respective calendar option icon. In response to detecting a user gesture on the calendar options icon while the flat version of the calendar application interface is displayed, the curled version of the calendar application interface is displayed. In response to detecting user selection gestures on one or more of the plurality of calendar option icons, the flat version of the calendar application interface is redisplayed with information corresponding to the one or more of the plurality of calendar option icons upon which user selection gestures were detected.

In accordance with some embodiments, a portable multifunction device with a touch screen display includes: means for displaying a flat version of a calendar application interface; and means for displaying a curled version of the calendar application interface in response to detecting a user gesture on a view options icon while the flat version of the calendar application interface is displayed. The curled version of the calendar application interface includes: an image of a curled page that obscures a first portion of the flat version of the calendar application interface, and a roll-up region in a display region formerly occupied by a second portion of the flat version of the calendar application interface. The roll-up region includes a plurality of calendar option icons, each respective calendar option icon in the plurality of calendar option icons responsive to a user selection gesture on the respective calendar option icon. The device also includes: means for detecting a user selection gesture on one or more of the plurality of calendar option icons; and means for redisplaying the flat version of the calendar application interface with information corresponding to the one or more calendar option icons upon which user selection gestures were detected.

In accordance with some embodiments, a computer-implemented method is performed at a portable multifunction device with a touch screen display. The computer-implemented method includes: receiving a calendar invitation, from a party to a user of the device, while the device is locked; displaying at least a portion of the calendar invitation on the touch screen display while the device remains locked; and, in response to detecting a user request to view the calendar invitation, immediately displaying the calendar invitation in a calendar application.

In accordance with some embodiments, a portable computing device includes: a touch screen display; one or more processors; memory; and one or more programs. The one or more programs are stored in the memory and configured to be executed by the one or more processors. The one or more programs include: instructions for receiving a calendar invitation, from a party to a user of the device, while the device is locked; instructions for displaying at least a portion of the calendar invitation on the touch screen display while the device remains locked; and instructions for immediately displaying the calendar invitation in a calendar application in response to detecting a user request to view the calendar invitation.

In accordance with some embodiments, a computer readable storage medium has stored therein instructions, which when executed by a portable multifunction device with a touch screen display, cause the portable multifunction device to: receive a calendar invitation, from a party to a user of the device, while the device is locked; display at least a portion of the calendar invitation on the touch screen display while the device remains locked; and, in response to detecting a user request to view the calendar invitation, immediately display the calendar invitation in a calendar application.

In accordance with some embodiments, a graphical user interface on a portable multifunction device with a touch screen display includes: a calendar application; and at least a portion of a calendar invitation. In response to receiving the calendar invitation from a party to a user of the device while the device is locked, at least the portion of the calendar invitation is displayed on the touch screen display while the device remains locked. In response to detecting a user request to view the calendar invitation, the calendar invitation is immediately displayed in the calendar application.

In accordance with some embodiments, a portable multifunction device with a touch screen display includes: means for receiving a calendar invitation, from a party to a user of the device, while the device is locked; means for displaying at least a portion of the calendar invitation on the touch screen display while the device remains locked; and means for immediately displaying the calendar invitation in a calendar application in response to detecting a user request to view the calendar invitation.

Thus, the invention provides an intuitive, easy-to-use interface for displaying and managing calendars and calendar entries on a portable multifunction device with a touch screen display.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 8A-8F are flow diagrams illustrating methods of operating a calendar application in accordance with some embodiments.

DESCRIPTION OF EMBODIMENTS

Figure 1A:
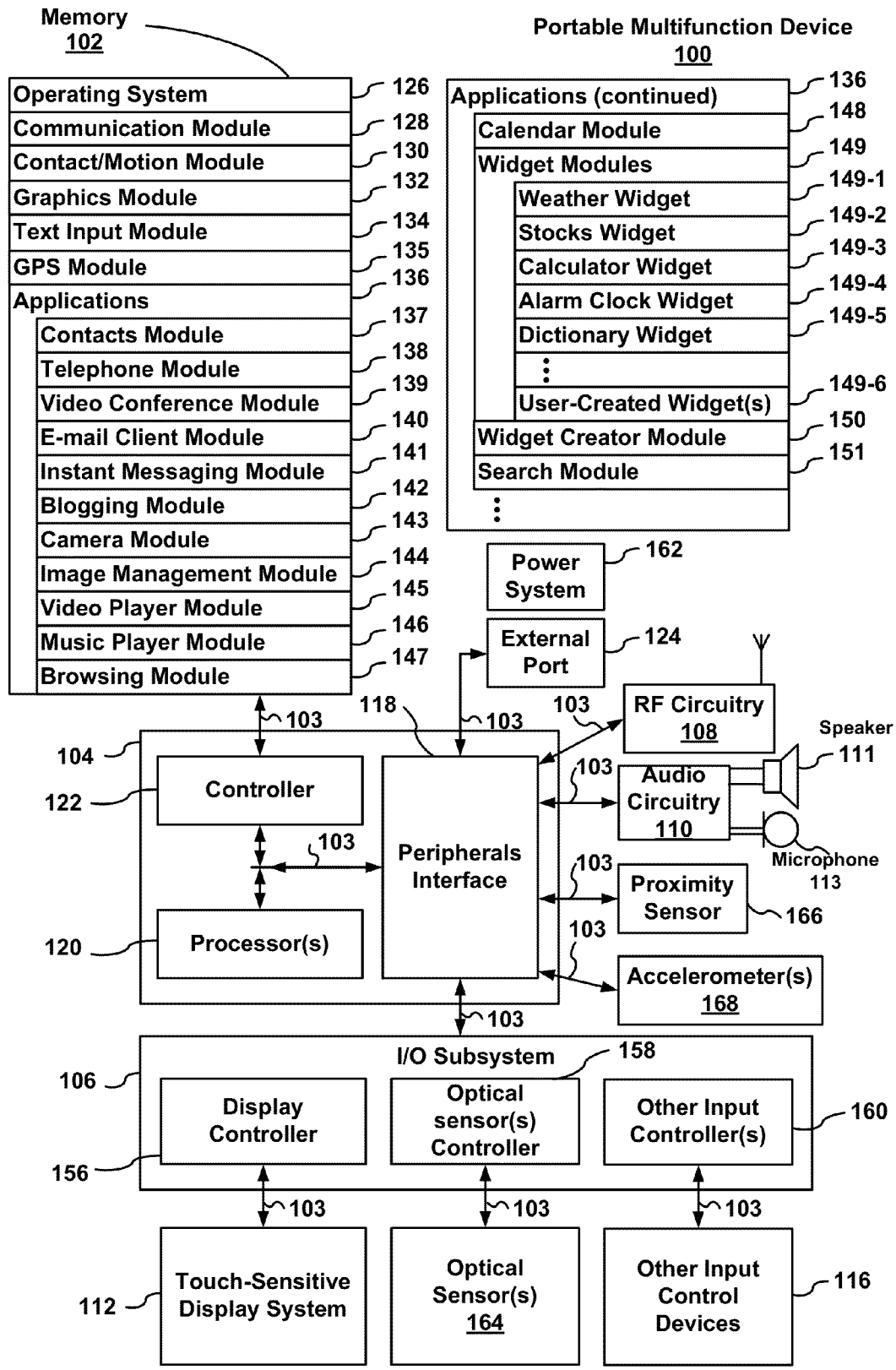
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

In addition to a calendar application, the device may support a variety of other applications, such as one or more of the following: a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
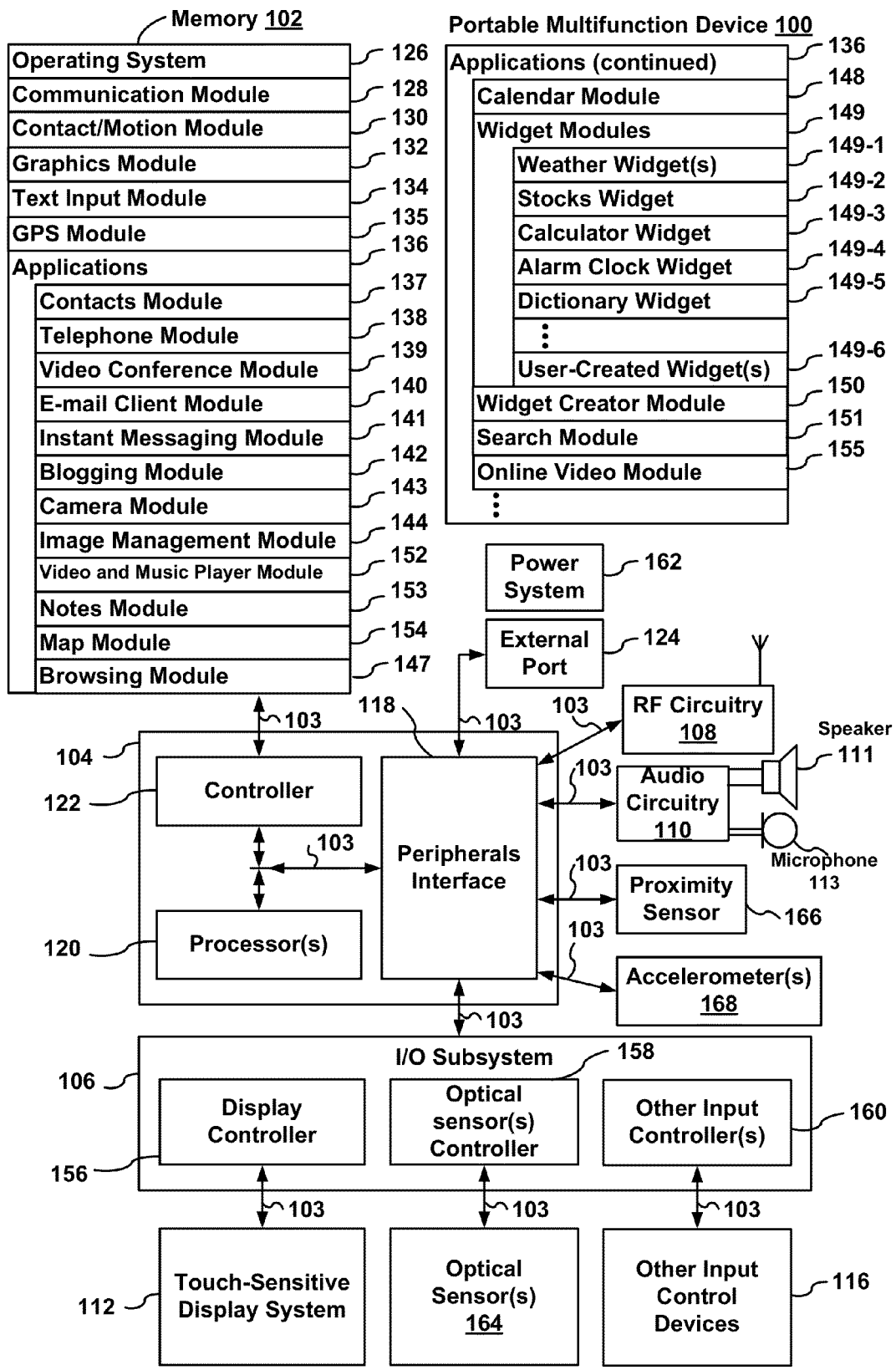

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety.

However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device," filed Sep. 30, 3005; 11/240,788, "Proximity Detector In Handheld Device," filed Sep. 30, 3005; 11/620,702, "Using Ambient Light Sensor To Augment Proximity Sensor Output"; 11/586,862, "Automated Response To And Sensing Of User Activity In Portable Devices," filed Oct. 24, 2006; and 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference in their entirety. In some embodiments, information is displayed on the touch screen display in a portrait view or a landscape view based on an analysis of data received from the one or more accelerometers. For example, in response to detecting the portable multifunction device in an orientation that comprises a vertical or substantially vertical orientation (e.g., within a predetermined number of degrees (such as 20, 30, 40 or 45 degrees) of being vertical) of the long axis of the touch screen display, the device may display an application interface in a portrait view (e.g., UI 7000P, FIG. 7P). Conversely, in response to detecting the portable multifunction device in an orientation that comprises a vertical or substantially vertical orientation (e.g., within a predetermined number of degrees (such as 20, 30, 40 or 45 degrees) of being vertical) of the short axis of the touch screen display, the device may display an application interface in a landscape view.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Embodiments of user interfaces and associated processes using online video module 155 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
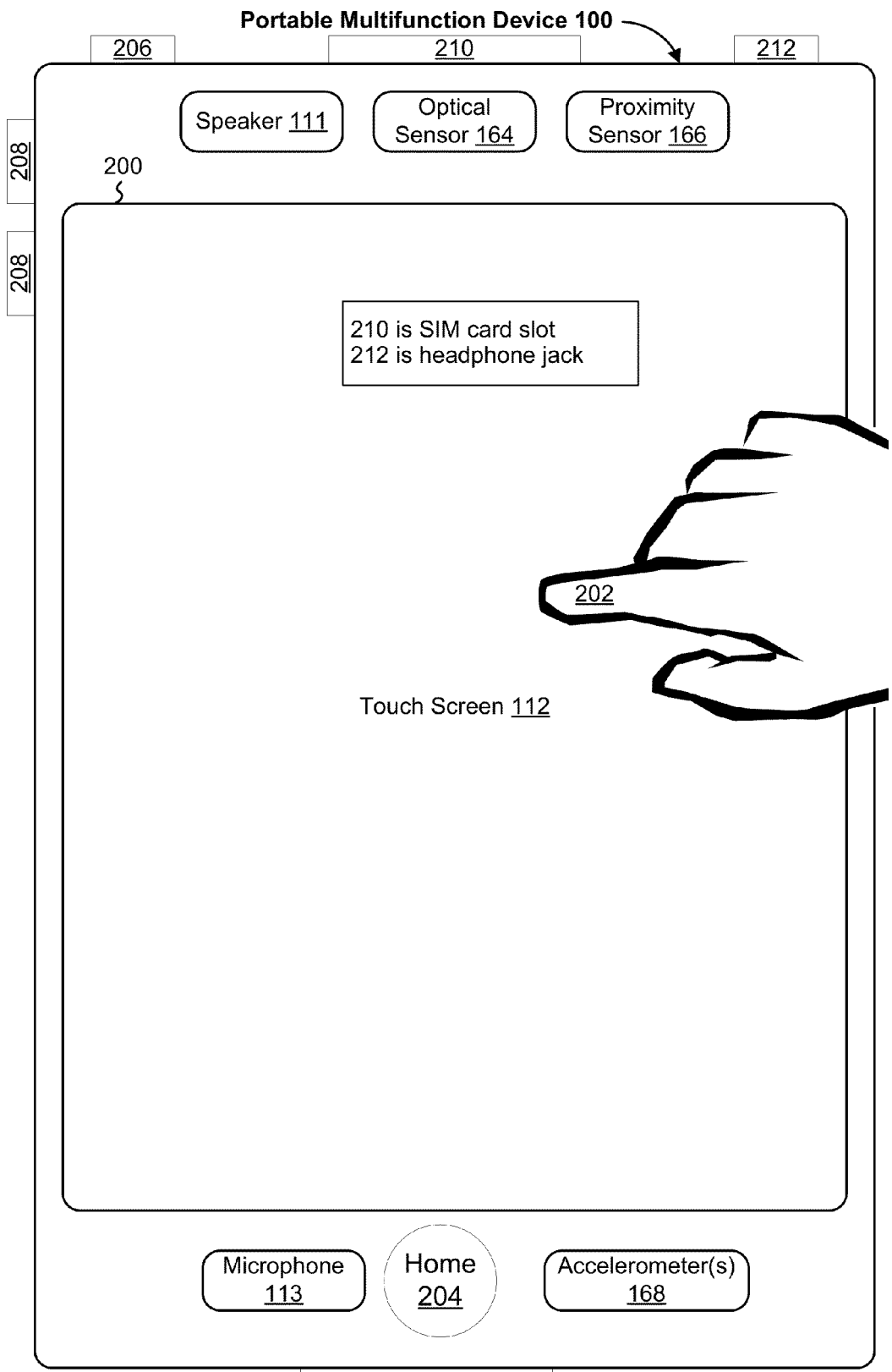
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
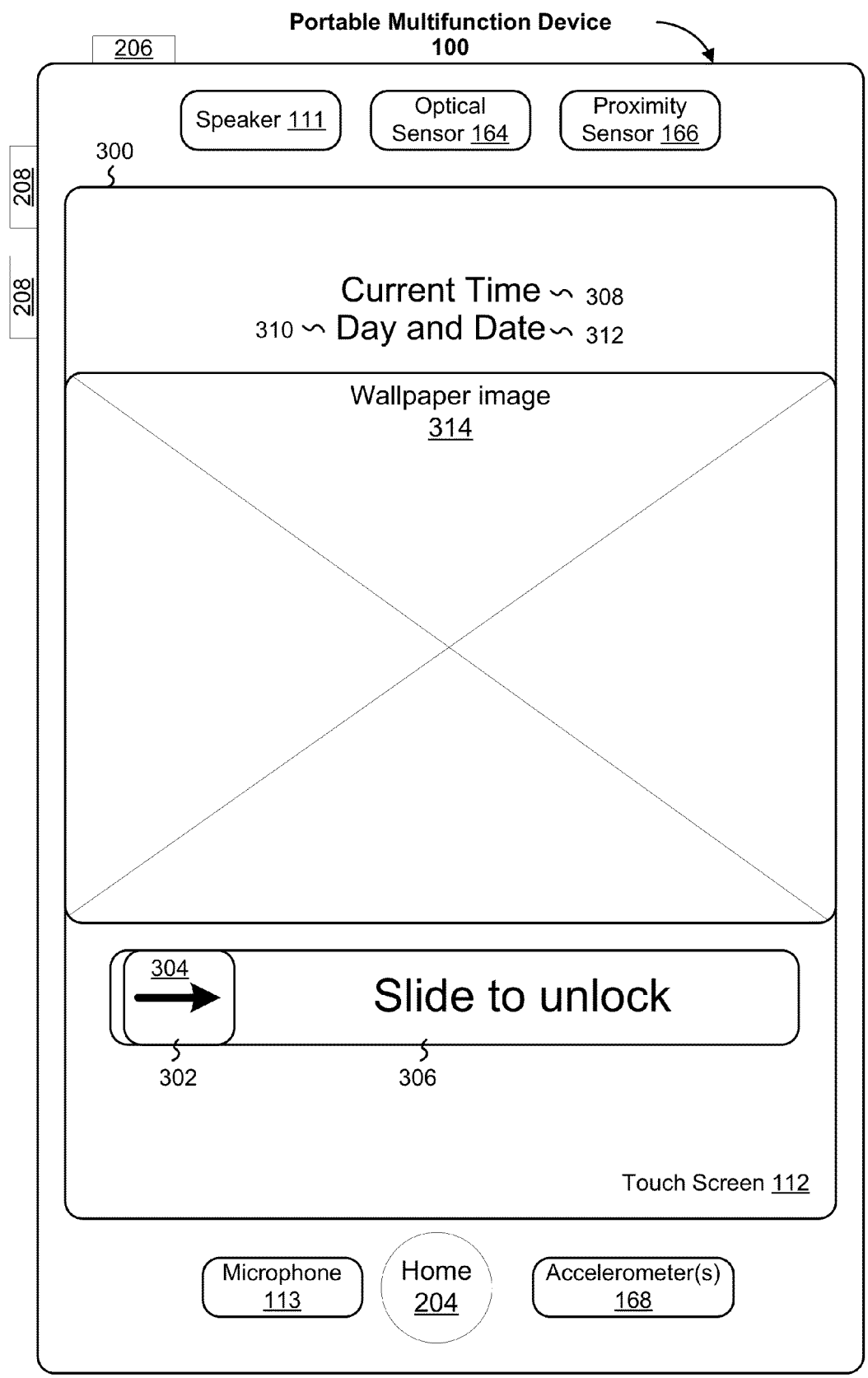
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. Nos. 11/322,549, "Unlocking A Device By Performing Gestures On An Unlock Image," filed Dec. 23, 2005, and 11/322,550, "Indication Of Progress Towards Satisfaction Of A User Input Condition," filed Dec. 23, 2005, which are hereby incorporated by reference in their entirety. In addition, as described below with respect to FIG. 7G, an unlock icon (e.g., image 302, arrow 304, and "slide to unlock" channel 306) may be changed to a view-invitation icon (e.g., image 302, arrow 304, and "slide to view" channel 307) when the device receives a calendar invitation while the device is locked.

Figure 4A:
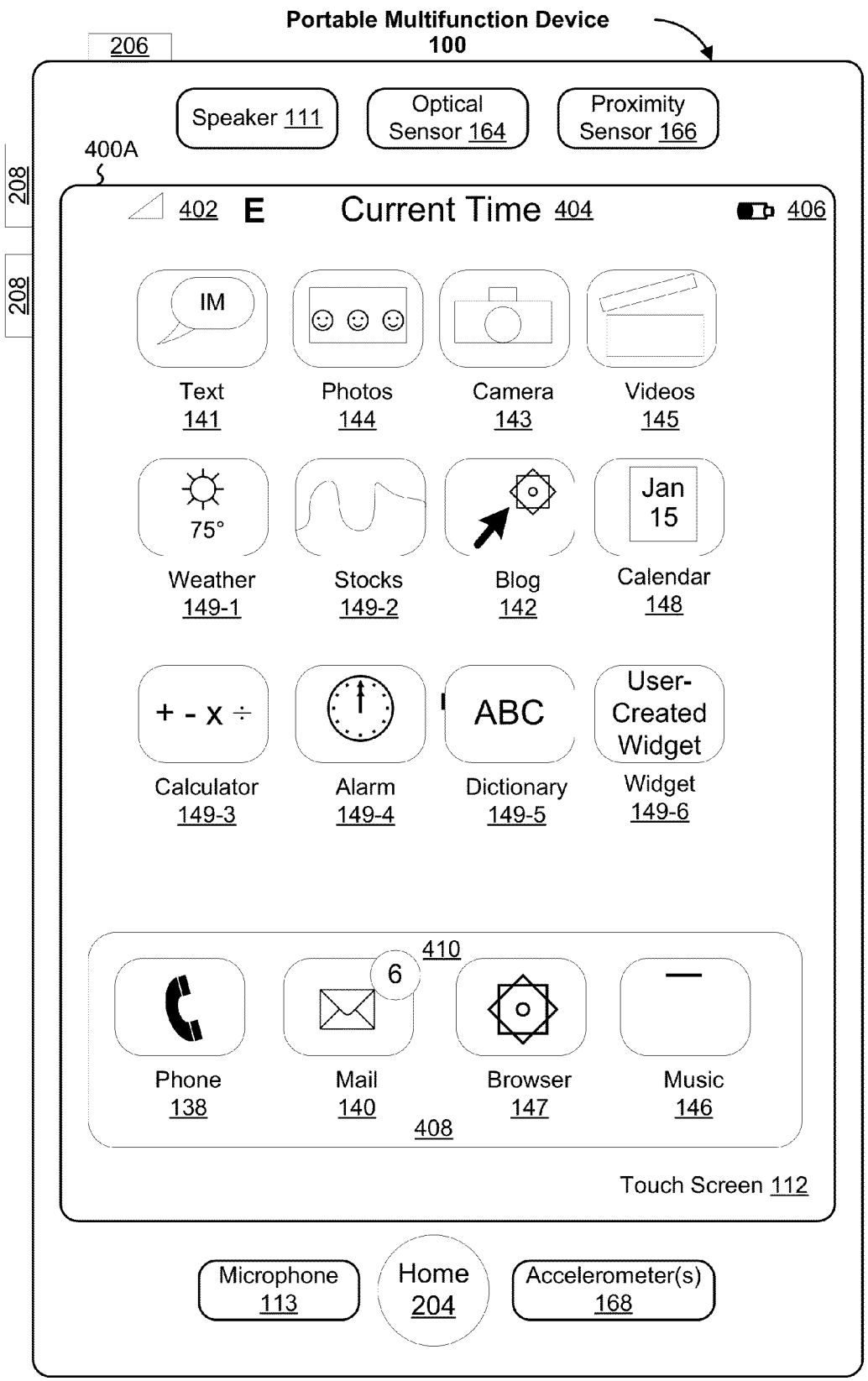
FIGS. 4A and 4B illustrate exemplary user interfaces for a menu of applications on a portable multifunction device in accordance with some embodiments.
Figure 4B:
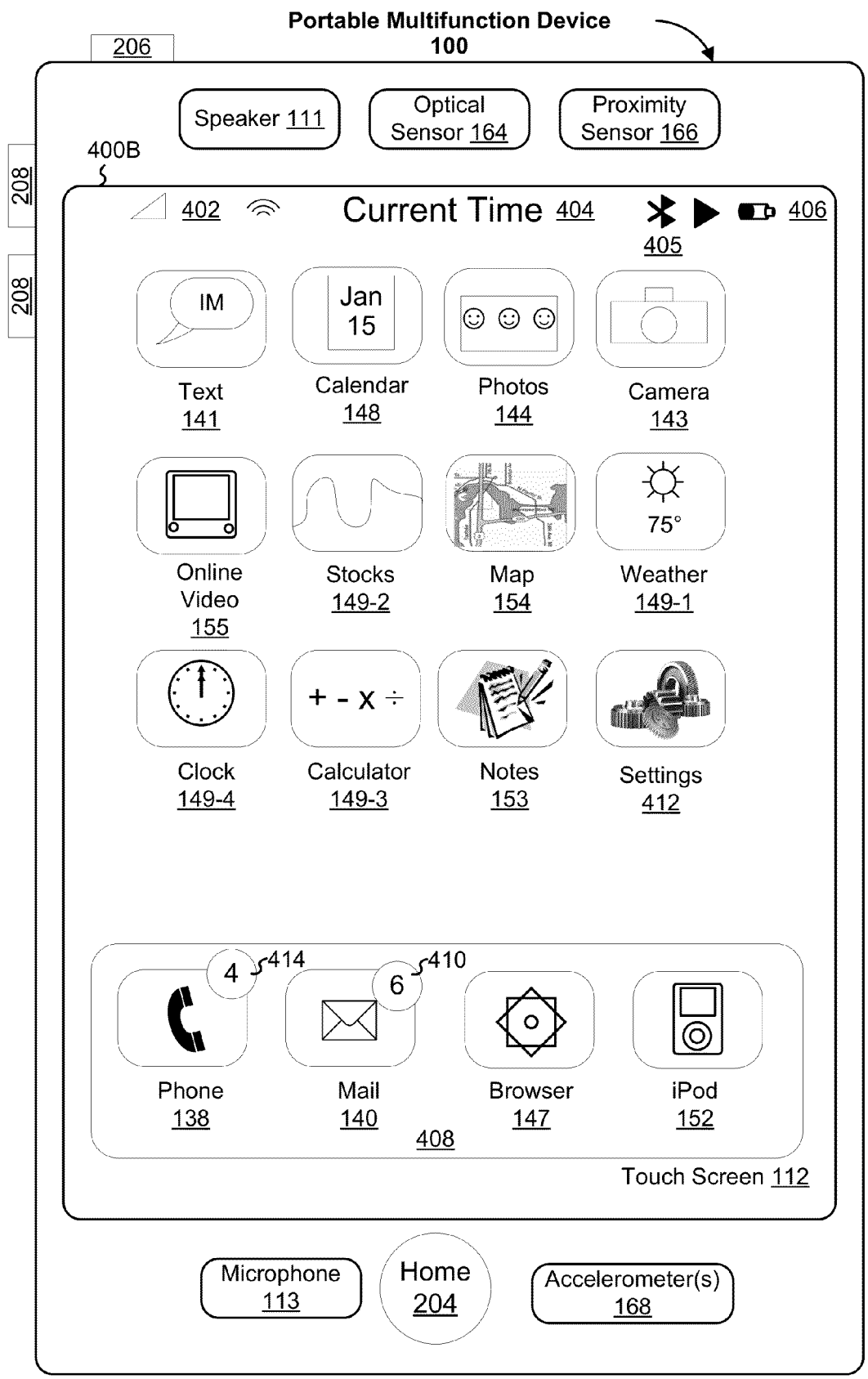

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;
Time 404;
Battery status indicator 406;
Tray 408 with icons for frequently used applications, such as:
Phone 138, which may include an indicator 414 of the number of missed calls or voicemail messages;
E-mail client 140, which may include an indicator 410 of the number of unread e-mails;
Browser 147; and
Music player 146; and
Icons for other applications, such as:
IM 141;
Image management 144;
Camera 143;
Video player 145;
Weather 149-1;

Stocks 149-2;

Blog 142;

Calendar 148;

Calculator 149-3;

Alarm clock 149-4;

Dictionary 149-5; and

User-created widget 149-6.

In some embodiments, user interface 400B includes the following elements, or a subset or superset thereof:

- 402, 404, 406, 141, 148, 144, 143, 149-3, 149-2, 149-1, 149-4, 410, 414, 138, 140, and 147, as described above;
- Map 154;
- Notes 153;
- Settings 412, which provides access to settings for the device 100 and its various applications 136, as described further below;
- Video and music player module 152, also referred to as iPod (trademark of Apple Computer, Inc.) module 152; and
- Online video module 155, also referred to as YouTube (trademark of Google, Inc.) module 155.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Figure 5A:
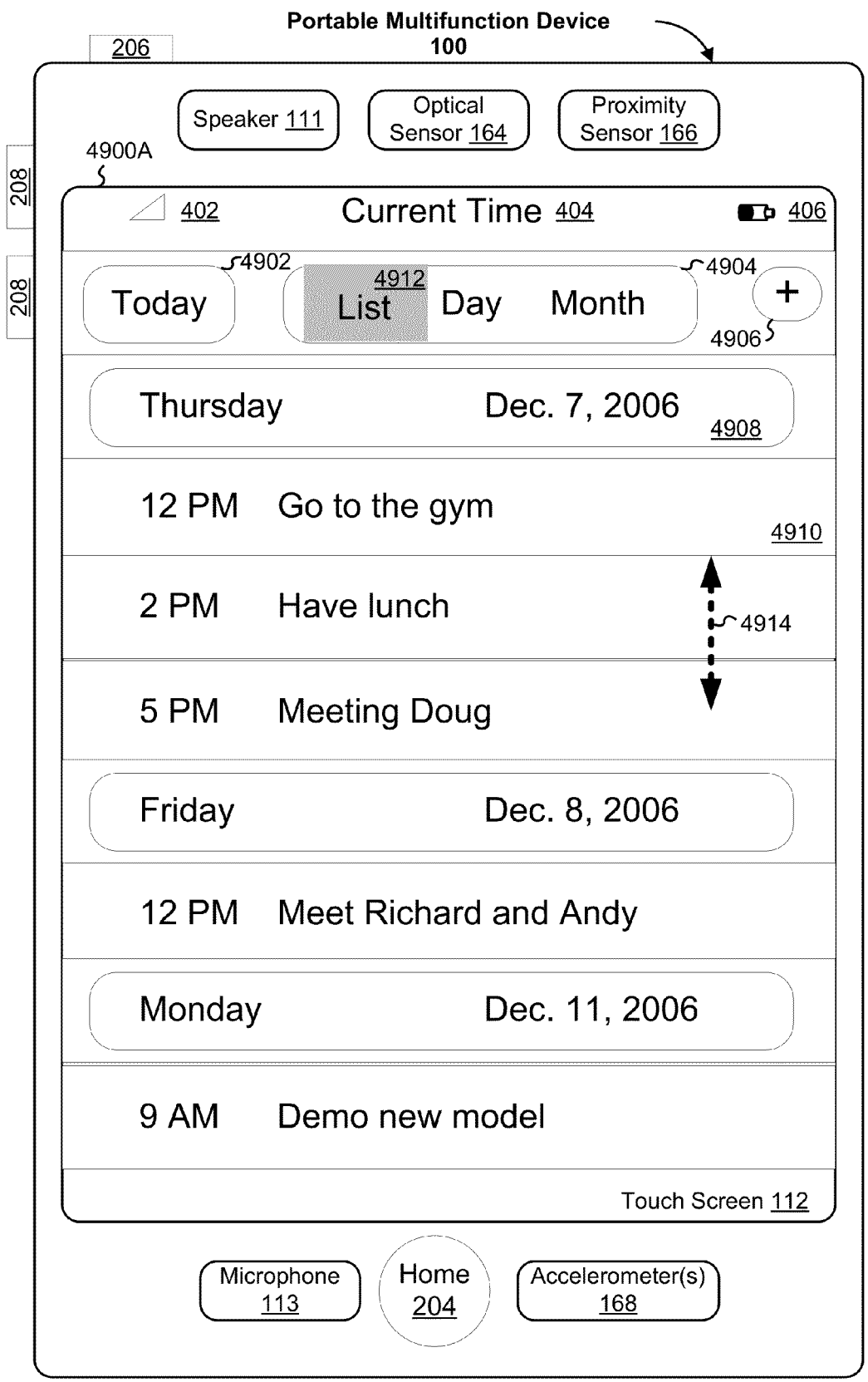
FIGS. 5A-5M illustrate exemplary user interfaces for displaying and managing calendar entries in accordance with some embodiments.

FIGS. 5A-5M illustrate exemplary user interfaces for displaying and managing calendar entries. FIG. 5A illustrates UI 4900A, which displays a calendar in a list-view mode. UI 4900A includes the following elements or a subset or superset thereof:

- 402, 404, and 406, as described above;
- today icon 4902;
- display mode icon 4904;
- add calendar entry icon 4906;
- day headers 4908; and
- calendar entries 4910.

The highlighted portion 4912 of the display mode icon 4904 indicates which view of the calendar is being displayed. As shown in FIG. 5A, a list view of the calendar is being displayed, and therefore, the highlighted portion 4912 corresponds to the list view. In some embodiments, a respective calendar may be displayed in a list, day, or multiweek view. The multiweek view may include a monthly view. The appropriate section of the display mode icon 4904 is highlighted according to which view of the calendar is being displayed. The term "highlight" is used here to mean displaying in a visually distinctive manner, such as changing one or more of the following: background color, background fill pattern, bolding, underlining, font color, font, etc.

A user may perform a finger contact within the display mode icon 4904 on, or within the area immediately surrounding the desired calendar view to display.

UI 4900A also includes a today icon 4902, which when activated, for example by a finger contact, initiates display of today's events in the then active calendar view (e.g., in the list, day, or month view). When a user selects the today icon 4902, the corresponding calendar for the current day is displayed.

UI 4900A also includes an add calendar entry icon 4906. The add calendar entry icon 4906 allows a user to add calendar entries to a desired day. As will be described later, FIGS. 5I-5M illustrate exemplary user interfaces for adding a calendar entry.

In some embodiments, UI 4900A includes a list calendar, which includes day headers 4908 and calendar entries 4910. The day header 4908 appears above the corresponding calendar entry or entries for a particular day. In some embodiments, days without any calendar entries are not displayed on the user interface.

A user may scroll through the calendar by making a vertical finger swipe 4914 anywhere on the list calendar.

Figure 5B:
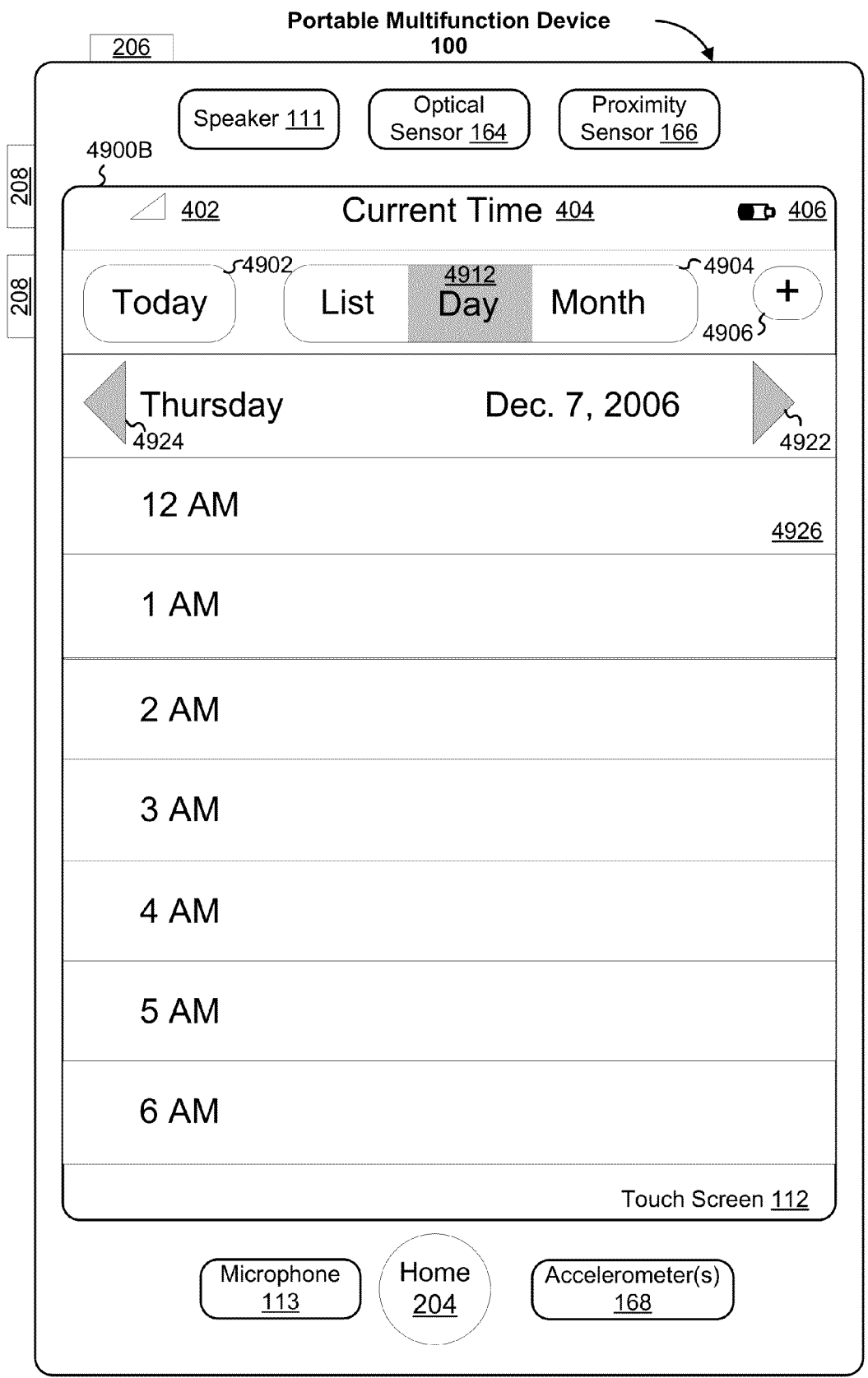

FIG. 5B illustrates UI 4900B, which displays a calendar in a day-view mode. UI 4900A includes the following elements or a subset or superset thereof:

- 402, 404, 406, 4902, 4904, and 4906 as described above;
- day forward icon 4922 that when activated (e.g., by a finger tap of the icon) displays the day-view of the calendar for the following day;
- day backward icon 4924 that when activated (e.g., by a finger tap of the icon) displays the day-view of the calendar for the preceding day; and
- time slots 4926.

Figure 5C:
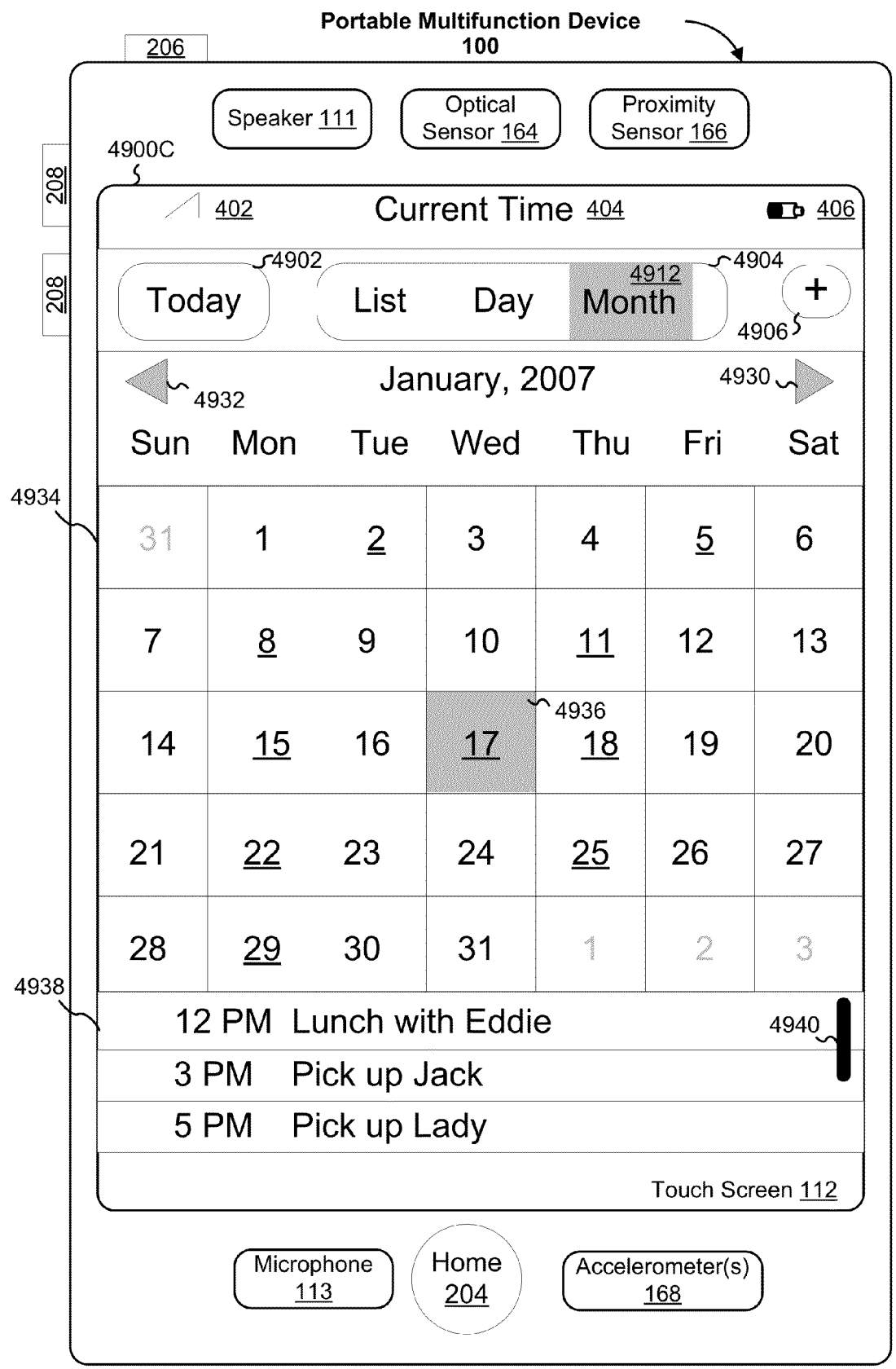

FIG. 5C illustrates UI 4900C, which displays a calendar in a month-view mode. UI 4900A includes the following elements or a subset or superset thereof:

- 402, 404, 406, 4902, 4904, and 4906 as described above;
- month forward icon 4930 that when activated (e.g. by a finger tap of the icon) displays the month-view of the calendar for the following month;
- month backward icon 4932 that when activated (e.g. by a finger tap of the icon) displays the month-view of the calendar for the preceding month;
- monthly calendar 4934 that includes calendar day icon 4936;
- list of events 4938; and
- vertical bar 4940, which indicates the portion of the list 4938 being displayed.

UI 4900C a calendar in month-view mode is displayed while simultaneously displaying a list of events 4938 for a selected day. In some embodiments, a respective selected day is indicated by highlighting (e.g., day icon 4936 is highlighted in FIG. 5C).

At a portable multifunction device with a touch screen display, a multiweek calendar is displayed on the touch screen display. A contact on an individual day in the multiweek calendar is detected, and in response to detecting the contact on the individual day, at least a portion of a list of events on the contacted individual day is displayed while continuing to display the multiweek calendar (FIG. 5C).

In some embodiments, the contact is a finger contact on or near the touch screen display. In some other embodiments, the contact is a stylus contact on or near the touch screen display.

In some embodiments, the multiweek calendar is a monthly calendar, as illustrated in FIGS. 5C-5H.

Figure 5D:
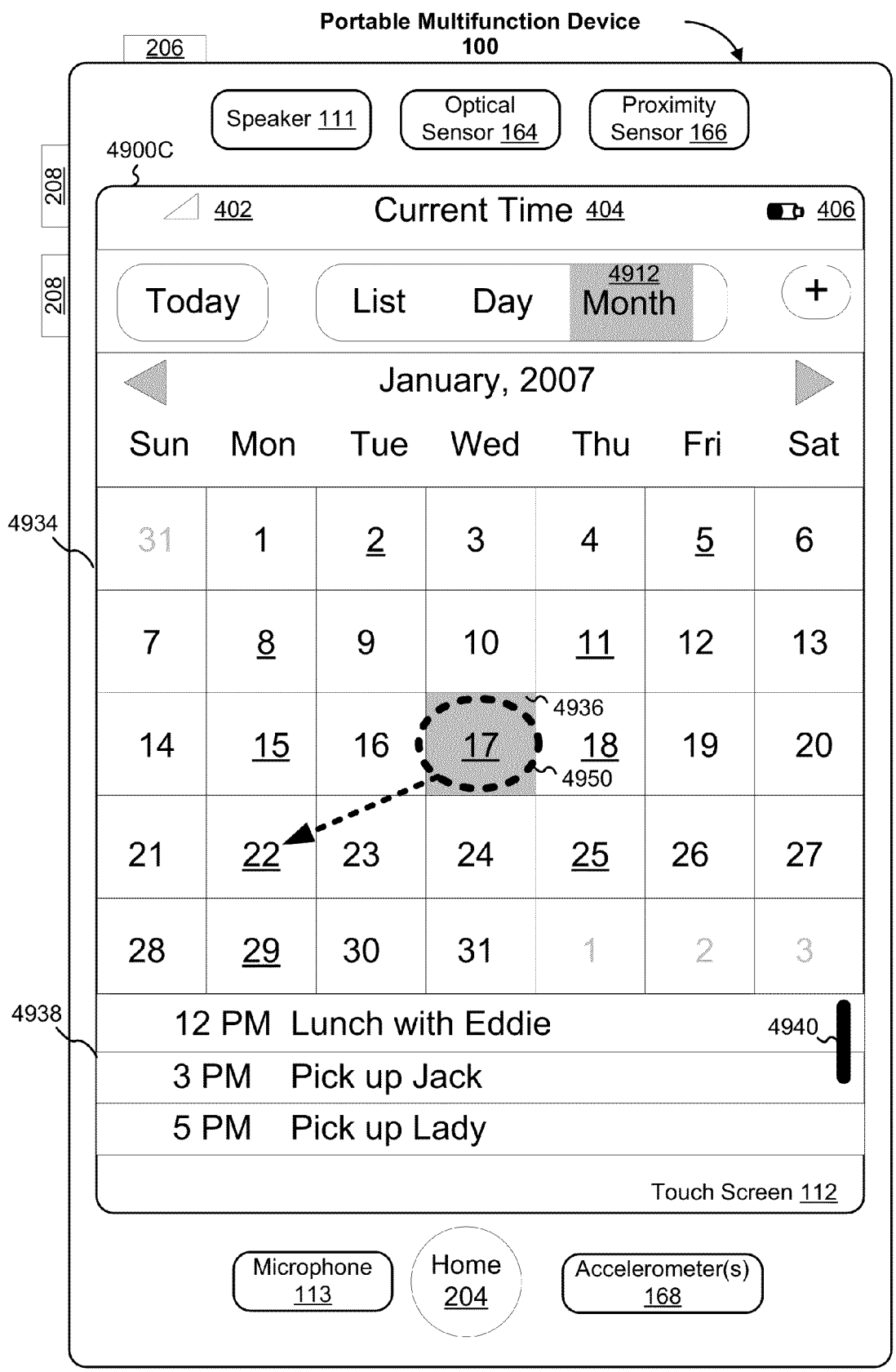
Figure 5E:
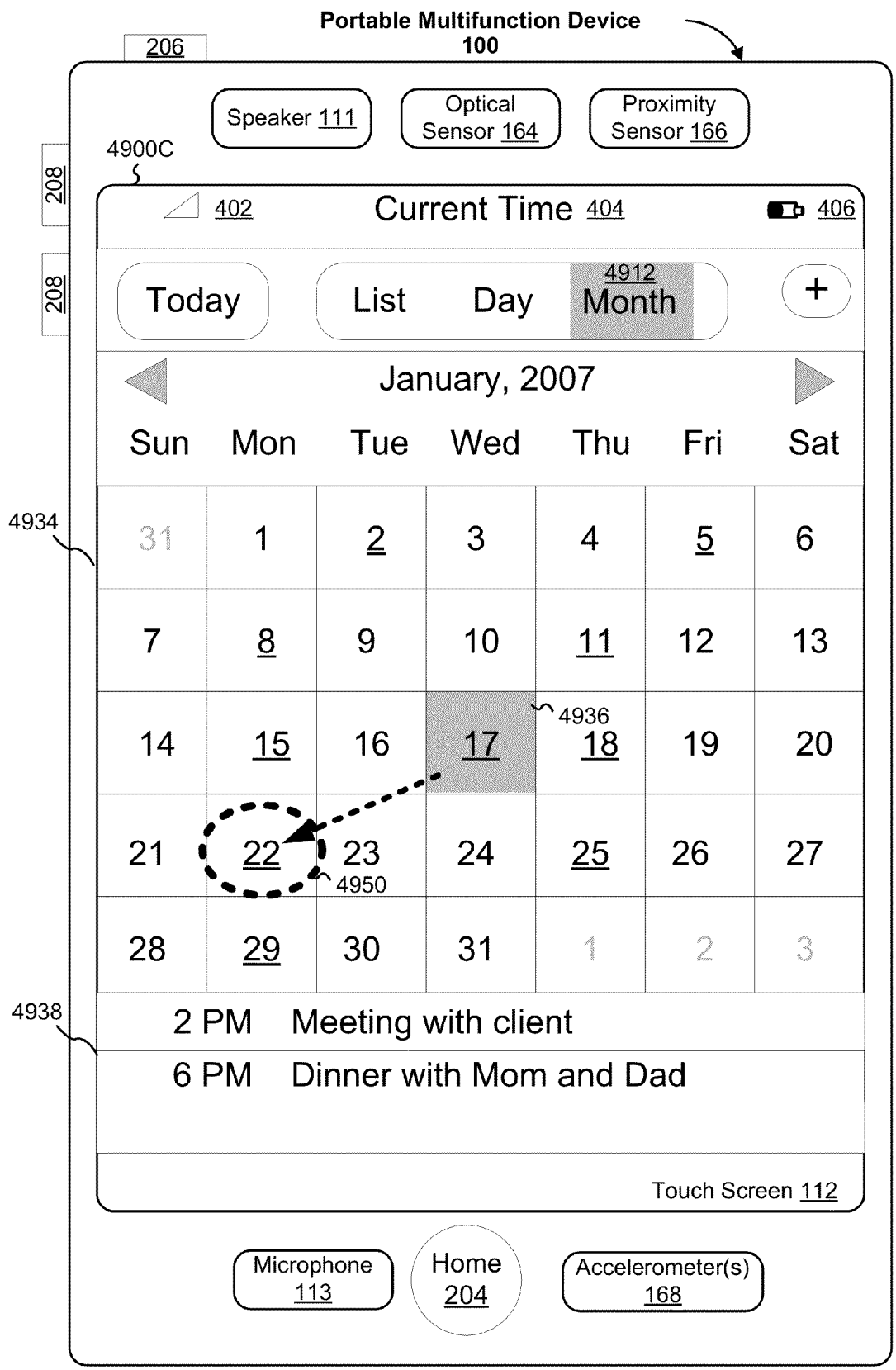
Figure 5F:
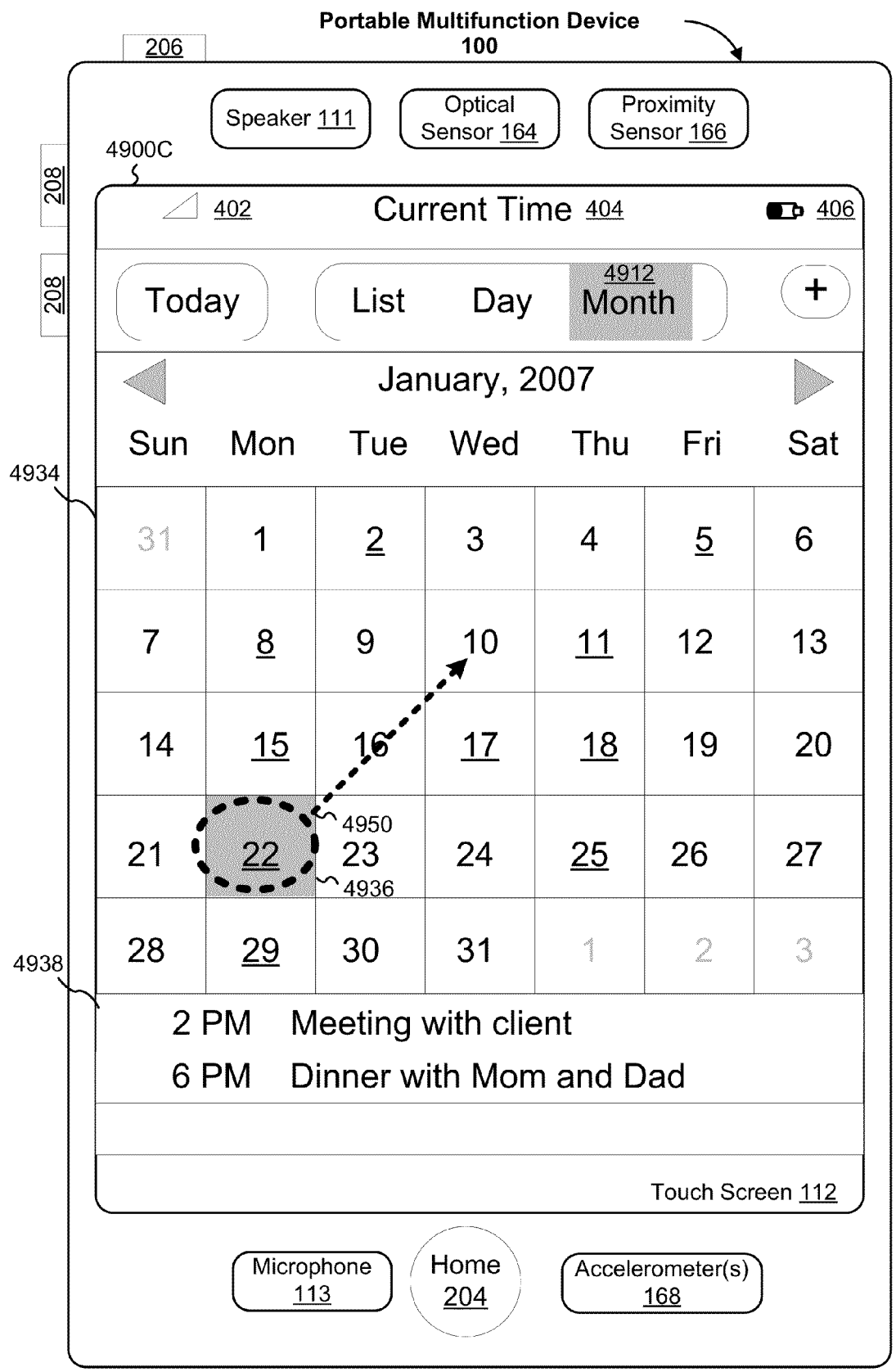

As will be described in FIGS. 5D-5G, a user may change the list of events 4938 being displayed by making a finger contact on the touch screen 112 within the grid of the monthly calendar 4934. As shown in FIG. 5D, a user starts with the user's finger touching the highlighted calendar day icon, as indicated by finger contact area 4950. As seen in FIG. 5D, the list of events 4938 corresponds to the highlighted calendar day icon 4936. The user continues with finger contact 4950 and moves, or scrubs, the user's finger along the touch screen 112 within the grid of the monthly calendar 4934 in the direction of the arrow, as demonstrated in FIG. 5D. As the user's finger contact 4950 stops on a particular day, the list of events 4938 being displayed changes accordingly, as shown in FIG. 5E.

In some embodiments, the list of events 4938 is scrollable. In some embodiments, the list of events is configured to scroll in response to a finger gesture on the list of events. In some embodiments, the finger gesture is a swipe gesture.

A gesture on the list of events is detected, and in response to detecting the gesture on the list, list of events scrolls while continuing to display the multiweek calendar. In some embodiments, the gesture is a gesture with a finger.

In some embodiments, contacts with a plurality of days in the multiweek calendar is sequentially detected, and in response to detecting contacts with the plurality of days, lists of events are sequentially displayed for at least some of the plurality of days while continuing to display the multiweek calendar. In some embodiments, the sequentially detected contacts correspond to movement of a single, unbroken finger contact with the touch screen display, also known as scrubbing, as described above.

In some embodiments, in response to detecting contacts with the plurality of days, the plurality of days in the multiweek calendar is sequentially highlighted.

Figure 5G:
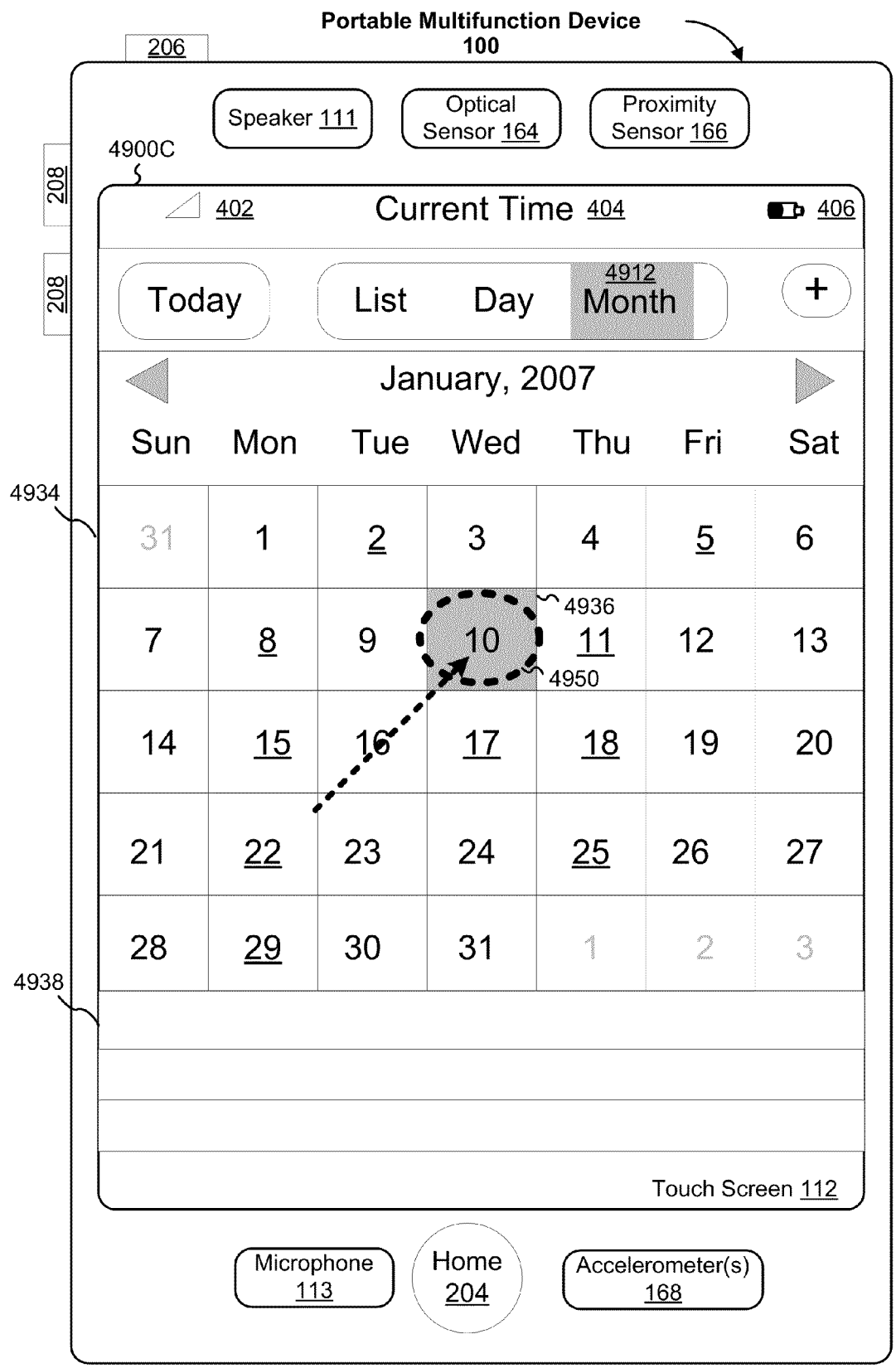

In some embodiments, when a user's finger contact continues to scrub along the touch screen 112 (see FIG. 5F) to a calendar day icon 4936 with no corresponding calendar entries, and the finger contact movement stops on such day, no list of events is shown, as illustrated in FIG. 5G.

In some embodiments, indicia for each day in the multiweek calendar that has at least one event is displayed. In some embodiments, the calendar day icon 4936 may indicate whether or not the corresponding day contains calendar entries. In some embodiments, calendar days containing corresponding calendar entries are indicated with an underscore below the date in the calendar day icon 4936, as shown in FIGS. 5C-5H.

Figure 5H:
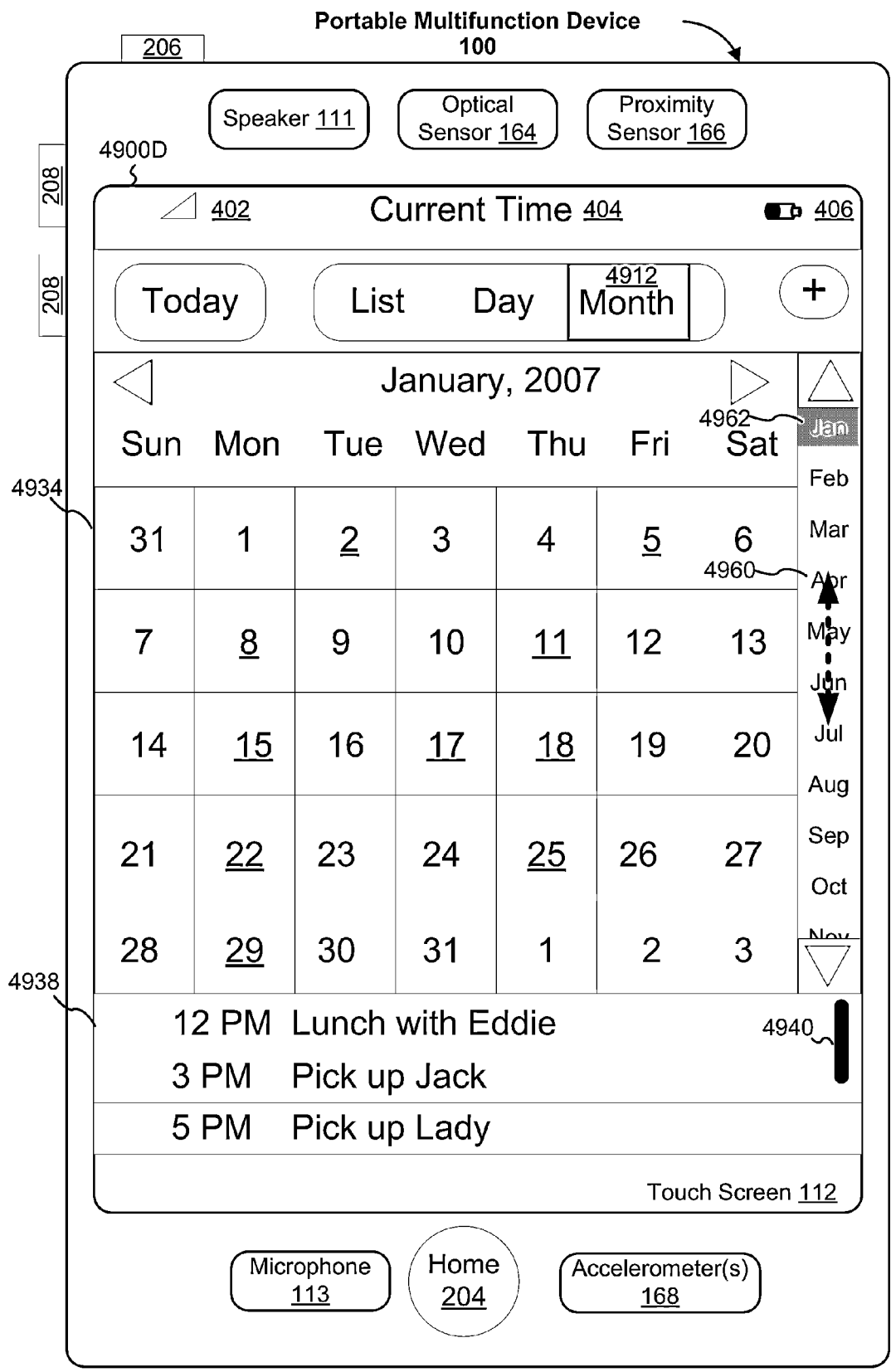

FIG. 5H illustrates UI 4900D, which displays a calendar in a month-view mode according to some embodiments. UI 4900D includes many of the same features as US 4900C, and also includes month scroll bar 4960. The monthly calendar being displayed corresponds to the highlighted month in the month scroll bar. When a user performs a vertical finger swipe on the month scroll bar 4960, this allows the highlighted portion 4962 of the month scroll bar 4960 to vertically scroll through the months in the month scroll bar 4960. Accordingly, the corresponding monthly calendar is also displayed depending on which month in the month scroll bar is highlighted.

Figure 5I:
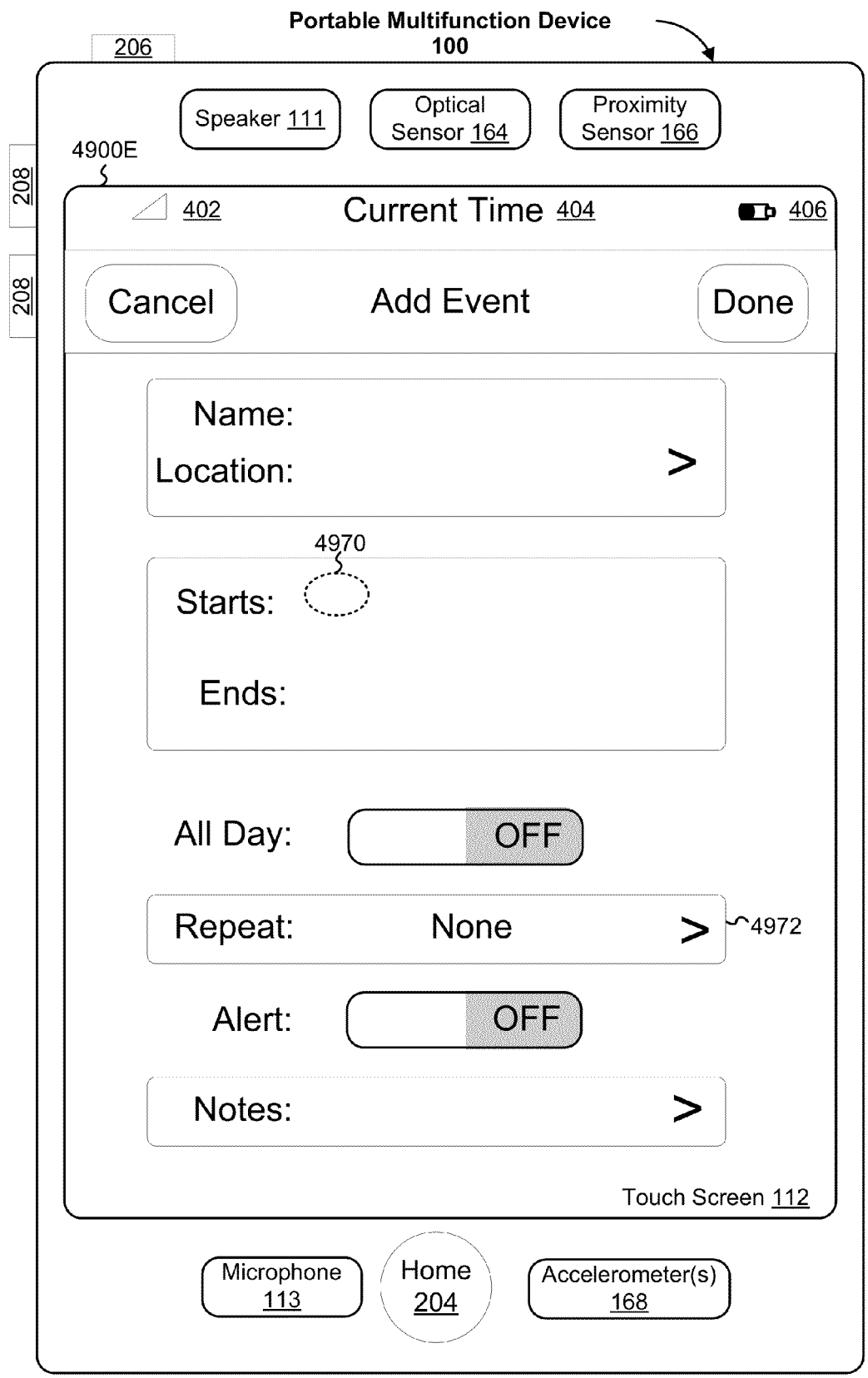
Figure 5J:
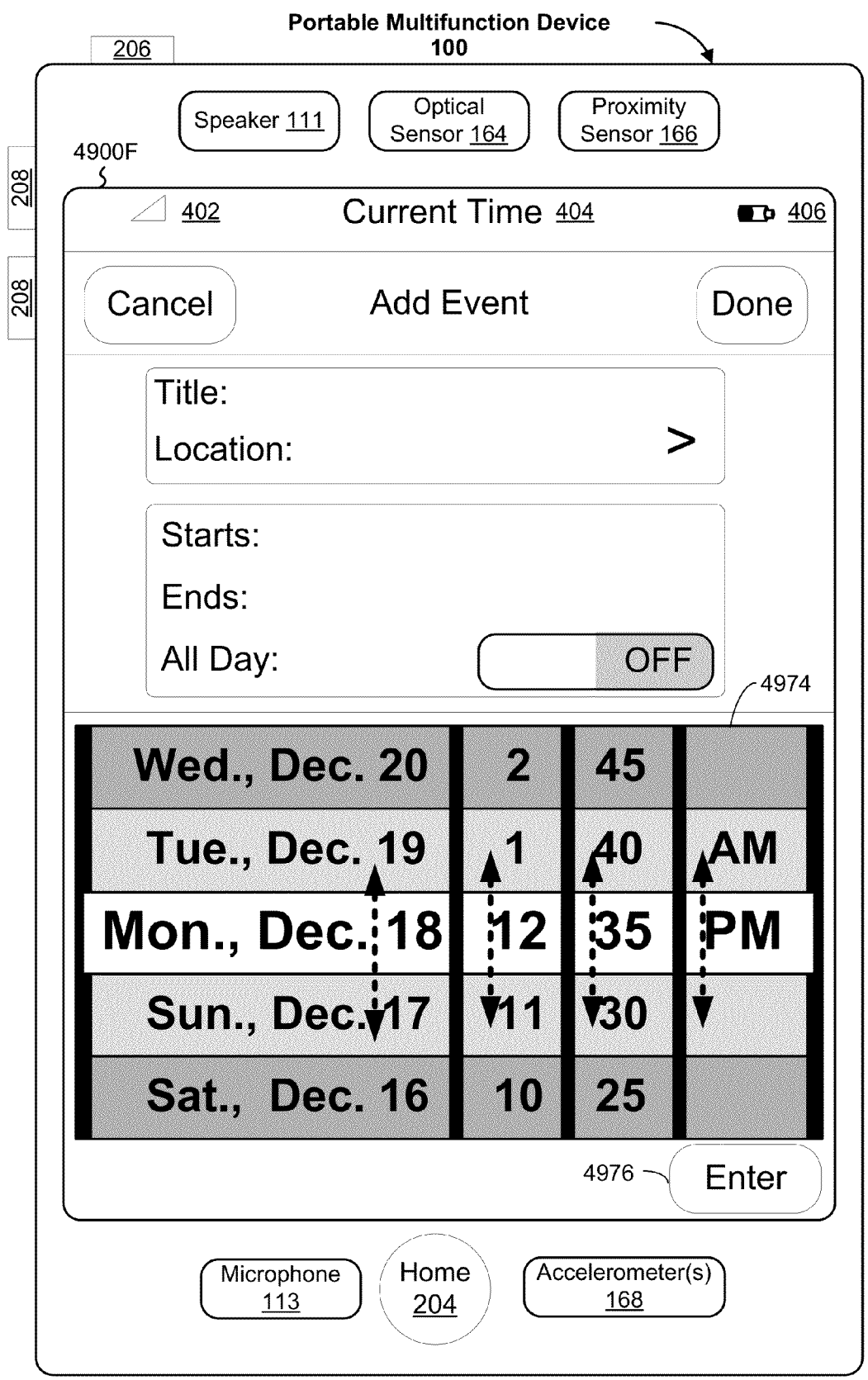
Figure 5K:
Figure 5L:
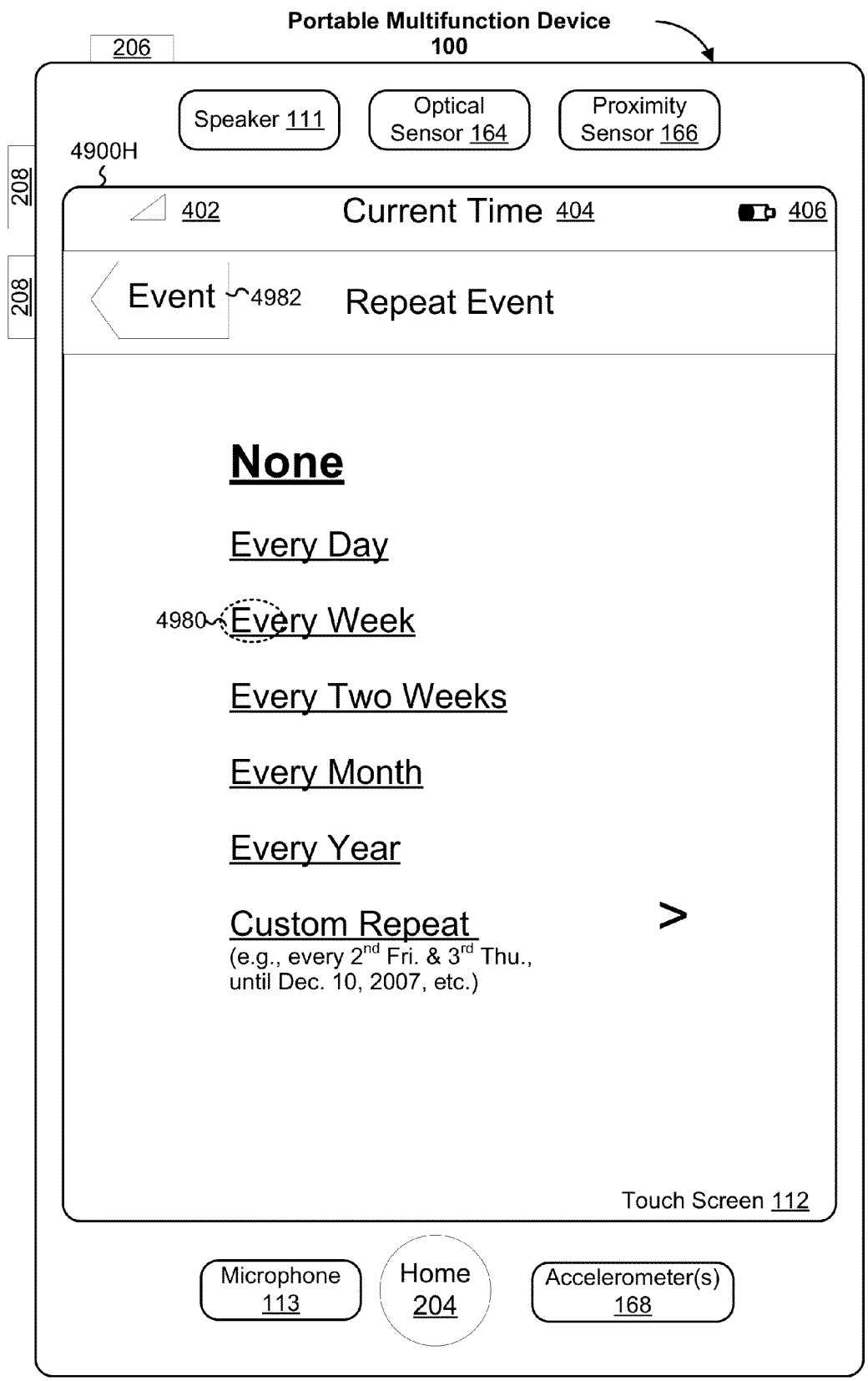
Figure 5M:
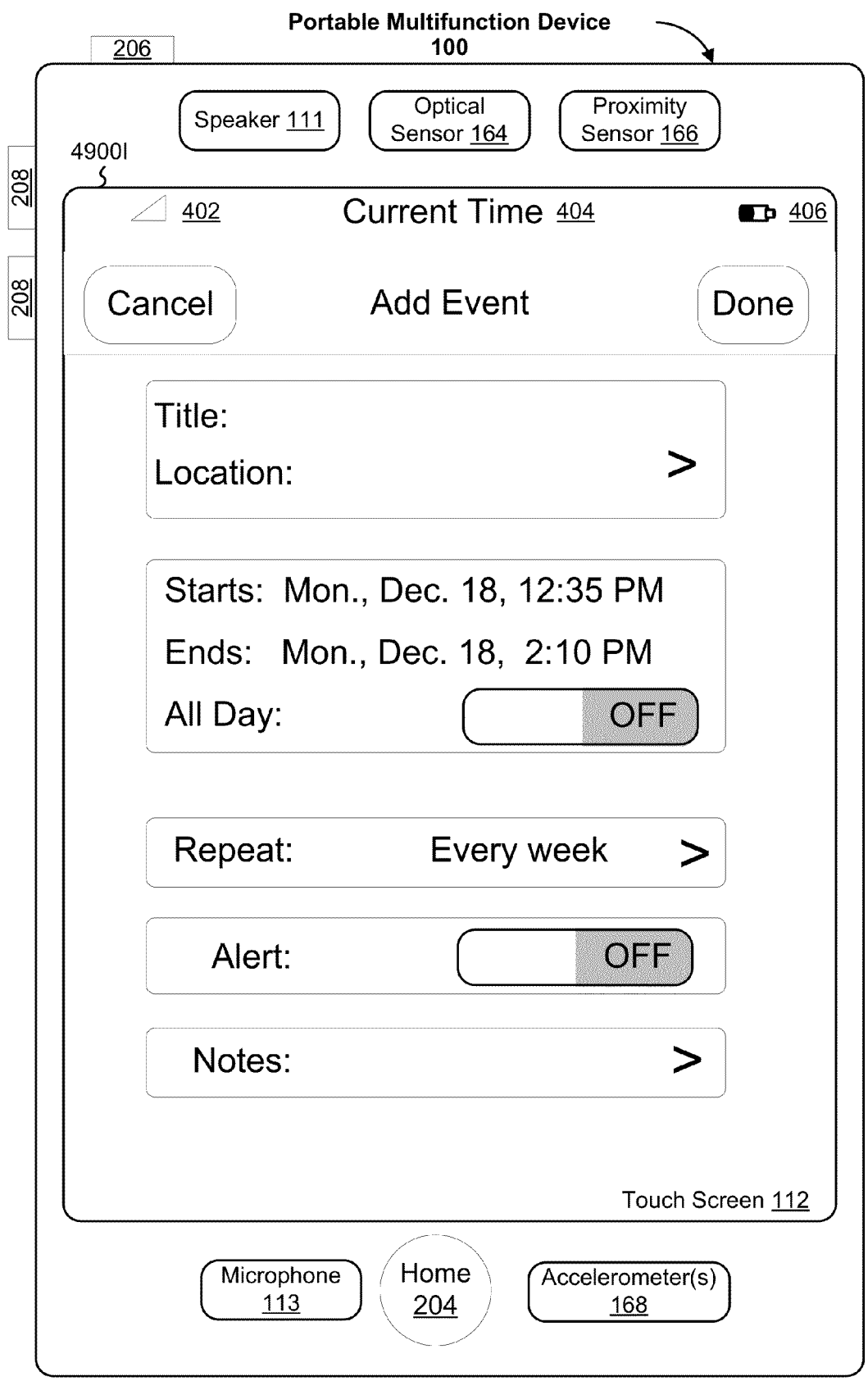

FIGS. 5I-5M illustrate exemplary user interfaces for adding calendar entries. In some embodiments, when a user selects the add calendar icon 4906, as shown in FIGS. 5A-5H, the UI 4900E is displayed (FIG. 5I). When a user makes a contact, for example on contact point 4970, and the contact point requires time entry, the UI 4900F (FIG. 5J) is displayed. UI 4900F includes wheels of time 4974. Vertical finger swipes (as represented by vertical doubled headed arrows in FIG. 5J) may be performed along each vertical column (e.g., a date, hour, minute, or AM/PM column) thereby causing the entries to rotate accordingly. Once the desired time entry is reached, enter icon 4976 may be selected and the appropriate time entry is displayed in the appropriate field in UI 49001 (FIG. 5M). In some embodiments, once the desired time entry is reached, the appropriate time entry is displayed in the appropriate field in UI 49001 (FIG. 5M) without needing to select an enter icon.

In some embodiments, if a user desires to enter an all day event, UI 4900G is displayed (FIG. 5K). Finger swipes are performed within the wheel and the date rotates accordingly.

In some embodiments, if repeat icon 4972 in FIG. 5I is selected, UI 4900H is displayed (FIG. 5L). A user may have the entry entered for the same time every week by selected at contact point 4980. Alternately, the user may have the entry entered for the same time at another interval (e.g., every day, every two weeks, every month, every year, or a custom repeat interval) as indicated by a different user selection within the repeat event UI 4900H. When the event icon 4982 (FIG. 5L) is selected, the appropriate repeat information is displayed in UI 49001 (FIG. 5M).

Figure 6A:
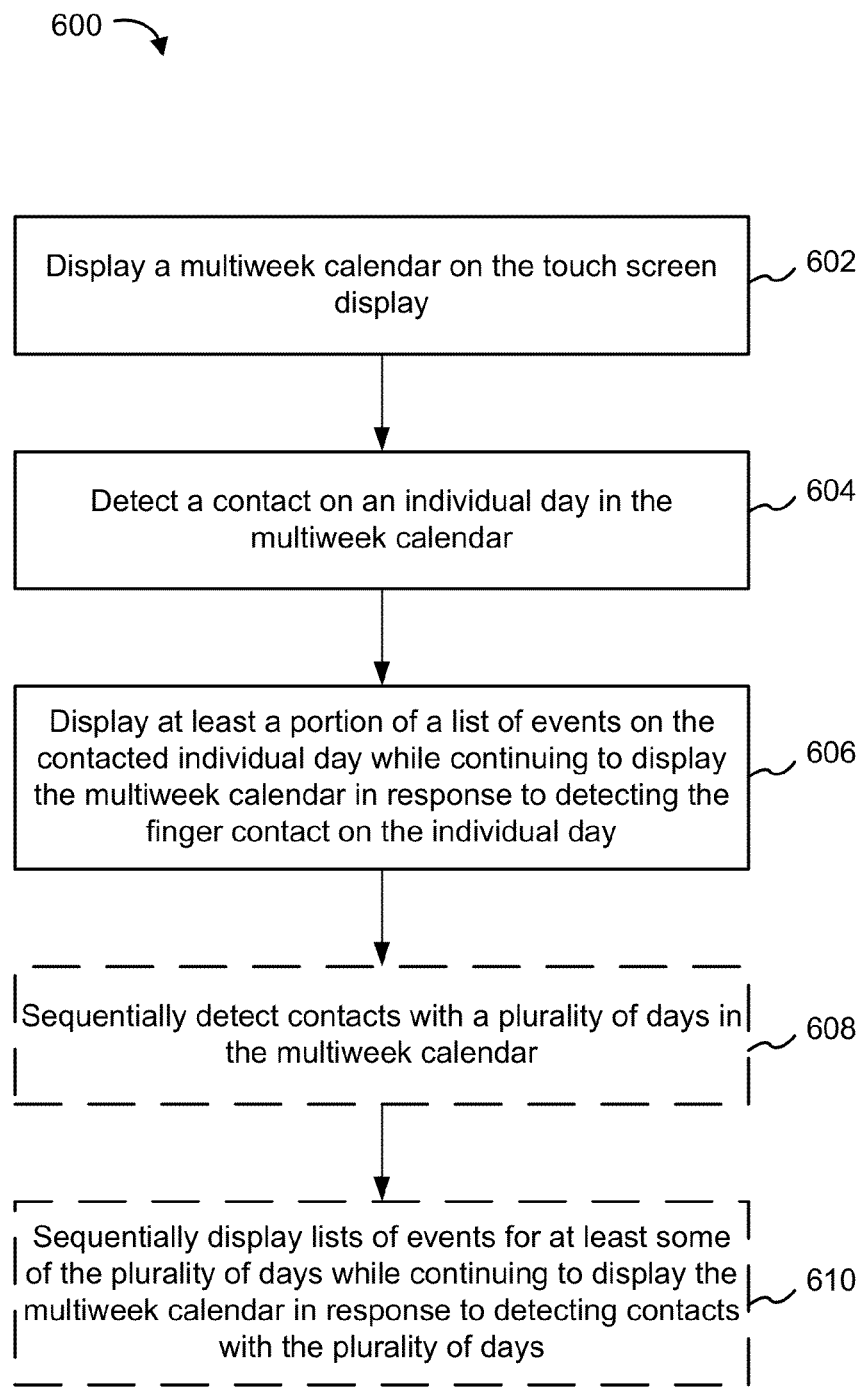
FIGS. 6A-6B are flow diagrams of processes for displaying and managing calendar entries in accordance with some embodiments.

FIG. 6A illustrates is a flow diagram of a process 600 for displaying and managing calendar entries in accordance with some embodiments. In some embodiments, the process 600 is performed by a portable electronic device with a touch screen display. The device displays a multiweek calendar on the touch screen display (602), e.g., UI 4900C of FIG. 5C. If a user touches a desired day on the multiweek display, the device detects the finger contact on that individual day in the multiweek calendar (604). As a response to the finger contact on the individual day, the device displays at least a portion of a list of events 4938 on the contacted individual day while continuing to display the multiweek calendar (606).

In some embodiments, if a user sequentially contacts the touch screen display on a plurality of days, the device sequentially detects the contact with the plurality of days in the multiweek calendar (608). In response to detecting the contacts, the device sequentially displays lists of events for at least some of the plurality of days while continuing to display the multiweek calendar (610), e.g., FIGS. 5D-5G.

Figure 6B:
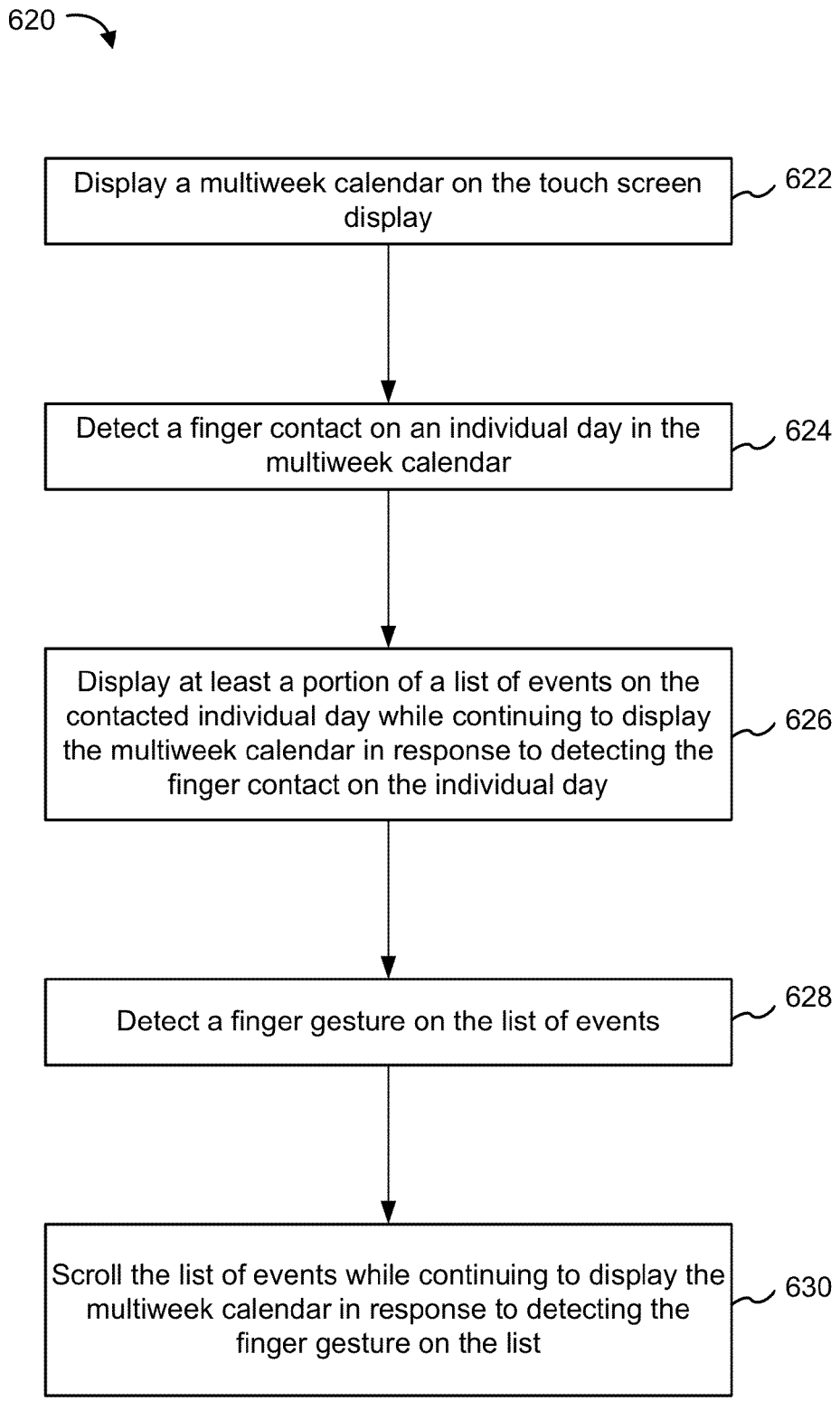

FIG. 6B illustrates is a flow diagram of a process 620 for displaying and managing calendar entries in accordance with some embodiments. In some embodiments, the process 620 is performed by a portable electronic device with a touch screen display. The device displays a multiweek calendar on the touch screen display (622), e.g., UI 4900C of FIG. 5C. If a user touches a desired day on the multiweek display, the device detects the finger contact on that individual day in the multiweek calendar (624). As a response to the finger contact on the individual day, the device displays at least a portion of a list of events 4938 on the contacted individual day while continuing to display the multiweek calendar (626). If a finger gesture is detected on the list of events being displayed (628), the device scrolls through the list of events while continuing to display the multiweek calendar (630).

Figure 7A:
FIGS. 7A-7S illustrate exemplary user interfaces for accessing a calendar application on a portable multifunction device in accordance with some embodiments.

FIGS. 7A-7S illustrate exemplary user interfaces for accessing a calendar application on a portable multifunction device 100 in accordance with some embodiments. An overview of these user interfaces is provided below.

FIG. 7A shows a device held in a portrait orientation, displaying a multiweek month view (e.g., for October, 2007). The figure shows detecting a contact 7001 on an individual day 7010 (e.g., Oct. 29, 2007) and displaying at least a portion of a list of events on the contacted individual day while continuing to display the multiweek calendar. The list of events on the contacted individual day 7010 (e.g., Oct. 29, 2007) includes an invitation to the event (the agenda review). In response to detecting a contact 7001 (e.g. a finger gesture or a stylus) on a given day on the calendar, the device displays events listed on the corresponding day, including invitations to events. The list of events on any given day is scrollable, in response to detecting a gesture on the list of events. The gesture may be a finger gesture, such as a swipe gesture 7003. In some embodiments, a contact 7002 is detected on an invitation inbox icon 7040, which initiates display of an invitation inbox (e.g., as shown in FIG. 7C).

Figure 7B:
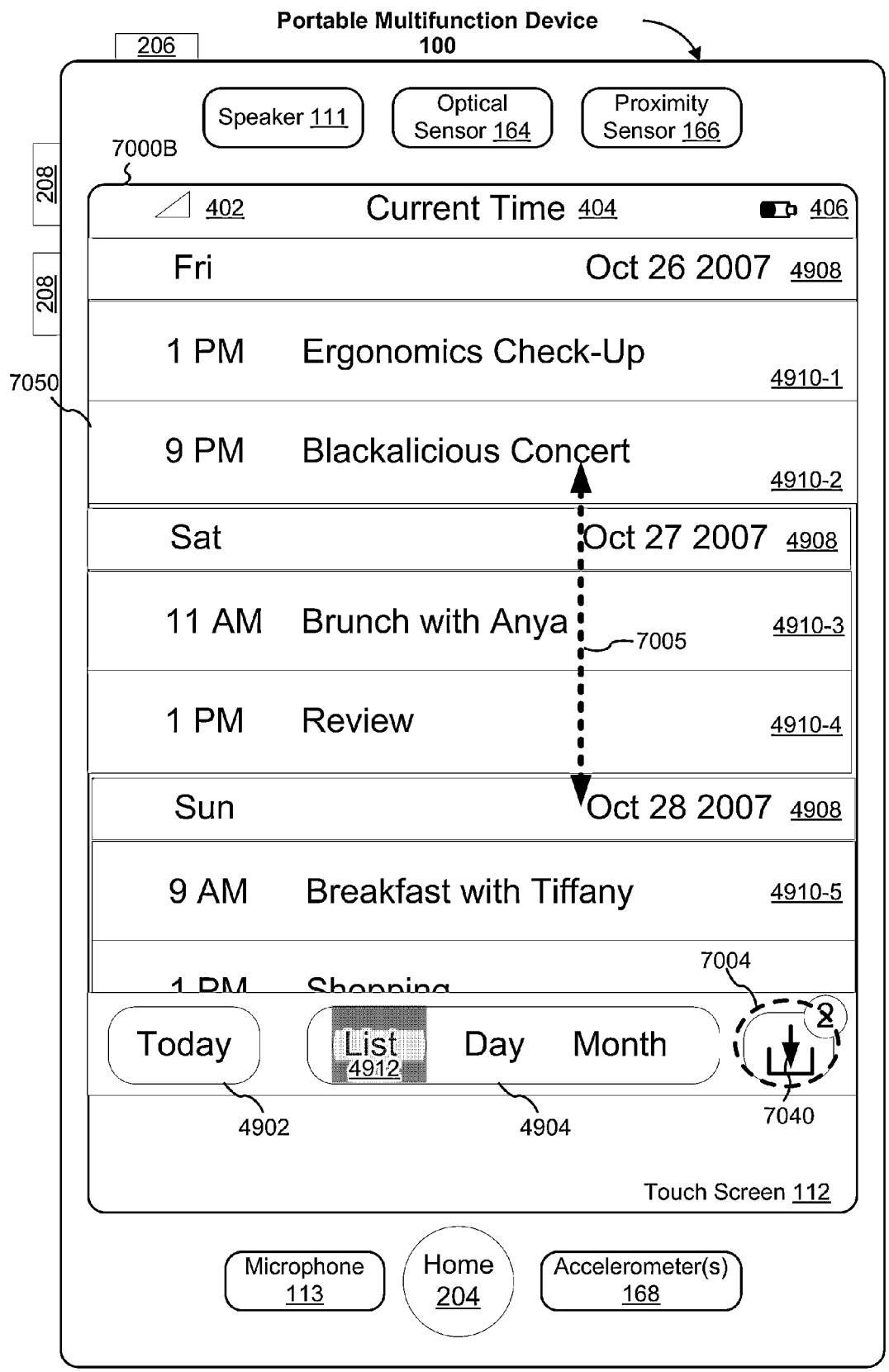

FIG. 7B shows a device held in a portrait orientation (with a substantially vertical orientation of a long axis of the touch screen) displaying a list view of daily events for a multiplicity of days. The list is vertically scrollable to permit a user to see events on earlier or later days. A set of icons are provided to initiate display of "Today" events, and to initiate display of events in a list view, day view or month view, in response to detecting a user gesture on the corresponding icon. An icon 7040 is provided for accessing an invitation inbox and for displaying of a number of unread calendar invitations. In some embodiments, a contact gesture 7004 is detected on the invitation inbox icon 7040, which initiates display of an invitation inbox (e.g., as shown on FIG. 7C).

Figure 7C:

FIG. 7C shows a device held in a portrait orientation, displaying an exemplary list (inbox) of calendar invitations received by the device. In this list, there are two exemplary calendar invitations, first a design review invitation 7062-1, and second a patent meeting invitation 7062-2. In the present example, both invitations are marked as unread, as indicated by the dot 7070 to the left side of each calendar invitation. In response to detecting a user gesture on the "Done" button 7008 in the title bar, the device exits from the calendar invitation inbox. In FIG. 7C, in response to detecting a user selection gesture 7007 on the design review invitation 7062-1, the device displays details of the invitation, as shown in FIG. 7D.

Figure 7D:
Figure 7E:
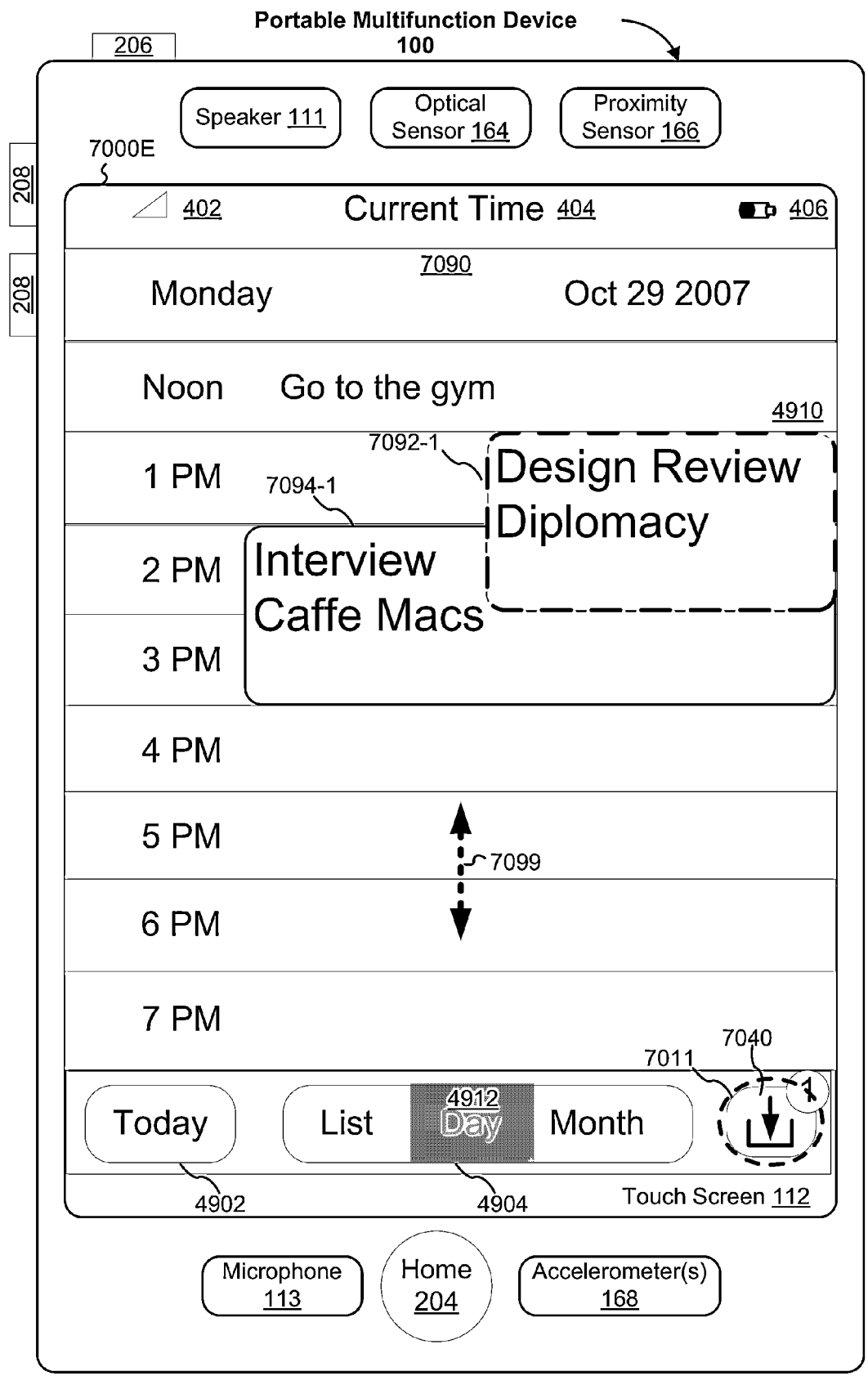

FIG. 7D shows a device displaying information details of an exemplary invitation, the design review invitation 7062-1. These details include the title of the meeting, location (Diplomacy room), date, time, sender of the invitation (Christie), attendees, and notes regarding the meeting. The calendar invitation also includes a "Show in calendar" icon 7082 which if activated by the user (e.g., by finger gesture 7009) initiates display of the invitation in the user's calendar (e.g., as shown in FIG. 7E). The calendar invitation also includes icons for the user to accept (7091) the meeting, to indicate that the user may attend (7093), and to decline (7095) the meeting. In some embodiments, the accept icon 7091 is green, the maybe icon 7093 is orange, and the decline 7095 icon is red.

FIG. 7E shows an exemplary day view (e.g., for Oct. 29, 2007) with an exemplary calendar invitation shown as a tentative calendar event 7092-1 (e.g., the design review meeting in Diplomacy room from 1 pm to 3 pm). This exemplary calendar invitation corresponds to the design review invitation discussed in FIGS. 7C-7D. The day view of FIG. 7E is vertically scrollable 7099 to permit a user to see events earlier and later in the day. In FIG. 7E, the tentative calendar event 7092-1 for the design review meeting is in conflict with a scheduled event, i.e., the interview meeting 7094-1 from 2 pm to 4 pm. In response to detecting a gesture 7011 on the invitation inbox icon 7040, the device 100 initiates display of the invitation inbox (e.g., UI 7000F, FIG. 7F).

Figure 7F:

FIG. 7F shows an exemplary list of calendar invitations received by the device. In this list, as described above, there are two calendar invitations 7062, first a design review invitation, and second a patent meeting invitation. In FIG. 7F, the design review invitation is marked as read (there is no dot 7070-1 for this invitation) and the word 'Accepted' is displayed, which indicates that the user has accepted this invitation. The patent meeting calendar invitation is marked as unread, as indicated by the dot 7070-2. The number of outstanding invitations has decreased from two in FIG. 7C to one in FIG. 7F, as the design review meeting has been read and accepted (FIG. 7D).

Figure 7G:
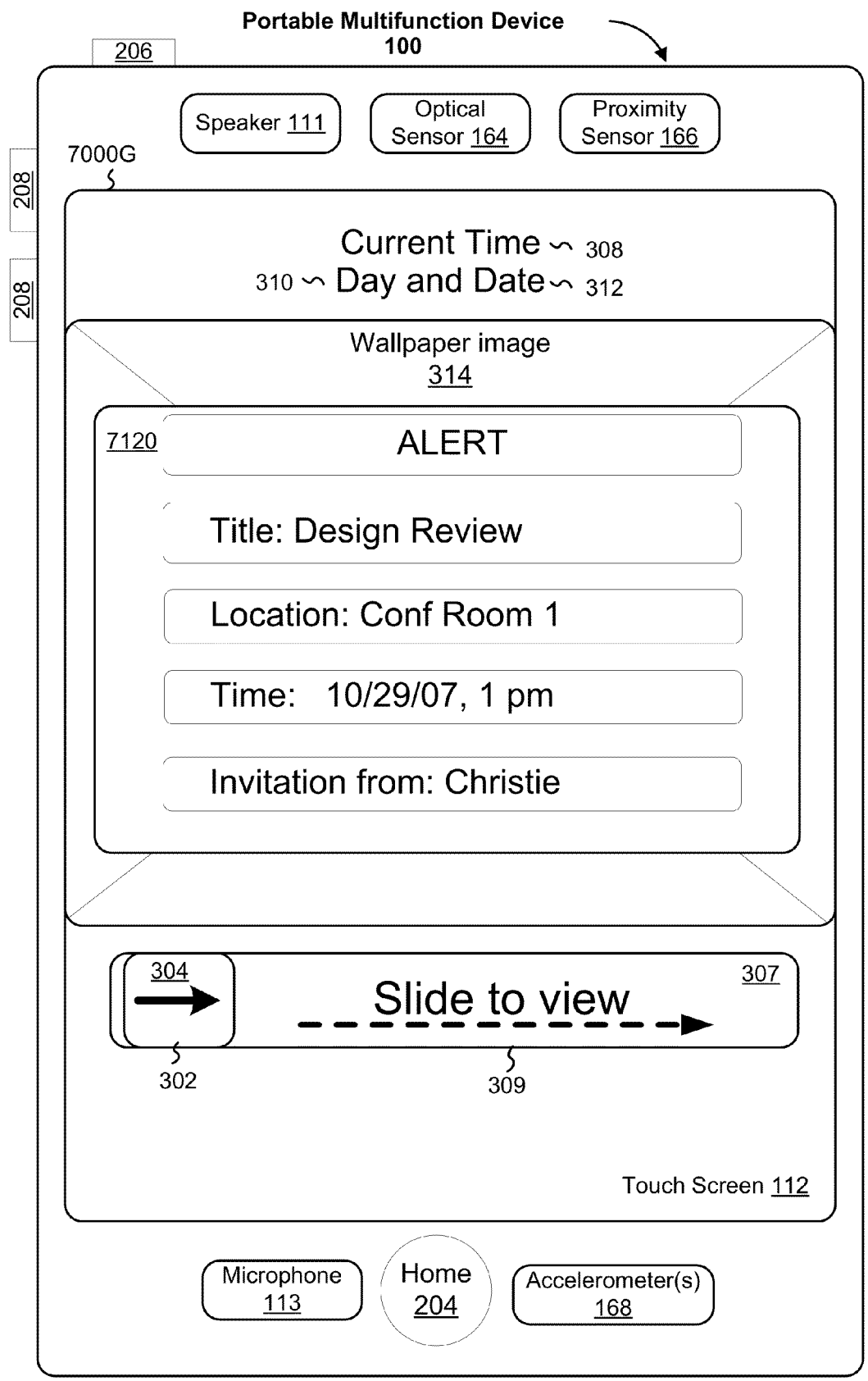

FIG. 7G shows an exemplary locked device displaying details of a calendar invitation from a party to a user of the device. An exemplary unlock icon 309 that includes image 302, arrow 304, and "slide to unlock" channel 306 (FIG. 3) has been replaced by an exemplary view-invitation icon 309 that includes image 302, arrow 304, and "slide to view" channel 307. If the device detects a user request to view the calendar invitation (e.g., a swipe gesture on image 302 in "slide to view" channel 307), the device immediately displays the calendar invitation in a calendar application, for example, as shown in FIG. 7D. In some embodiments, detecting a view-invitation gesture causes the device to display the invitation inbox (FIG. 7C) instead of the invitation (FIG. 7D). If no user activation of the view-invitation icon is detected within a predetermined period of time, the device ceases to display the portion of the calendar invitation on the touch screen display, and changes the view-invitation icon back to the unlock icon.

Figure 7H:
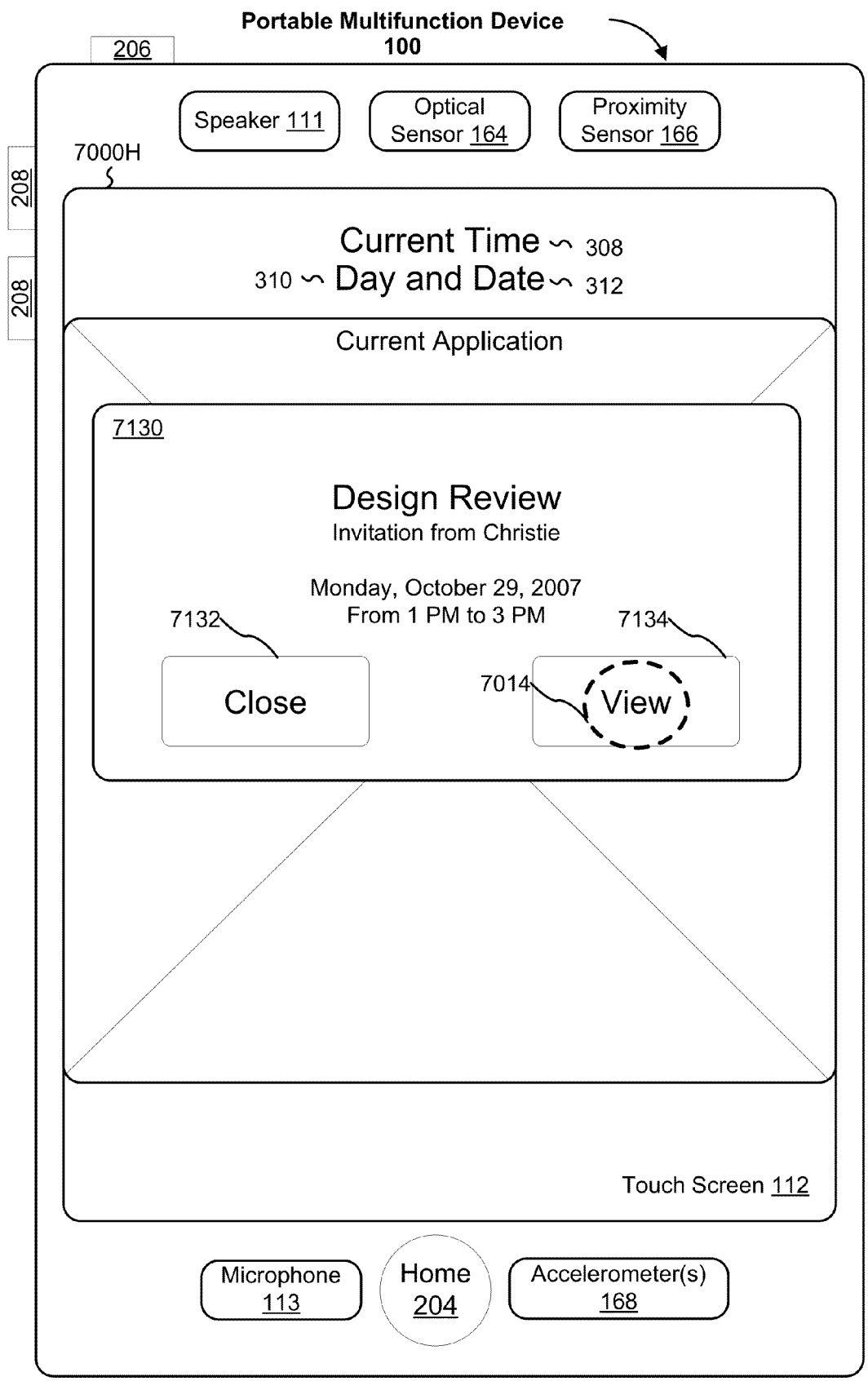

FIG. 7H shows a calendar invitation alert 7130 displayed over a current application while the device is unlocked. The calendar invitation alert is displayed in response to receipt by the device of a calendar invitation from a party to a user of the device. The calendar invitation alert displays at least a portion of the calendar invitation on the touch screen display. The alert includes icons to close (7132) the alert or to view (7134) the calendar invitation. In response to detecting a finger gesture 7014 on "View" icon 7134, the device displays the invitation in a calendar application (e.g., FIG. 7D). In some embodiments, in response to detecting a finger gesture 7014 on "View" icon 7134, the device displays the invitation inbox (FIG. 7C).

Figure 7I:
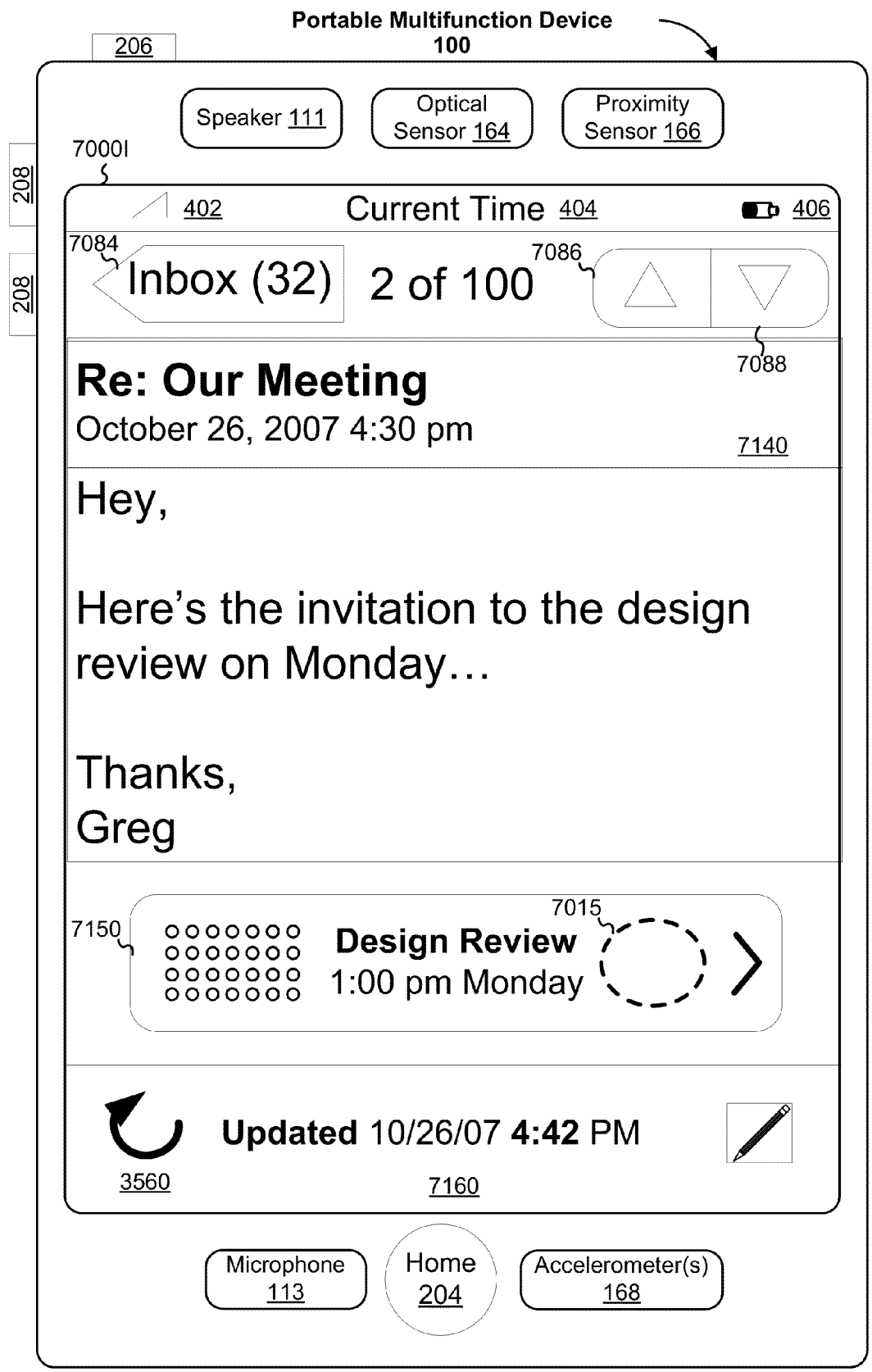

FIG. 7I shows an exemplary calendar invitation icon 7150 in an email sent by a party (e.g., Greg) to the user of the device. In some embodiments, the calendar invitation icon shows the time of the meeting (1 pm Monday), and the title of the meeting (Design Review). In response to detecting a finger gesture 7015 on calendar invitation icon 7150, the device displays the corresponding invitation in a calendar application (e.g., FIG. 7D). In some embodiments, in response to detecting a finger gesture 7015 on calendar invitation icon 7150, the device displays the invitation inbox (FIG. 7C). In some embodiments, an area 7160 contains information as to when the inbox was last updated and a refresh button 3560 to initiate refreshing the email inbox.

Figure 7J:

FIG. 7J shows a device 100 in a portrait orientation, displaying a multiweek calendar view for a month time period with a scrollable list 4938 of calendar events for a particular day (e.g., Oct. 29, 2007). The multi week calendar view is flat (appears as a flat page) and the scrollable list shows events from different types of calendars (e.g., a home calendar, a work calendar, and a personal calendar), as indicated by the three different calendar indicia symbols 7019 next to the events. In some embodiments, the multiweek view also includes a view options icon 7180. In some embodiments, in response to detecting a user gesture 7018 on the view options icon 7180, the device displays a curled up version of the calendar interface (e.g., FIG. 7M). In some embodiments, in response to detecting a user gesture 7028 on a Calendars icon 7016, the device displays a calendar options menu, as shown in FIG. 7L.

Figure 7K:
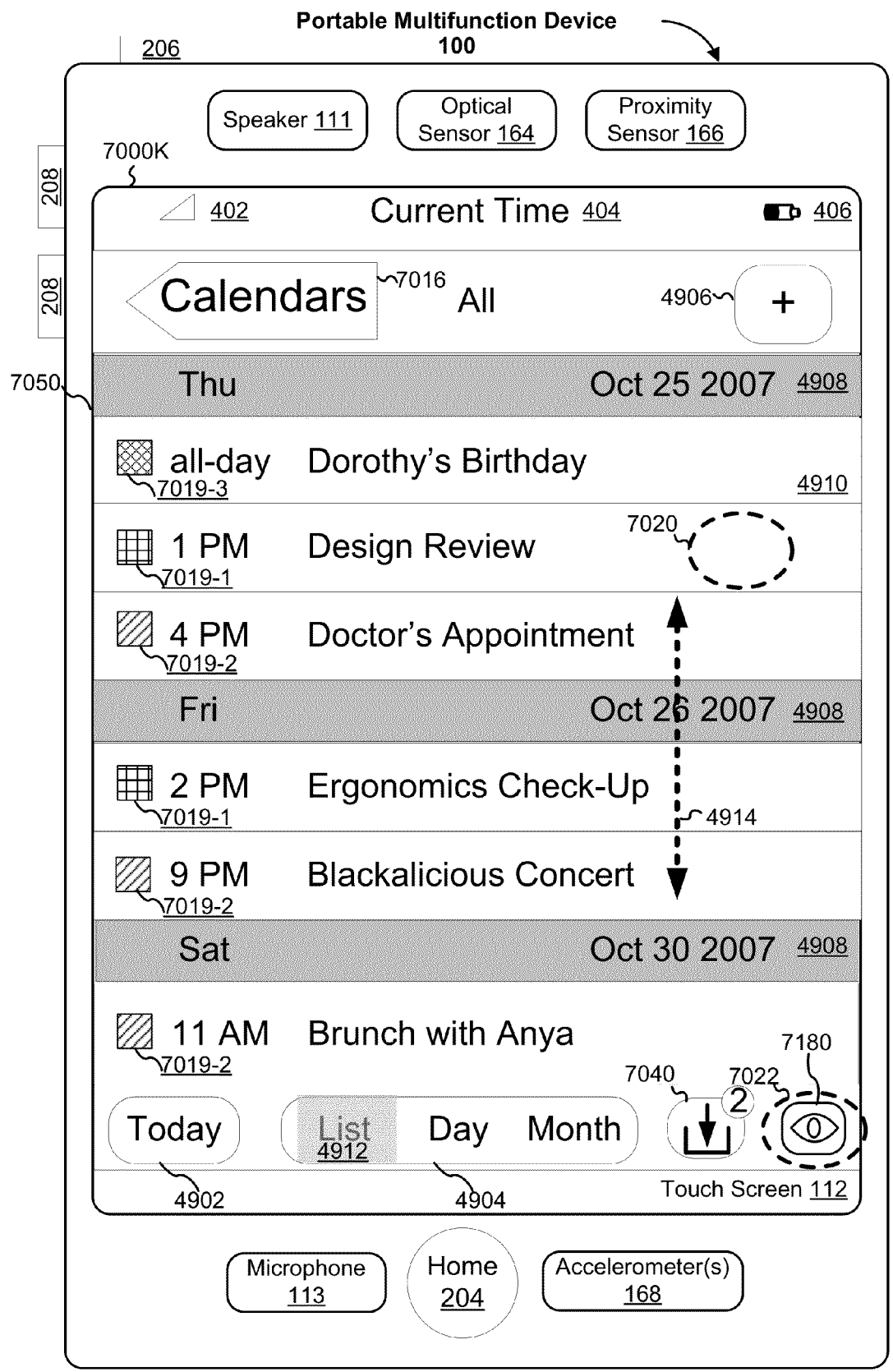

FIG. 7K shows a device 100 in a portrait orientation displaying a list view of a multiday calendar having a plurality of event types. In some embodiments, each event type is coded (e.g., color or pattern coded with calendar indicia symbols 7019) for ease of recognition. In some embodiments, in response to detecting a finger gesture (e.g., swipe gesture 4914), the device scrolls the list of events on the multiday calendar. In response to detecting a finger gesture on an event (e.g., gesture 7020 on the design review event), the device initiates display of corresponding details for the event. In some embodiments, in response to detecting a user gesture 7022 on the view options icon 7180, the device displays a curled up version of the calendar interface (e.g., FIG. 7M). In some embodiments, in response to detecting a user gesture on a Calendars icon 7016, the device displays a calendar options menu, as shown in FIG. 7L.

Figure 7L:
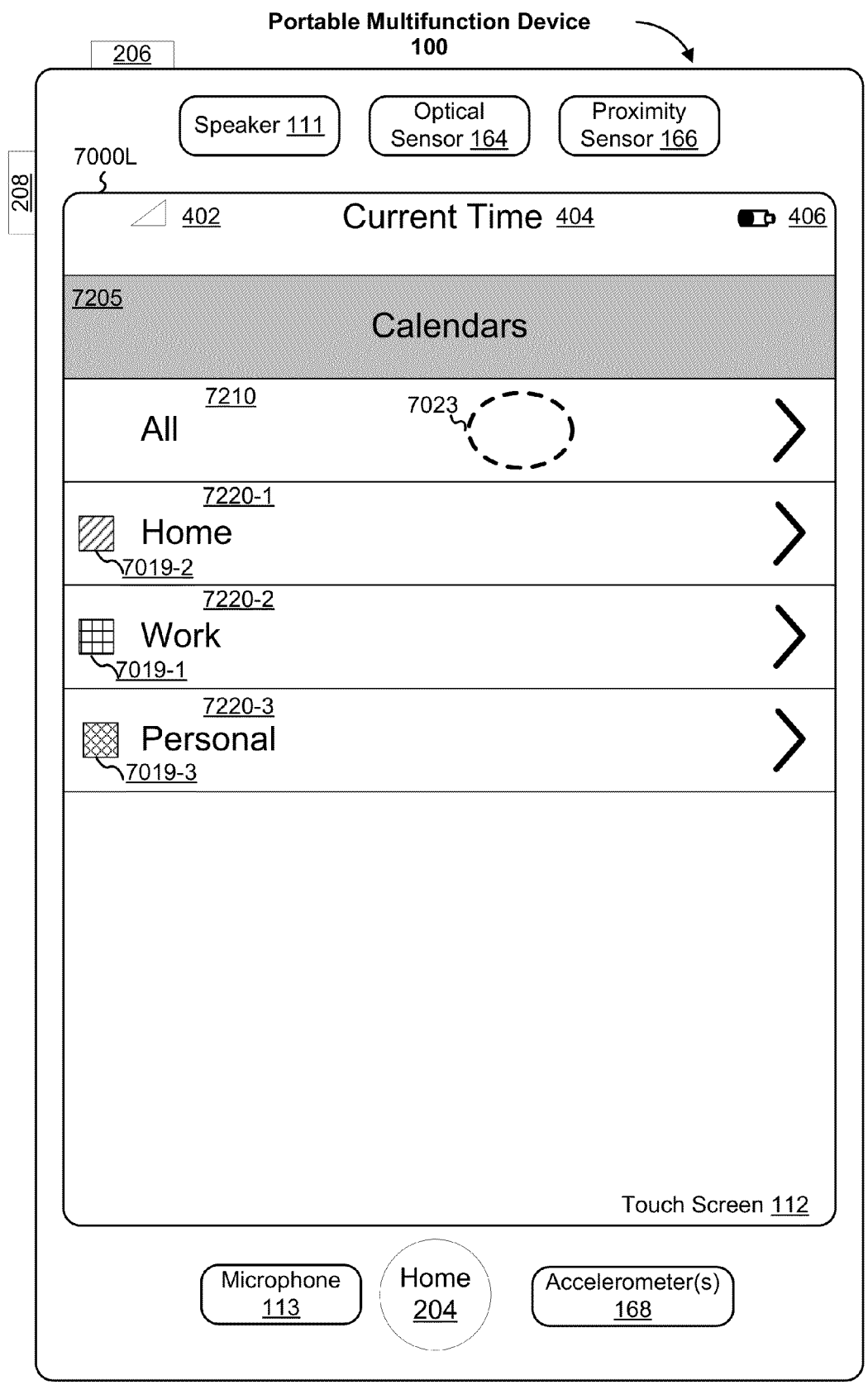

FIG. 7L shows a device 100 displaying a calendar options menu. In some embodiments, in response to detecting a selection gesture on a calendar option, events from the selected calendar are displayed. In some embodiments, in response to detecting selection gestures on two or more of the calendar options, events from the selected calendars are displayed. In some embodiments, in response to detecting a selection gesture (e.g., a finger tap gesture 7023) on the "All" calendars option, events from all of the calendars are displayed. In some embodiments, each event is color coded or pattern coded with calendar indicia symbols 7019 so that a user will recognize the calendar from which each event comes.

Figure 7M:
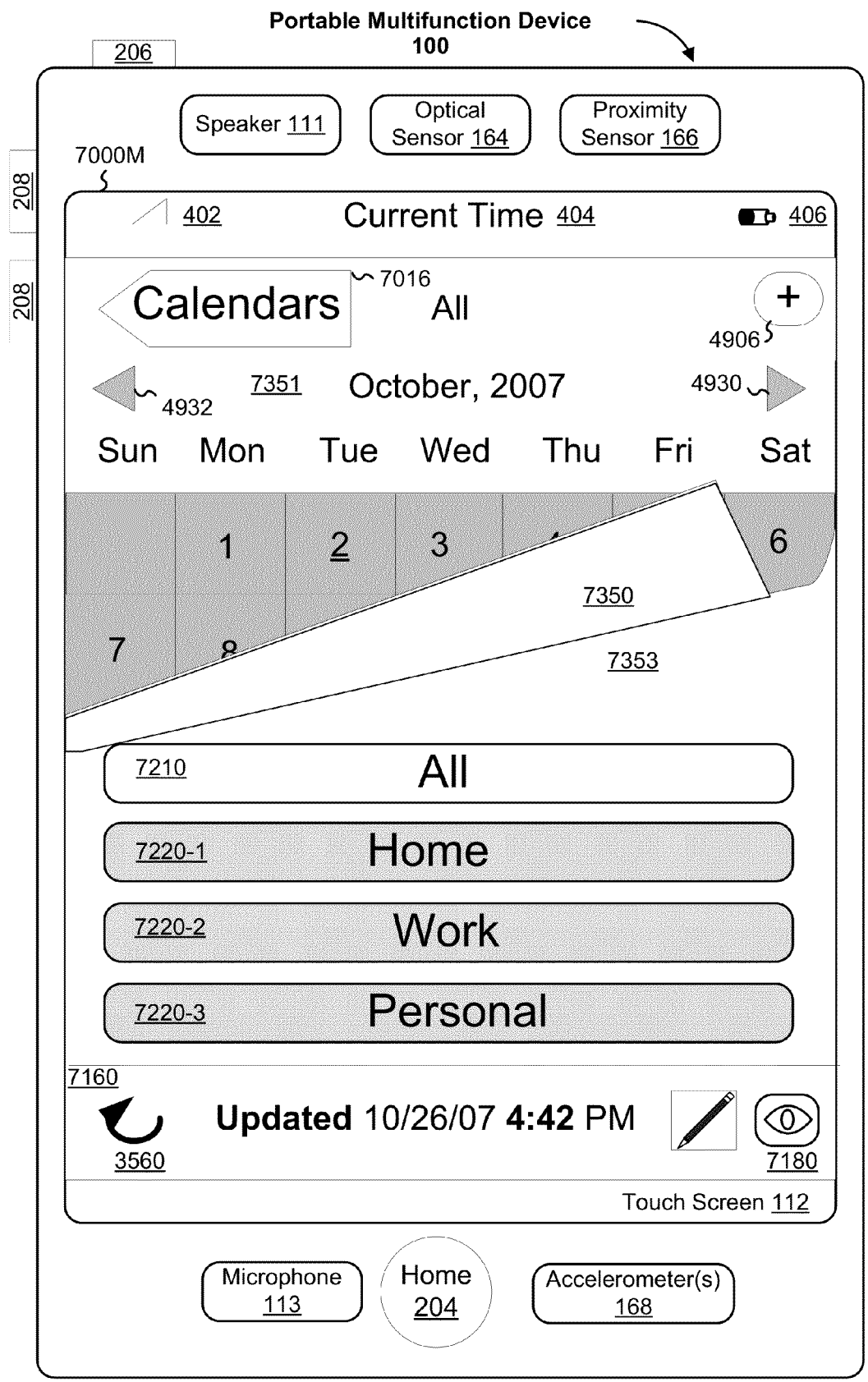

FIG. 7M shows a device 100 displaying a curled up page of a multiweek calendar view, with a view options menu also shown. In some embodiments, the curled up page is shown in response to detecting a user gesture on the view options icon 7180 (e.g., in FIG. 7J or FIG. 7K). In the curled up version of the calendar interface, an image 7350 of a bent, folded, or otherwise curled page is displayed, which obscures a first part of the flat version of the calendar application interface. A roll-up region 7353 is displayed over an area formerly occupied by a second portion of the flat version of the calendar application interface. The roll-up region 7353 includes calendar option icons (e.g., 7210, 7220-1, 7220-2, and 7220-3). In response to detecting user selection gestures on one or more of the calendar option icons a flat version of the calendar application interface is displayed with events corresponding to the one or more calendar option icons upon which user selection gestures were detected. For example, if a user selects "work," then calendar events from the work calendar will be displayed on the flat version of the calendar interface. In some embodiments, if a user selects "work" and "home," then calendar events from the work and home calendars will be displayed on the flat version of the calendar interface. In some embodiments, a portion of the curled version is displayed in a manner distinct from how that portion is displayed in the flat version. In some embodiments, the curled page is displayed as a translucent representation of a portion of the flat version of the calendar interface. In the curled-up page view, in response to detecting user selection of the view options icon 7180, a flat view is re-displayed, for example, the flat view of FIG. 7J.

Figure 7N:
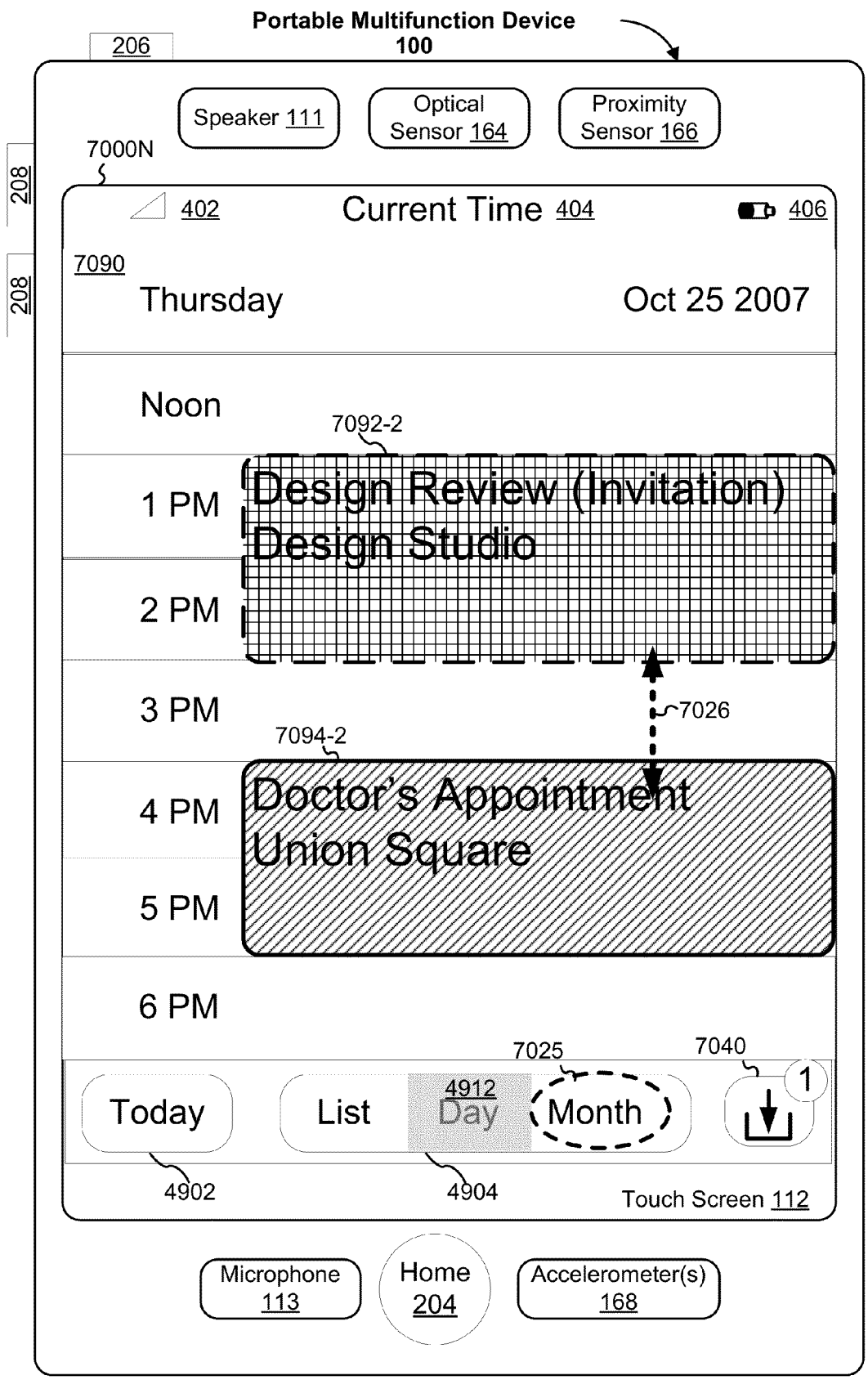

FIG. 7N shows a device 100 displaying a single day calendar having a plurality of event types, including an invitation shown as a tentative calendar event 7092-2. In FIG. 7N, there is an invitation from 1 pm to 3 pm for a design review from the work calendar. There is a doctor's appointment 7094-2 from 4 pm to 6 pm from the home calendar. The single day calendar of FIG. 7N is scrollable in response to a gesture 7026. A set of icons 4902, 4904 are provided to initiate display of "Today" events, and to initiate display of events in a list view, day view or month view, in response to detecting a user gesture on the corresponding icon. An icon 7040 is provided for accessing an invitation inbox and for displaying a number of unread calendar invitations. In FIG. 7N, in response to detecting a user gesture 7025 on the "Month" view, the device initiates display of the month view (e.g., FIG. 7O).

Figure 7O:

FIG. 7O shows a device 100 displaying a multiweek calendar 4934 along with a list 4938 of events for a selected day (e.g., Oct. 25, 2007). The list of events includes events from a plurality of calendars. FIG. 7O displays two events on the day of Oct. 25, 2007. These events are coded to indicate the calendar from which the event came. One of the events is a calendar invitation from the work calendar, namely the design review at 1 pm. The other event is a calendar appointment from the home calendar, namely the doctor's appointment at 4 pm. The event list is scrollable in response to a user gesture. The event list changes in response to a user contact on an individual day in the multiweek calendar, while continuing to display the multiweek calendar. In some embodiments, the list of events on the contacted individual day includes an invitation to an event (e.g. tentative calendar event 7092-2, FIG. 7O).

Figure 7P:
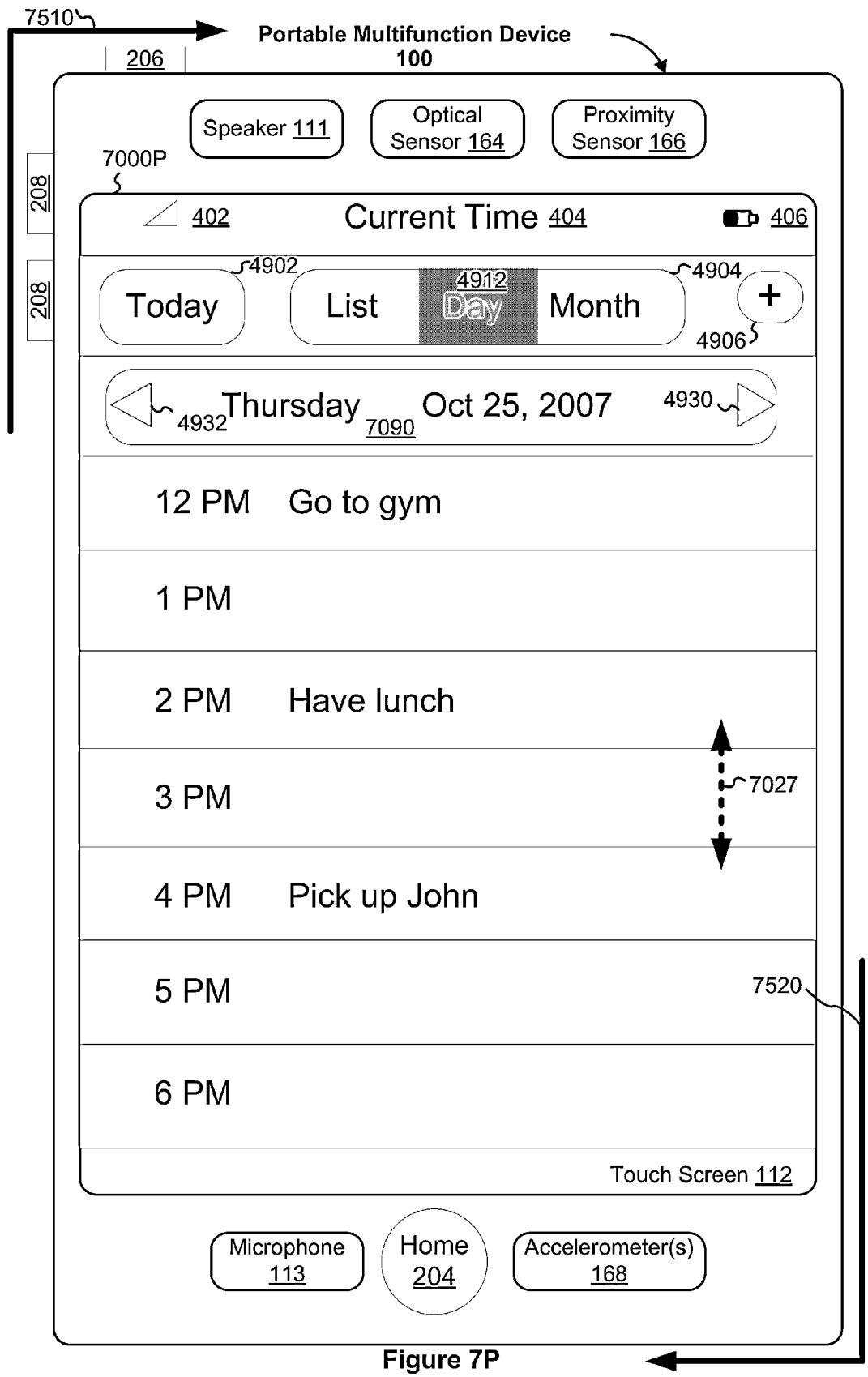

FIG. 7P shows a device held in a portrait orientation displaying a calendar view for a first time period (e.g., a day). In some embodiments, the portrait orientation corresponds to a substantially vertical orientation of the long axis of the touch screen. The day view is scrollable in response to a user gesture 7027, permitting a user to see a plurality of events in a day. In response to detecting the device in a landscape orientation, the device changes to a landscape calendar view of a second time period (e.g., a week, FIG. 7Q).

Figure 7Q:
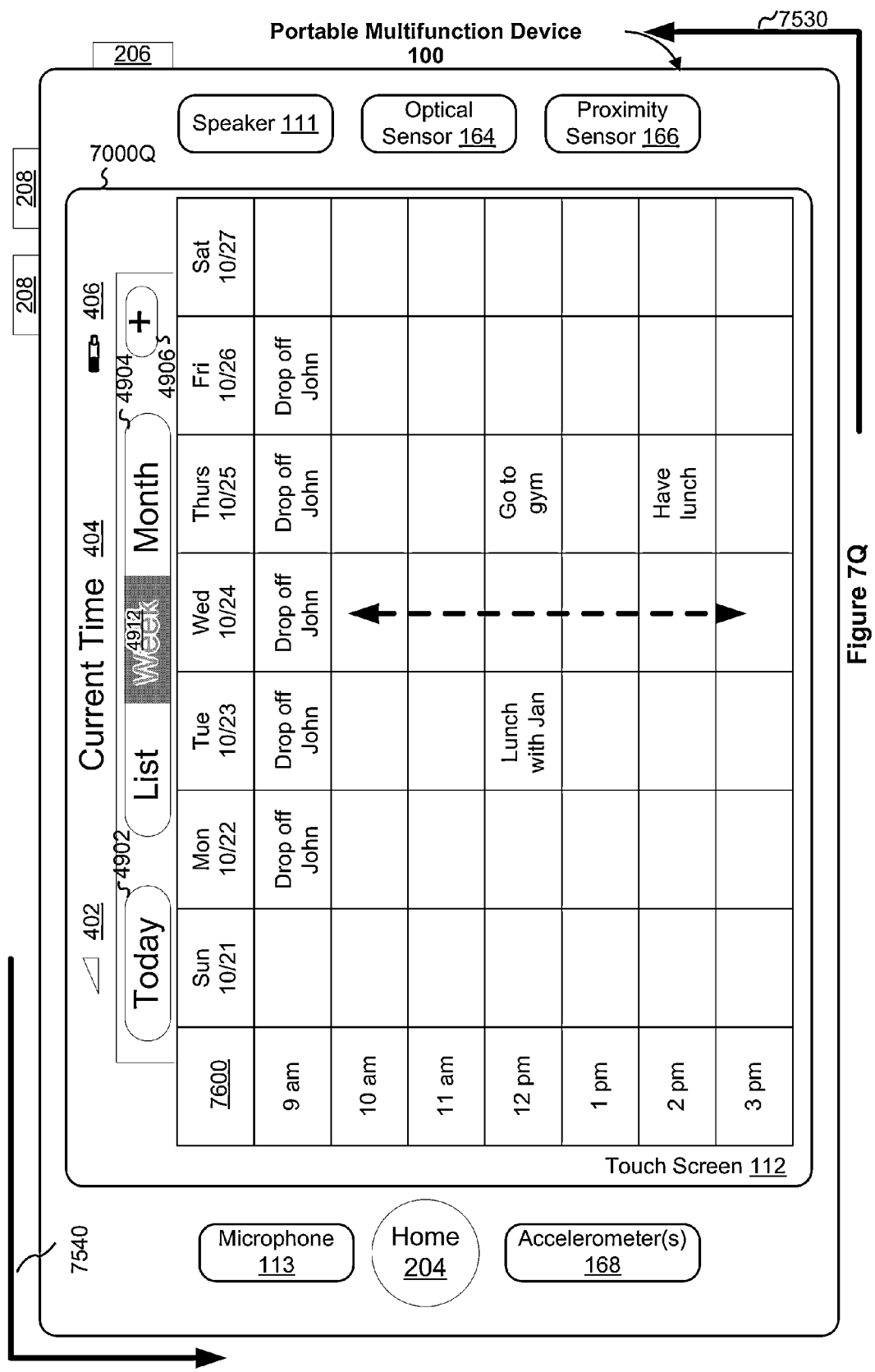

FIG. 7Q shows a device held in a landscape orientation displaying a multiday calendar view for a time period longer than the day view of the portrait orientation of FIG. 7P. In some embodiments, the landscape orientation corresponds to a substantially vertical orientation of the short axis of the touch screen. In some embodiments, the multiday view is a week view. In some embodiments, the week view is scrollable in response to a user gesture, permitting a user to easily view all of the hours in a week. In some embodiments, if the device in a portrait orientation shows a week view, then in response to detecting rotation of the device to a landscape orientation, the device displays a multiweek view, such as a month view. In some embodiments, if the device in a portrait orientation shows a multiweek view, then in response to rotating the device to a landscape orientation, the device displays a view of a plurality of months.

Figure 7R:
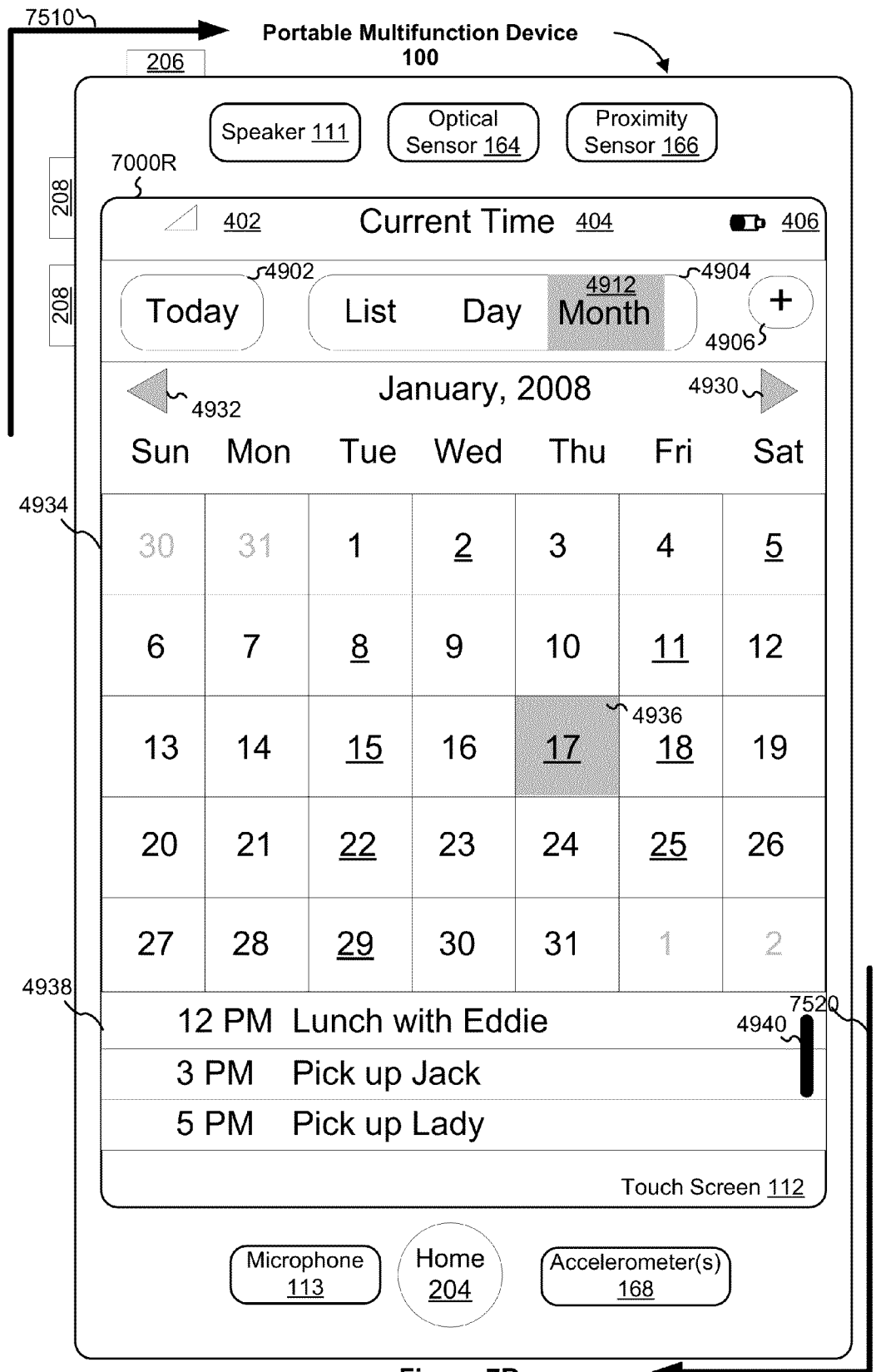

FIG. 7R shows a device 100 held in a portrait orientation displaying a multiweek calendar view for a month time period. In some embodiments, the portrait orientation corresponds to a substantially vertical orientation of the long axis of the touch screen. In response to detecting the device in a landscape orientation, the device changes to a landscape calendar view of a second time period (e.g., FIG. 7S, a calendar that displays multiple months that include the multiple weeks in FIG. 7R).

FIG. 7S shows a device held in a landscape orientation displaying a multi-month calendar view for a time period longer than the multi-week view of the portrait orientation of FIG. 7R. In some embodiments, the landscape orientation corresponds to a substantially vertical orientation of the short axis of the touch screen. In some embodiments, the multi-month view is a three-month view. In some embodiments, the multi-month view is scrollable in response to a user gesture, permitting a user to see months earlier and later than a currently displayed view. In some embodiments, if the device in a portrait orientation shows a multi-week view (e.g., FIG. 7R), then in response to detecting rotation of the device to a landscape orientation, the device displays a multi-month view, such as a three month view (e.g., FIG. 7S). In some embodiments, if the device in a portrait orientation shows a multiweek view, then in response to rotating (7510, 7520) the device to a landscape orientation, the device displays a view of a plurality of months.

The user interfaces in FIGS. 7A-7S are used to illustrate the processes described below with respect to FIGS. 8A-8F. Additional details on these user interfaces are provided below.

In some embodiments, UI 7000A (FIG. 7A) includes the following elements, or a subset or superset thereof:
- 402, 404, 406, 4912, 4930, 4932, 4934, 4938, 4902, 4904, and 4940, as described above; and
- an invitation inbox selector 7040, that when activated (e.g. by a finger tap 7002) initiates display of an invitation inbox interface (e.g., UI 7000C, FIG. 7C).

In some embodiments, the inbox selector 7040 displays the number of unread calendar invitations in the inbox (e.g., "2" in FIG. 7A).

In some embodiments, UI 7000B (FIG. 7B) includes the following elements, or a subset or superset thereof:
- 402, 404, 406, 4902, 4904, 4908, 4912, and 7040, as described above; and
- a scrollable (e.g., in response to a swipe gesture 7005) calendar list view 7050 that displays a list of events 4910 and the time period (e.g., day 4908) with which the events are associated.

In some embodiments, UI 7000C (FIG. 7C) includes the following elements, or a subset or superset thereof:
- 402, 404, and 406, as described above;
- a calendar invitation inbox 7060 that displays a list of calendar invitations 7062 and, in some embodiments, details (e.g., day, time, location) for the calendar invitations;
- Calendar invitation(s) 7062 or portion(s) thereof;
- Done icon 7008 that when activated (e.g., by a finger gesture) initiates exiting the calendar invitation inbox; and
- Unread calendar invitation indicia 7070 that indicate that the corresponding calendar invitation has not been read.

In some embodiments, calendar invitation inbox 7060 includes a title bar that displays the number of unread invitations (e.g., Invites(2)). In some embodiments, in response to detecting a gesture on the list of calendar invitations (e.g., finger swipe gesture 7006 on invitation 7062-1), the device scrolls the list. In some embodiments, in response to detecting a gesture on a calendar invitation (e.g., finger tap gesture 7007 on invitation 7062-1), the device initiates display of an interface (e.g., UI 7000D, FIG. 7D) that provides details of the selected calendar invitation.

In some embodiments, UI 7000D (FIG. 7D) includes the following elements, or a subset or superset thereof:
- 402, 404, 406, and 7062, as described above;
- a "show in calendar" icon 7082 that when activated (e.g., by finger gesture 7009) initiates display of the invitation in a calendar (e.g., as shown in FIG. 7E);
- a "return to calendar invitation inbox" icon 7084 that when activated (e.g., by finger gesture) initiates display of the calendar invitation inbox (e.g., FIG. 7C);
- a "previous invitation" icon 7086 that when activated (e.g., by finger gesture) initiates display of the previous calendar invitation in the calendar invitation inbox;
- a "next invitation" icon 7088 that when activated (e.g., by finger gesture) initiates display of the next calendar invitation in the calendar invitation inbox;
- an "accept invitation" icon 7091 that when activated (e.g., by finger gesture) initiates acceptance of calendar invitation (e.g., 7062-1);
- a "maybe" icon 7093 that when activated (e.g., by finger gesture) initiates tentative acceptance of calendar invitation (e.g., 7062-1); and
- a "decline invitation" icon 7095 that when activated (e.g., by finger gesture) initiates rejection of calendar invitation (e.g., 7062-1).

In some embodiments, UI 7000E (FIG. 7E) includes the following elements, or a subset or superset thereof:
- 402, 404, 406, 4902, 4904, 4910, 4912, and 7040, as described above;
- a calendar day view 7090; and
- a calendar invitation (e.g., 7062-1 from UI 7000C, FIG. 7C) shown as a tentative calendar event 7092-1, where a dotted border, the word "Invitation," or other visual indicator shows the tentative nature of event 7092; and
- a scheduled calendar event 7094-1, which may conflict with a tentative calendar event (e.g., event 7094-1 overlaps with event 7092-1 between 2-3 pm).

In some embodiments, UI 7000F (FIG. 7F) includes the following elements, or a subset or superset thereof:
- 402, 404, 406, 7008, 7060, 7062, and 7070, as described above.

In this example, a user has accepted the first meeting 7062-1. As a result the first meeting 7062-1 is marked as accepted, and the unread indicator 7070 for the first meeting is no longer present. The number of unread invitations indicated in the top bar has been reduced from two to one.

In some embodiments, UI 7000G (FIG. 7G) includes the following elements, or a subset or superset thereof:
- 302, 304, 307, 308, 310, 312, and 314, as described above;
- an alert 7120 indicating a new calendar invitation has been received, which may be displayed over a wallpaper image 314 while the device 100 is in a locked mode; and
- view-invitation icon 309 that when activated (e.g., by a finger gesture on image 302) initiates display of an interface (e.g., UI 7000D, FIG. 7D) giving details of the calendar invitation.

In some embodiments, detecting a view-invitation gesture causes the device to display the invitation inbox (FIG. 7C) instead of the invitation (FIG. 7D).

In some embodiments, UI 7000H (FIG. 7H) includes the following elements, or a subset or superset thereof:
- 308, 310, and 312, as described above;
- an alert 7130 indicating a new calendar invitation has been received, displayed over a current application while the device 100 is in an unlocked mode; and
- a close icon 7132 that when activated (e.g., by a finger gesture) ceases display of the alert 7130; and a view icon 7134 that when activated (e.g., by a finger gesture 7014) initiates display of an interface (e.g., UI 7000D, FIG. 7D) giving details of the calendar invitation.

In some embodiments, detecting a gesture 7014 on view icon 7134 causes the device to display the invitation inbox (FIG. 7C) instead of the invitation (FIG. 7D).

In some embodiments, UI 70001 (FIG. 7I) includes the following elements, or a subset or superset thereof:
- 402, 404, 406, 7084, 7086, and 7088, as described above;
- an email 7140;
- a calendar invitation icon 7150 that when activated (e.g., by a finger gesture 7015) initiates display of a invitation in a calendar application (e.g., FIG. 7D); and
- a refresh icon 3560 that when activated (e.g., by a finger gesture) initiates a refresh of the inbox.

In some embodiments, UI 7000J (FIG. 7J) includes the following elements, or a subset or superset thereof:
- 402, 404, 406, 4902, 4904, 4906, 4912, 4930, 4932, 4934, and 7040, as described above;
- a view options icon 7180 that when activated (e.g., by a finger gesture 7018) initiates display of a calendar options menu with a curled up version of the calendar interface (e.g., FIG. 7M) or other calendar options menu (e.g., FIG. 7L);
- a calendar options icon 7016 that when activated (e.g., by a finger gesture 7028) initiates display of a calendar options menu with a curled up version of the calendar interface (e.g., FIG. 7M) or other calendar options menu (e.g., FIG. 7L); and
- calendar indicia symbols 7019 that indicate which calendar an event comes from (e.g., an event from a work calendar includes symbol 7019-1, an event from a home calendar includes symbol 7019-2, and an event from a personal calendar includes symbol 7019-3).

In some embodiments, UI 7000J (FIG. 7J) includes view options icon 7180 (activated by a finger gesture 7018) or calendar options icon 7016, but not both.

In some embodiments, UI 7000K (FIG. 7K) includes the following elements, or a subset or superset thereof:
- 402, 404, 406, 4902, 4904, 4908, 4910, 4912, 7040, 7050, 7016, 7180, as described above.

In some embodiments, UI 7000L (FIG. 7L) includes the following elements, or a subset or superset thereof:
- 402, 404, and 406, as described above;
- a calendar option menu 7205;
- an all calendar option icon 7210 that when activated (e.g., by a finger gesture 7023) initiates display of a calendar (e.g., FIG. 7J or FIG. 7K) that shows events from all of the individual calendars; and
- individual calendar option icons 7220 that when activated (e.g., by a finger gesture) initiates display of a calendar that shows events from the corresponding individual calendar;

In some embodiments, UI 7000M (FIG. 7M) includes the following elements, or a subset or superset thereof:
- 402, 404, 406, 4906, 4930, 4932, 3560, 7016, and 7180, as described above;
- a portion 7351 of a flat version of a calendar application interface;
- an image 7350 of a bent, folded, or otherwise curled page that obscures a portion of the flat version of the calendar application interface; and
- a roll-up region 7353 in a display region formerly occupied by a another portion of the flat version of the calendar application interface, wherein the roll-up region includes a plurality of calendar option icons (e.g., 7210, 7220-1, 7220-2, and 7220-3).

In some embodiments, UI 7000N (FIG. 7N) includes the following elements, or a subset or superset thereof:
- 402, 404, 406, 4902, 4904, 4912, 7040, 7090, 7092, 7094 as described above.

In some embodiments, UI 7000O (FIG. 7O) includes the following elements, or a subset or superset thereof:
- 402, 404, 406, 4902, 4904, 4912 4930, 4932, 4934, 4938, 4940, 7040, 7092, and 7094, as described above.

In some embodiments, UI 7000P (FIG. 7P) includes the following elements, or a subset or superset thereof:
- 402, 404, 406, 4902, 4904, 4906, 4912, 4930, 4932, and 7090, as described above.

In some embodiments, UI 7000Q (FIG. 7Q) includes the following elements, or a subset or superset thereof:
- 402, 404, 406, 4902, 4904, 4906, and 4912 as described above; and
- a calendar in landscape orientation displaying a scrollable multiday view 7600, for a time period longer than and including the day view of the portrait orientation of FIG. 7P.

In some embodiments, in response to detecting rotation of the device (e.g., 7530 and 7540) from a landscape orientation to a portrait orientation, the device displays a single-day calendar in a portrait orientation, such as that of UI 7000P, FIG. 7P.

In some embodiments, UI 7000R (FIG. 7R) includes the following elements, or a subset or superset thereof:
- 402, 404, 406, 4902, 4904, 4906, 4912, 4930, 4932, 4934, 4938, and 4940, as described above.

In some embodiments, in response to detecting rotation of the device (e.g., 7510 and 7520) from a portrait orientation to a landscape orientation, the device displays a multi-month calendar in a landscape orientation, such as that of UI 7000S, FIG. 7S.

In some embodiments, UI 7000S (FIG. 7S) includes the following elements, or a subset or superset thereof:
- 402, 404, 406, 4902, 4904, 4906, 4912, 4930, and 4932, as described above; and
- a calendar in landscape orientation displaying a scrollable multi-month view 7650, for a time period longer than and including the multi-week view of the portrait orientation of FIG. 7R.

In some embodiments, in response to detecting rotation of the device (e.g., 7530 and 7540) from a landscape orientation to a portrait orientation, and in response to the rotation, the device displays a multiweek calendar for a duration less than the multi-month calendar in a portrait orientation, such as that of UI 7000R, FIG. 7R.

The user interfaces in FIGS. 7A-7S are used to illustrate the processes described below with respect to FIGS. 8A-8F.

Figure 8A:
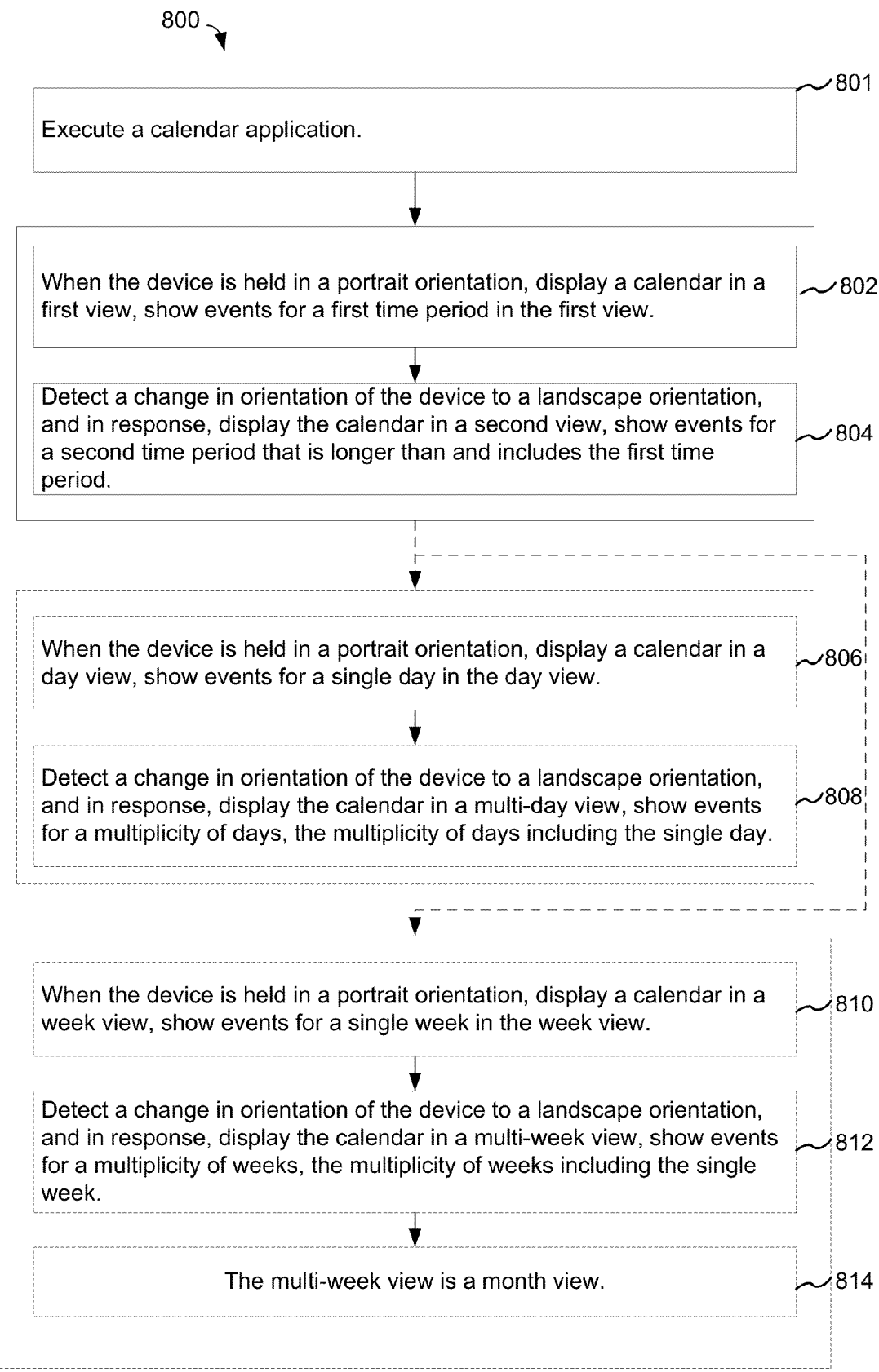

FIG. 8A is flow diagram illustrating a method 800 of operating a calendar application in accordance with some embodiments. The method 800 is performed on a portable electronic device with a touch screen display (e.g., portable multifunction device 100). The method 800 provides a simple and intuitive way for a user to switch between a first calendar time period and a second longer time period. This is a convenient way to change the time period viewed without having to access menus or engage in other combinations of actions.

The portable electronic device executes (801) a calendar application. When the device is held in a portrait orientation, the device displays (802) a calendar in a first view, showing events for a first time period in the first view (e.g., UI 7000P, FIG. 7P). The device detects (804) a change in orientation of the device to a landscape orientation, and in response, displays the calendar in a second view, showing events for a second time period that is longer than and includes the first time period (e.g., UI 7000Q, FIG. 7Q).

In some embodiments, when the device is held in a portrait orientation, the device displays (806) a calendar in a day view, showing events for a single day in the day view (e.g., UI 7000P, FIG. 7P). The device detects (808) a change in orientation of the device to a landscape orientation, and in response, displays the calendar in a multiday view, showing events for a multiplicity of days, the multiplicity of days including the single day (e.g., UI 7000Q, FIG. 7Q).

In some embodiments, when the device is held in a portrait orientation, the device displays (810) a calendar in a week view, showing events for a single week in the week view. The device detects (812) a change in orientation of the device to a landscape orientation, and in response, displays the calendar in a multiweek view, showing events for a multiplicity of weeks, the multiplicity of weeks including the single week. In some embodiments, the multiweek view is a month view (814).

Figure 8B:
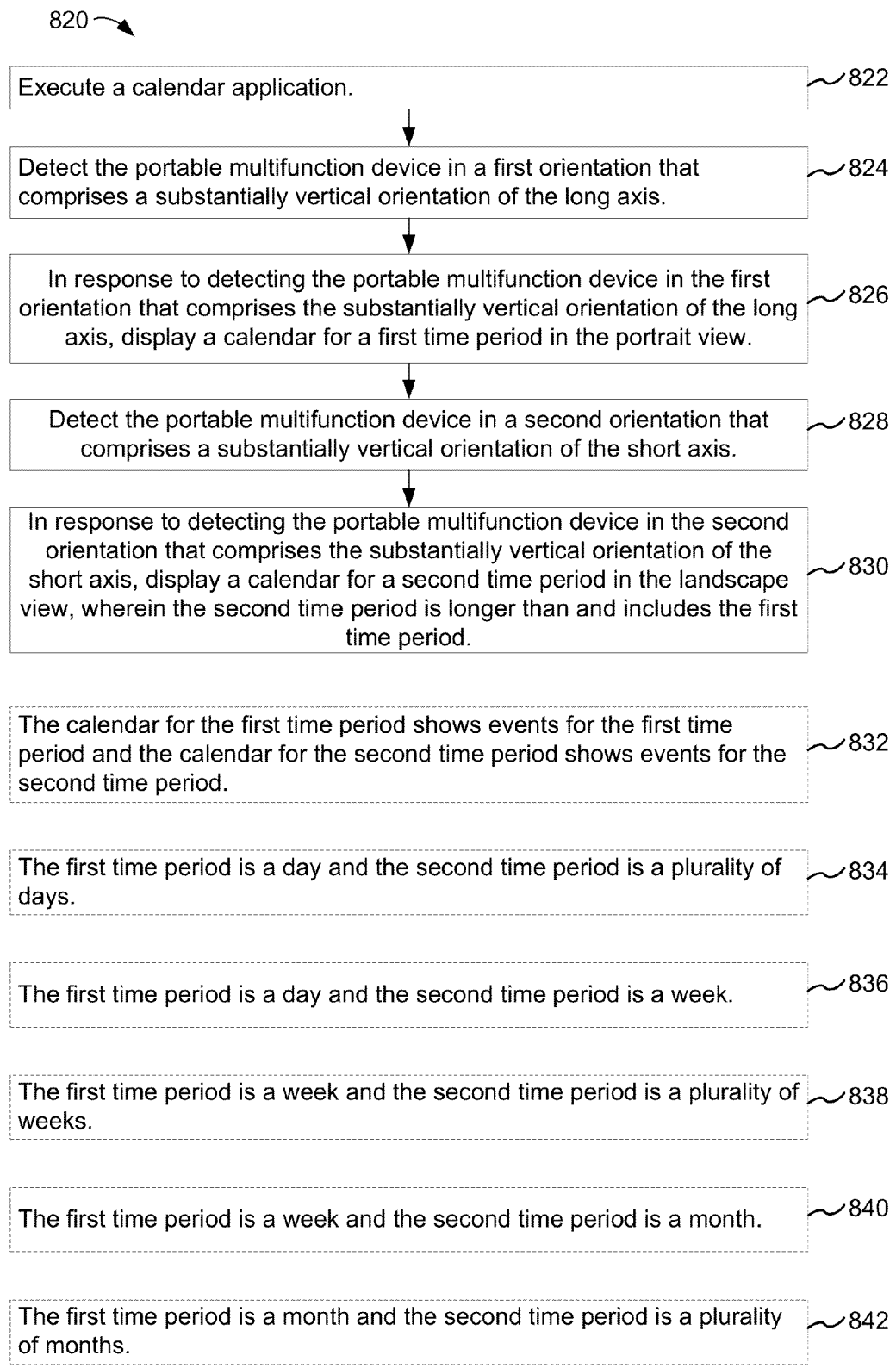

FIG. 8B is flow diagram illustrating a method 820 of operating a calendar application in accordance with some embodiments. The method 820 is performed at a portable multifunction device with a touch screen display (e.g., portable multifunction device 100). The touch screen includes a long axis, a short axis, a landscape view and a portrait view. The method 820 provides a simple and intuitive way for a user to switch between a first time period and a second longer time period. This is a convenient way to change the time period viewed without having to access menus or engage in other combinations of actions.

The portable multifunction device executes (822) a calendar application. The device detects (824) the portable multifunction device in a first orientation that comprises a vertical or substantially vertical orientation of the long axis. In response to detecting the portable multifunction device in the first orientation that comprises the vertical or substantially vertical orientation of the long axis, the device displays (826) a calendar for a first time period in the portrait view (e.g., UI 7000P, FIG. 7P). The device detects (828) the portable multifunction device in a second orientation that comprises a vertical or substantially vertical orientation of the short axis. In response to detecting the portable multifunction device in the second orientation that comprises the vertical or substantially vertical orientation of the short axis, the device displays (830) a calendar for a second time period in the landscape view. The second time period is longer than and includes the first time period (e.g., UI 7000Q, FIG. 7Q).

In some embodiments, the calendar for the first time period shows events for the first time period and the calendar for the second time period shows events for the second time period (832). In some embodiments, the first time period is a day (e.g., UI 7000P, FIG. 7P) and the second time period is a plurality of days (e.g., 3-7 days, with 7 days shown in UI 7000Q, FIG. 7Q) (834). In some embodiments, the first time period is a day (e.g., UI 7000P, FIG. 7P) and the second time period is a week (e.g., UI 7000Q, FIG. 7Q) (836). In some embodiments, the first time period is a week and the second time period is a plurality of weeks (e.g., 3-5 weeks) (838). In some embodiments, the first time period is a week and the second time period is a month (840). In some embodiments, the first time period is a month (e.g., UI 7000R, FIG. 7R) and the second time period is a plurality of months (e.g., 3 months, as shown in UI 7000S, FIG. 7S) (842).

Figure 8C:
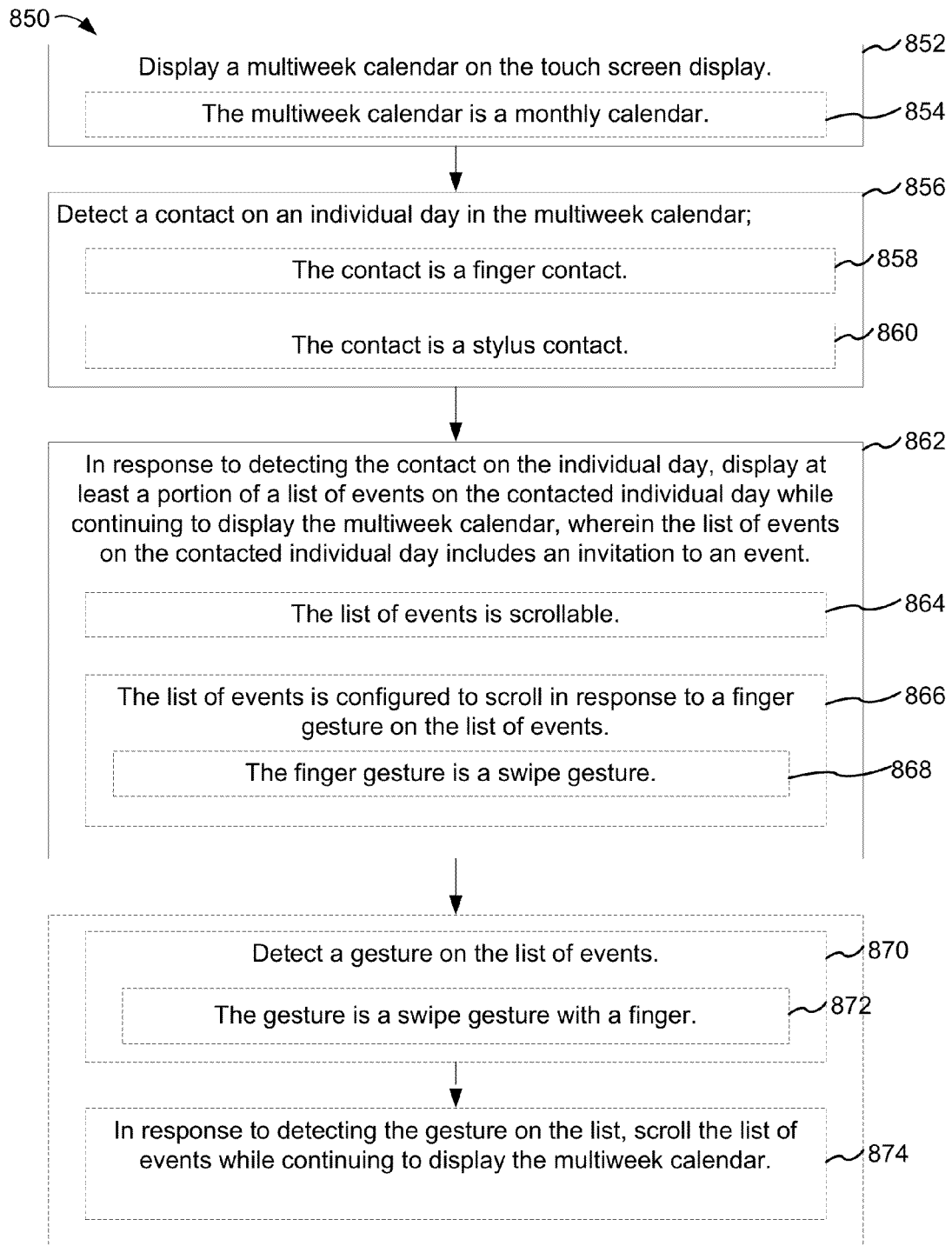
Figure 8E:
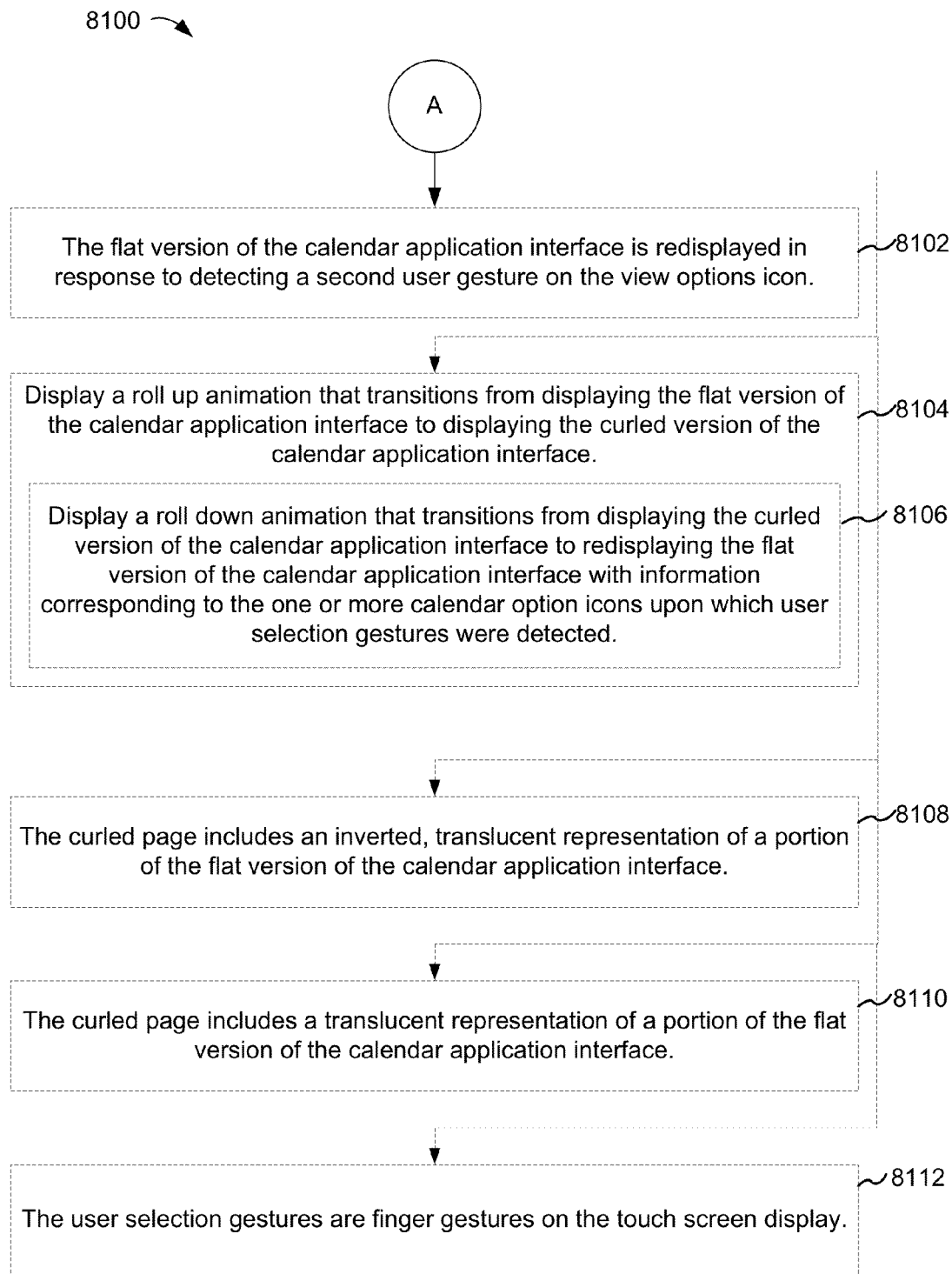

FIG. 8C is flow diagram illustrating a method 850 of operating a calendar application in accordance with some embodiments. The method 850 is performed at a portable multifunction device with a touch screen display (e.g., portable multifunction device 100). The method 850 provides a simple and intuitive way for a user to view events for individual days in a multiweek calendar while simultaneously viewing the multiweek calendar.

The device displays (852) a multiweek calendar on the touch screen display (e.g., UI 7000J, FIG. 7J). In some embodiments, the multiweek calendar is a monthly calendar (854).

The device detects (856) a contact (e.g., 7017) on an individual day in the multiweek calendar. In some embodiments, the contact is a finger contact (858). In some embodiments, the contact is a stylus contact (860).

In response to detecting the contact on the individual day, the device displays (862) at least a portion of a list of events (e.g., 4938) on the contacted individual day while continuing to display the multiweek calendar (e.g., 4934). The list of events on the contacted individual day includes an invitation to an event (e.g., tentative calendar event 7092-2, "Design Review (Invitation)," FIG. 7J).

In some embodiments, the list of events is scrollable (864). In some embodiments, the list of events is configured to scroll in response to a finger gesture on the list of events (866). In some embodiments the finger gesture is a swipe gesture (868).

In some embodiments, the device detects (870) a gesture 4938 on the list of events. In response to detecting the gesture on the list (e.g., 7029), the device scrolls (874) the list of events while continuing to display the multiweek calendar. In some embodiments, the gesture is a swipe gesture with a finger (872).

FIG. 8D is flow diagram illustrating a method 880 of displaying and selecting calendar options in accordance with some embodiments. The method 880 is performed at a computing device with a touch screen display (e.g., portable multifunction device 100). The method 880 provides a simple and intuitive way for a user to select calendar options.

A computing device with a touch screen display displays (882) a flat version (e.g., UI 7000J, FIG. 7J) of a calendar application interface on the touch screen display. In response to detecting a user gesture (e.g., 7018, FIG. 7J) on a view options icon (e.g., 7180) while the flat version of the calendar application interface is displayed, the device displays (884) a curled version (e.g., UI 7000M, FIG. 7M) of the calendar application interface. The curled version of the calendar application interface includes an image of a bent, folded, or otherwise curled page (e.g., 7350) that obscures a first portion of the flat version of the calendar application interface, and a roll-up region (e.g., 7353) in a display region formerly occupied by a second portion of the flat version of the calendar application interface. The roll-up region includes a plurality of calendar option icons (e.g., 7210, 7220), each respective calendar option icon in the plurality of calendar option icons responsive to a user selection gesture on the respective calendar option icon. The device detects (886) a user selection gesture on one or more of the plurality of calendar option icons. The device redisplays (888) the flat version of the calendar application interface with information corresponding to the one or more calendar option icons upon which user selection gestures were detected.

In some embodiments, the device detects (890) user selection gestures on at least two of the plurality of calendar option icons. The device redisplays (892) the flat version of the calendar application interface with information corresponding to the at least two of the plurality of option icons upon which user selection gestures were detected.

In some embodiments, the curled version of the calendar application interface includes (894) a third portion (e.g., 7351, FIG. 7M) of the flat version of the calendar application interface. In some embodiments, the third portion is displayed (896) in the curled version of the calendar application interface in a manner that is visually distinct from display of the third portion in the flat version of the calendar application interface.

In some embodiments, the flat version of the calendar application interface is redisplayed (8102) in response to detecting a second user gesture on the view options icon.

In some embodiments, the device displays (8104) a roll up animation that transitions from displaying the flat version of the calendar application interface to displaying the curled version of the calendar application interface. In some embodiments, the device displays (8106) a roll down animation that transitions from displaying the curled version of the calendar application interface to redisplaying the flat version of the calendar application interface with information corresponding to the one or more calendar option icons upon which user selection gestures were detected.

In some embodiments, the curled page includes (8108) an inverted, translucent representation of a portion of the flat version of the calendar application interface. In some embodiments, the curled page includes (8110) a translucent representation of a portion of the flat version of the calendar application interface.

In some embodiments, the user selection gestures are finger gestures on the touch screen display (8112).

Figure 8F:
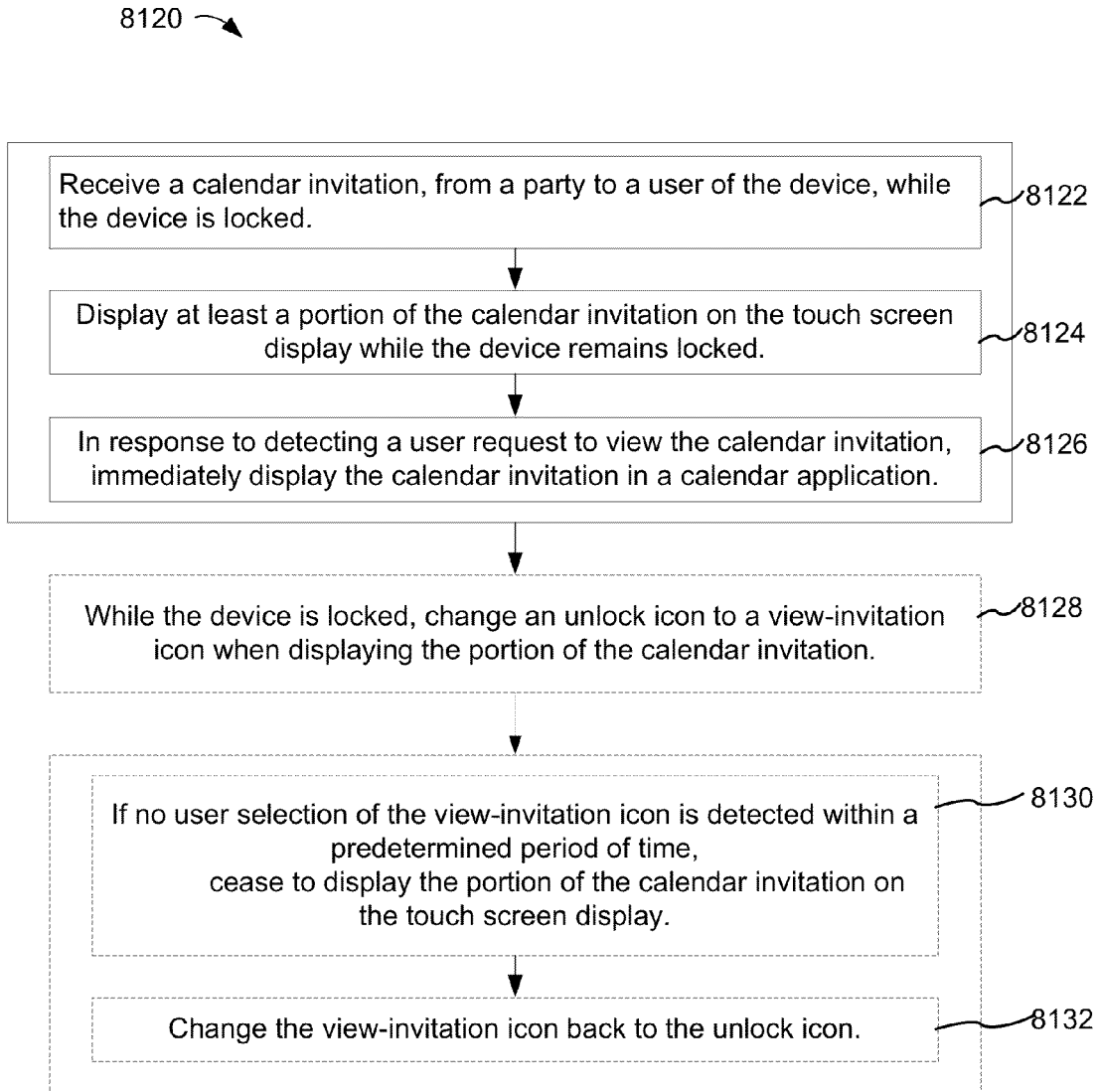

FIG. 8F is flow diagram illustrating a method 8120 of receiving displaying calendar invitations in accordance with some embodiments. The method 8120 is performed on a portable multifunction device with a touch screen display (e.g., portable multifunction device 100). The method 8120 provides a simple and intuitive way for a user to view a calendar invitation if the device receiving the invitation is locked.

The device receives (8122) a calendar invitation, from a party to a user of the device, while the device is locked (e.g., UI 7000G, FIG. 7G). The device displays (8124) at least a portion of the calendar invitation (e.g., 7120) on the touch screen display while the device remains locked. In response to detecting a user request to view the calendar invitation, the device immediately displays (8126) the calendar invitation in a calendar application.

In some embodiments, while the device is locked, the device changes (8128) an unlock icon (e.g., 306, FIG. 7C) to a view-invitation icon (e.g., 309, FIG. 7G) when displaying the portion 7120 of the calendar invitation.

In some embodiments, if no user selection of the view-invitation icon is detected within a predetermined period of time (e.g., 5 or 10 seconds), the device ceases (8130) to display the portion of the calendar invitation on the touch screen display, and changes (8132) the view-invitation icon back to the unlock icon.

Figure 9:
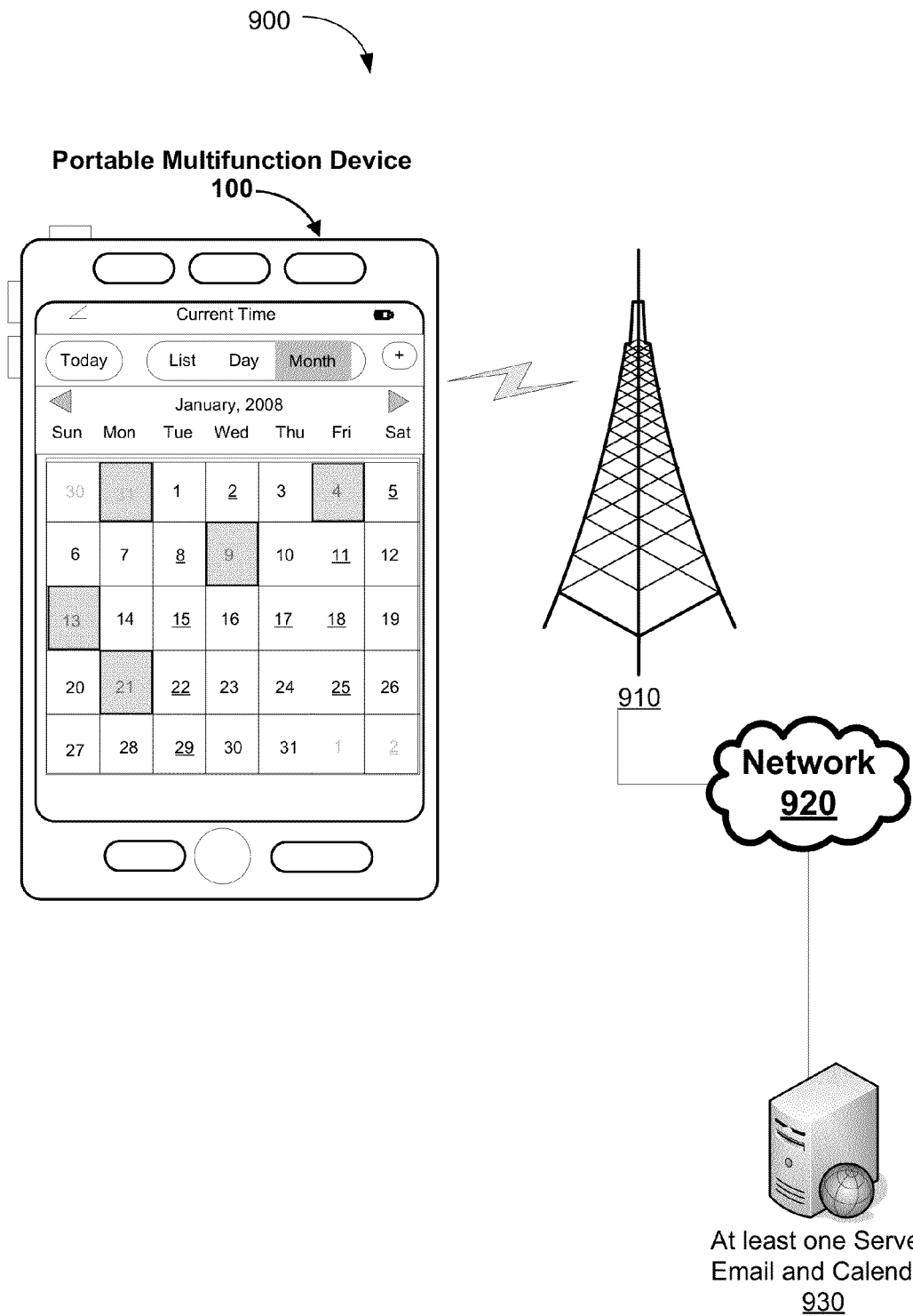
FIG. 9 is a schematic diagram of a communications system that provides infrastructure support for a portable multifunction device in accordance with some embodiments.

FIG. 9 is a schematic diagram of a communications system 900 that provides infrastructure support for a portable multifunction device 100 in accordance with some embodiments. FIG. 9 shows a portable multifunction device 100 communicating (for example, synchronizing, sending data, receiving data, and sending or receiving voice or video calls) over a wireless network 910 (for example, WiFi or a cellphone network) to a wired network 920 (for example, the Internet). The device 100 accesses at least one server 930 to send and receive email, calendar schedule updates, and other voice or data information. In some embodiments, the at least one server 930 is provided by a service provider. In some embodiments, the at least one server is provided by a corporate network.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a portable multifunction device with a touch screen display:
   receiving a calendar invitation, from a party to a user of the device, while the device is locked;
   displaying at least a portion of the calendar invitation on the touch screen display while the device remains locked; and
   in response to detecting a user request to view the calendar invitation, immediately displaying the calendar invitation in a calendar application.

2. The method of claim 1, including:
   while the device is locked, changing an unlock icon to a view-invitation icon when displaying the portion of the calendar invitation.

3. The method of claim 2, including:
   if no user activation of the view-invitation icon is detected within a predetermined period of time,
   ceasing to display the portion of the calendar invitation on the touch screen display; and
   changing the view-invitation icon back to the unlock icon.

4. A portable multifunction device, comprising:
   a touch screen display;
   one or more processors;
   memory; and
   one or more programs, wherein the one or more programs are stored in the memory and configured to be executed by the one or more processors, the one or more programs including instructions for:
   receiving a calendar invitation, from a party to a user of the device, while the device is locked;
   displaying at least a portion of the calendar invitation on the touch screen display while the device remains locked; and
   in response to detecting a user request to view the calendar invitation, immediately displaying the calendar invitation in a calendar application.

5. The device of claim 4, including instructions for:
   while the device is locked, changing an unlock icon to a view-invitation icon when displaying the portion of the calendar invitation.

6. The device of claim 5, including instructions for:
   if no user activation of the view-invitation icon is detected within a predetermined period of time,
   ceasing to display the portion of the calendar invitation on the touch screen display; and
   changing the view-invitation icon back to the unlock icon.

7. A non-transitory computer readable storage medium having stored therein instructions, which when executed by a portable multifunction device with a touch screen display, cause the device to:
- receive a calendar invitation, from a party to a user of the device, while the device is locked;
- display at least a portion of the calendar invitation on the touch screen display while the device remains locked; and
- in response to detecting a user request to view the calendar invitation, immediately display the calendar invitation in a calendar application.

8. The non-transitory computer readable storage medium of claim 7, having further stored therein
- instructions, which when executed by the device, cause the device to:
  - while the device is locked, change an unlock icon to a view-invitation icon when displaying the portion of the calendar invitation.

9. The computer non-transitory readable storage medium of claim 8, having further stored therein
- instructions, which when executed by the device, cause the device to:
  - if no user activation of the view-invitation icon is detected within a predetermined period of time,
    - cease to display the portion of the calendar invitation on the touch screen display; and
    - change the view-invitation icon back to the unlock icon.

10. A graphical user interface on a portable multifunction device with a touch screen display, comprising:
- a calendar application; and
- at least a portion of a calendar invitation;
- wherein:
  - in response to receiving the calendar invitation from a party to a user of the device while the device is locked, at least the portion of the calendar invitation is displayed on the touch screen display while the device remains locked; and
  - in response to detecting a user request to view the calendar invitation, the calendar invitation is immediately displayed in the calendar application.

11. The graphical user interface of claim 10, wherein:
- while the device is locked, an unlock icon is changed to a view-invitation icon when displaying the portion of the calendar invitation.

12. The graphical user interface of claim 11, wherein:
- if no user activation of the view-invitation icon is detected within a predetermined period of time,
  - the portion of the calendar invitation ceases to be displayed on the touch screen display; and
  - the view-invitation icon is changed back to the unlock icon.

13. The method of claim 1, including:
- while the device is locked, preventing the device from performing a predefined set of actions and;
- while the device is unlocked, allowing the device to perform at least some actions in the predefined set of actions.

14. The method of claim 1, wherein the portion of the calendar invitation includes information about a time associated with the calendar invitation.

15. The method of claim 1, wherein immediately displaying the calendar invitation includes immediately displaying a list of calendar invitations that includes the calendar invitation.

16. The method of claim 1, wherein the user request to view the calendar invitation includes an unlock input.

17. The method of claim 1, including, while displaying at least the portion of the calendar invitation on the touch screen display while the device remains locked, displaying an indication of an input required to view the calendar invitation.

18. The method of claim 1, including, while displaying at least the portion of the calendar invitation on the touch screen display while the device remains locked, displaying an icon associated with the calendar invitation.

* * * * *